(12) United States Patent
Arriaga et al.

(10) Patent No.: US 12,148,179 B2
(45) Date of Patent: *Nov. 19, 2024

(54) MAP REPRESENTATION DATA PROCESSING DEVICE, CORRESPONDENCE INFORMATION PRODUCTION METHOD, AND PROGRAM

(71) Applicant: STROLY INC., Kyoto (JP)

(72) Inventors: Varela Enrique Javier Arriaga, Kyoto (JP); Toru Takahashi, Kyoto (JP)

(73) Assignee: STROLY, INC., Kyoto (JP)

( * ) Notice: Subject to any disclaimer, the term of this patent is extended or adjusted under 35 U.S.C. 154(b) by 393 days.

This patent is subject to a terminal disclaimer.

(21) Appl. No.: 17/622,052

(22) PCT Filed: Jun. 22, 2020

(86) PCT No.: PCT/JP2020/024435
§ 371 (c)(1),
(2) Date: Dec. 22, 2021

(87) PCT Pub. No.: WO2020/262312
PCT Pub. Date: Dec. 30, 2020

(65) Prior Publication Data
US 2022/0254053 A1    Aug. 11, 2022

(30) Foreign Application Priority Data
Jun. 25, 2019    (JP) ................. 2019-117259

(51) Int. Cl.
*G06T 7/70* (2017.01)
*G06F 16/532* (2019.01)
(Continued)

(52) U.S. Cl.
CPC .............. *G06T 7/70* (2017.01); *G06F 16/532* (2019.01); *G06F 16/55* (2019.01); *G06F 16/587* (2019.01);
(Continued)

(58) Field of Classification Search
CPC ......... G06T 7/70; G06F 16/532; G06F 16/55; G06F 16/587; G06F 16/909; G06F 16/29;
(Continued)

(56) References Cited

U.S. PATENT DOCUMENTS

2013/0103306 A1*   4/2013   Uetake ............... G01C 21/3889
                                                                 348/121
2020/0234613 A1*   7/2020   Takahashi ............ G09B 29/106

FOREIGN PATENT DOCUMENTS

JP    2010-272082 A    12/2010
JP    2011-043788 A    3/2011
(Continued)

OTHER PUBLICATIONS

Extended European Search Report dated Jul. 8, 2020 issued in the corresponding European Patent Application No. 20831278.5.
(Continued)

*Primary Examiner* — Jared M Bibbee
(74) *Attorney, Agent, or Firm* — Rimon P.C.

(57) ABSTRACT

It is possible to automatically acquire coordinate information and position information regarding a location name or the like on map representation data, in association with each other, with a map representation data processing device including: a map representation data acceptance unit that accepts map representation data; a character string acquisition unit that acquires a character string from the map representation data; a coordinate information acquisition unit that acquires coordinate information corresponding to the acquired character string; a position information acqui-
(Continued)

sition unit that acquires pieces of position information corresponding to pieces of location information that are character strings, using a location dictionary that contains one or more pieces of location position information that associate the pieces of location information and the pieces of position information with each other; and a correspondence output unit that outputs the coordinate information and the position information in association with each other.

19 Claims, 48 Drawing Sheets

(51) Int. Cl.
G06F 16/55 (2019.01)
G06F 16/587 (2019.01)
G06V 10/40 (2022.01)
G06V 10/764 (2022.01)
G06V 30/19 (2022.01)

(52) U.S. Cl.
CPC ............ G06V 10/40 (2022.01); G06V 10/764 (2022.01); G06V 30/19 (2022.01)

(58) Field of Classification Search
CPC .... G06F 40/279; G06V 10/40; G06V 10/764; G06V 30/19; G09B 29/10
See application file for complete search history.

(56) References Cited

FOREIGN PATENT DOCUMENTS

| | | |
|---|---|---|
| JP | 2011-158518 A | 8/2011 |
| JP | 2012-168069 A | 9/2012 |
| JP | 2012-185741 A | 9/2012 |
| JP | 2014-032308 A | 2/2014 |
| WO | 2019/069366 A1 | 4/2019 |

OTHER PUBLICATIONS

International Search Report issued in corresponding International Application No. PCT/JP2020/024435, dated Aug. 25, 2020, with English translation.

* cited by examiner

| String | | | | | | | | | | | | | Label |
|---|---|---|---|---|---|---|---|---|---|---|---|---|---|
| K | y | o | t | o |   | A | q | u | a | r | i | u | m | 1 |
| M | u | s | e | u | m |   | o | f |   | A | r | t |   | O | s | a | k | a | 1 |
| 美 | 術 | 館 | | | | | | | | | | | 1 |
| 6 | 3 | h | | | | | | | | | | | 0 |
| 1 | 0 | : | 0 | 0 | A | M |   | t | o |   | 1 | 1 | : | 0 | 0 | P | M | 0 |
| E | v | a | c | u | a | t | i | o | n |   | A | r | e | a | 0 |
| 神 | 社 | | | | | | | | | | | | 2 |
| H | o | l | i | d | a | y |   | I | n | n | | | 2 |
| F | i | r | s | t |   | A | v | e | n | u | e | | 2 |

FIG. 6

| Location information | Position information |
|---|---|
| ABC | (X1, Y1) |
| XYZ | (X2, Y2) |
| DEF | (X3, Y3) |
| ⋮ | ⋮ |

FIG.15

| ID | Map representation data identifier | Coordinate information | Position information | Location information |
|---|---|---|---|---|
| 1 | Gojo-dori | $(x_{51}, y_{51})$ | (X51, Y51) | G01 |
| 2 | Gojo-dori | $(x_{52}, y_{52})$ | (X52, Y52) | G02 |
| 3 | Gojo-dori | $(x_{53}, y_{53})$ | (X53, Y53) | G03 |
| ⋮ | ⋮ | ⋮ | ⋮ | ⋮ |
| 38 | Sanjo-dori | $(x_{31}, y_{31})$ | (X31, Y31) | S01 |

FIG.16

| String | Coordinate information [x, y] | Location information flag |
|---|---|---|
| Takatsu post office | [3000, 1538] | |
| Kajigaya station | [3008, 1081] | |
| 2015 | [578, 695] | -1 |
| Kawasaki shimin plaza | [2521, 3597] | |
| Toranomon hospital branch | [1069, 1689] | |
| Cargo terminal | [882, 3585] | |

FIG.31

| String | Coordinate information [x, y] | Position information [Latitude, Longitude] |
|---|---|---|
| Takatsu post office | [3000, 1538] | [35.5918, 139.6053] |
| Kajigaya station | [3008, 1081] | [35.5937, 139.6054] |
| Kawasaki shimin plaza | [2521, 3597] | [35.5849, 139.6096] |
| Toranomon hospital branch | [1069, 1689] | [35.5891, 139.5993] |
| Cargo terminal | [882, 3585] | [26.2151, 127.6515] |

FIG.32

| Rotation | C1 | C2 | C3 |
|---|---|---|---|
| C2 | cos(-2),<br>sin(-2) | | |
| C3 | cos(-40),<br>sin(-40) | cos(-32),<br>sin(-32) | |
| C4 | cos(-24),<br>sin(-24) | cos(-1),<br>sin(-1) | cos(-26),<br>sin(-26) |

FIG.39

MAP REPRESENTATION DATA PROCESSING DEVICE, CORRESPONDENCE INFORMATION PRODUCTION METHOD, AND PROGRAM

CROSS-REFERENCE OF RELATED APPLICATIONS

This application is the U.S. National Phase under 35 U.S.C. § 371 of International Patent Application No. PCT/JP2020/024435, filed on Jun. 22, 2020, which in turn claims the benefit of Japanese Application No. 2019-117259, filed on Jun. 25, 2019, the entire disclosures of which Applications are incorporated by reference herein.

TECHNICAL FIELD

The present invention relates to, for example, a map representation data processing device that automatically acquires and outputs correspondence information that indicates correspondence between a location name and position information acquired from map representation data.

BACKGROUND ART

There is a conventional map information system with which users of one or more first terminal devices register a handwritten map created or prepared by themselves or a map such as an illustration map in a server device, and that can be used by users of one or more second terminal devices, wherein geographical information, which is information regarding objects such as landmarks, can be added to the map (see Patent Document 1).

CITATION LIST

Patent Document

Patent Document 1: JP 2011-158518A

SUMMARY OF INVENTION

Technical Problem

However, with the conventional technique, it is not possible to automatically acquire coordinate information and position information regarding location names or the like on map representation data such as a handwritten map or illustration map, in association with each other.

Solution to Problem

A map representation data processing device according to a first aspect of the present invention is a map representation data processing device including: a location dictionary storage unit that stores a location dictionary that contains one or more pieces of location position information each being information that associates location information that specifies a location and position information that specifies a position of the location with each other; a map representation data acceptance unit that accepts map representation data that is one or more types of maps of an illustration map, a handwritten map, and a sketch map; a character string acquisition unit that acquires a character string from the map representation data; a coordinate information acquisition unit that acquires coordinate information that is information that specifies a coordinate position corresponding to the character string acquired by the character string acquisition unit and is information that specifies a relative coordinate position in the map representation data; a position information acquisition unit that acquires position information corresponding to location information that is the character string acquired by the character string acquisition unit, using the location dictionary; and a correspondence output unit that outputs the coordinate information acquired by the coordinate information acquisition unit and the position information acquired by the position information acquisition unit in association with each other.

With such a configuration, it is possible to automatically acquire coordinate information and position information regarding a location name or the like on map representation data, in association with each other.

A map representation data processing device according to a second aspect of the present invention is the map representation data processing device according to the first aspect of the invention, wherein the character string acquisition unit acquires two or more character strings from the map representation data, the map representation data processing device further includes a classification unit that judges whether or not each of the two or more character strings acquired by the character string acquisition unit is a character string that specifies a location, and the correspondence output unit outputs coordinate information and position information corresponding to a character string judged by the classification unit as a character string that specifies a location, in association with each other.

With such a configuration, it is possible to extract a character string such as an appropriate location name on map representation data and automatically acquire coordinate information and position information regarding the location name or the like in association with each other.

A map representation data processing device according to a third aspect of the present invention is the map representation data processing device according to the second aspect of the invention, further including a learner storage unit that stores a learner acquired by providing a learning module for machine learning with two or more pieces of learning source information that contain a character string that contains two or more characters, and any label of two or more types of labels that are each a label regarding the number of appearances in a location dictionary, and executing the learning module, wherein the classification unit performs classification processing to judge whether each of the two or more character strings is location information or non-location information through a machine learning technique, using the two or more character strings acquired by the character string acquisition unit, and the learner, and the correspondence output unit outputs coordinate information and position information corresponding to a character string judged by the classification unit as location information, in association with each other.

With such a configuration, it is possible to accurately extract a character string such as an appropriate location name on map representation data and automatically acquire coordinate information and position information regarding the location name or the like in association with each other.

A map representation data processing device according to a fourth aspect of the present invention is the map representation data processing device according to any one of the first to third aspects of the invention, further including a feature spot detection unit that detects a feature spot that is a spot where a feature pattern that is a predetermined characteristic pattern is expressed, from the map representation data, wherein the coordinate information acquisition unit acquires coordinate information corresponding to the feature pattern, and the position information acquisition unit acquires position information corresponding to location information that is a character string corresponding to the feature pattern, using the location dictionary.

With such a configuration, it is possible to acquire a graphic feature point on map representation data and automatically acquire coordinate information and position information regarding the graphic feature point in association with each other.

A map representation data processing device according to a fifth aspect of the present invention is the map representation data processing device according to the fourth aspect of the invention, wherein the feature pattern is constituted by at least one kind of pattern of an intersection and a bridge.

With such a configuration, it is possible to acquire a location of an intersection or a bridge, which is a graphic feature point on map representation data, and automatically acquire coordinate information and position information regarding the location in association with each other.

A map representation data processing device according to a sixth aspect of the present invention is the map representation data processing device according to any one of the first to fifth aspects of the invention, wherein the character string acquisition unit acquires three or more character strings from the map representation data, the map representation data processing device further includes a grouping unit that determines two or more pieces of position information that indicate positions that are close enough to satisfy a predetermined condition, from among the three or more pieces of position information acquired by the position information acquisition unit, and the correspondence output unit outputs the two or more pieces of position information determined by the grouping unit and the two or more pieces of coordinate information acquired by the coordinate information acquisition unit, in association with each other.

With such a configuration, it is possible to extract a character string such as an appropriate location name on map representation data and automatically acquire coordinate information and position information regarding the location name or the like in association with each other.

A map representation data processing device according to a seventh aspect of the present invention is the map representation data processing device according to the sixth aspect of the invention, further including: an accurate map information storage unit that stores accurate map information that is map information that is accurate; a region specification information acquisition unit that acquires region specification information that specifies a region that includes positions indicated by the two or more pieces of position information determined by the grouping unit, and is included in the accurate map information; and an accurate map information output unit that outputs the accurate map information in a mode in which the region specified by the region specification information is discernable.

With such a configuration, it is possible to clarify the range of accurate map information corresponding to map representation data.

A map representation data processing device according to an eighth aspect of the present invention is the map representation data processing device according to the seventh aspect of the invention, wherein the region specification information acquisition unit includes: a first region specification information acquisition part that acquires first region specification information that specifies a first region that includes the positions indicated by the two or more pieces of position information determined by the grouping unit, and is a region in the accurate map information; an outer character string determination part that determines character strings corresponding to one or more pieces of position information that are located at outermost positions, of the pieces of position information acquired by the position information acquisition unit; a size information acquisition part that acquires size information regarding a size to corners of the map representation data outside the one or more character strings determined by the outer character string determination part; a distance information acquisition part that acquires distance information that specifies a distance corresponding to the size information acquired by the size information acquisition part, using two or more sets each including the coordinate information acquired by the coordinate information acquisition unit and the position information acquired by the position information acquisition unit; and a second region specification information acquisition part that acquires second region specification information that specifies a second region that is expanded from the first region specified by the first region specification information, using the distance information, and the accurate map information output unit outputs the accurate map information in a mode in which the region specified by the second region specification information is discernable.

With such a configuration, it is possible to clarify an appropriate range of accurate map information corresponding to map representation data.

A map representation data processing device according to a ninth aspect of the present invention is the map representation data processing device according to the seventh or the eighth aspect of the invention, wherein the region specification information or the second region specification information includes information regarding two points that are included in a rectangle, and the map representation data processing device further includes: a direction information acquisition unit that acquires direction information regarding a direction in the map representation data, using the region specification information or the second region specification information; and a direction information output unit that outputs the direction information.

With such a configuration, it is possible to acquire direction information regarding a direction in map representation data.

A map representation data processing device according to a tenth aspect of the present invention is the map representation data processing device according to any one of the first to fourth aspects of the invention, further including: a relationship information acquisition unit that acquires relationship information regarding a relationship between pieces of correspondence information that are sets of the pieces of coordinate information and the pieces of position information corresponding to the three or more character strings acquired by the character string acquisition unit; a correspondence information acquisition unit that acquires only two or more pieces of correspondence information corresponding to a piece of relationship information that satisfies a predetermined relationship, of the three or more pieces of correspondence information, using the relationship information; and a correspondence output unit that accumulates the two or more pieces of correspondence information acquired by the correspondence information acquisition unit.

With such a configuration, it is possible to automatically acquire appropriate correspondence information that associates coordinate information and position information regarding a location name or the like on map representation data with each other.

A map representation data processing device according to an eleventh aspect of the present invention is the map representation data processing device according to the tenth aspect of the invention, wherein the relationship information acquisition unit acquires relative relationship information between pieces of correspondence information respectively corresponding to two character strings of the three or more character strings acquired by the character string acquisition unit, for each set of two character strings, the correspondence information acquisition unit includes: a judging part that groups the three or more pieces of relationship information acquired by the relationship information acquisition unit, and determines a piece of relationship information that is not included in any of the groups; and a correspondence information acquisition part that excludes a piece of correspondence information corresponding to the piece of relationship information that is not included in the group from the pieces of correspondence information respectively corresponding to the three more character strings acquired by the character string acquisition unit, and only acquires the remaining two or more pieces of correspondence information.

With such a configuration, it is possible to automatically acquire appropriate correspondence information that associates coordinate information and position information regarding a location name or the like on map representation data with each other.

A map representation data processing device according to a twelfth aspect of the present invention is the map representation data processing device according to the tenth or eleventh aspect of the invention, wherein the relationship information acquisition unit acquires, for each set of two character strings, distance relationship information that is relationship information that indicates a relationship between a relative distance that is a difference between pieces of coordinate information regarding the two character strings and an absolute distance that is a difference between pieces of position information regarding the two character strings, and the correspondence information acquisition unit judges whether or not each of the three or more pieces of distance relationship information satisfies a predetermined relationship, excludes a piece of correspondence information corresponding to a piece of distance relationship information that does not satisfy the predetermined relationship from the pieces of correspondence information respectively corresponding to the three or more character strings acquired by the character string acquisition unit, and only acquires the remaining two or more pieces of correspondence information.

With such a configuration, it is possible to automatically acquire appropriate correspondence information that associates coordinate information and position information regarding a location name or the like on map representation data with each other.

A map representation data processing device according to a thirteenth aspect of the present invention is the map representation data processing device according to the twelfth aspect of the invention, further including: s scale acquisition unit that acquires a representative value of distance relationship information from the three or more pieces of relationship information, and acquires scale information regarding the map representation data, using the representative value of distance relationship information; and a scale information output unit that outputs the scale information.

With such a configuration, it is possible to automatically acquire appropriate correspondence information that associates coordinate information and position information regarding a location name or the like on map representation data with each other.

A map representation data processing device according to a fourteenth aspect of the present invention is the map representation data processing device according to the thirteenth aspect of the invention, further including: a region specification information acquisition unit that acquires relative vertical distances that are vertical distances between pieces of coordinate information corresponding to the character strings acquired by the character string acquisition unit and four sides of the map representation data, respectively, and acquires region specification information that specifies a range of the map representation data in a real world, using the relative vertical distances and the scale information; and a region specification information output unit that outputs the region specification information.

With such a configuration, it is possible to acquire a range in the real world supported by map representation data.

A map representation data processing device according to a fifteenth aspect of the present invention is the map representation data processing device according to the fourteenth aspect of the invention, further including: an additional location acquisition unit that acquires location information in a range indicated by the region specification information, from the location dictionary; an additional position acquisition unit that acquires position information corresponding to the location information, from the location dictionary; an additional coordinate acquisition unit that acquires coordinate information corresponding to the position information; and a location addition unit that places the location information at a position that is on the map representation data and is indicated by the coordinate information.

With such a configuration, it is possible to add new location information to map representation data.

A map representation data processing device according to a sixteenth aspect of the present invention is the map representation data processing device according to the tenth or eleventh aspect of the invention, wherein the relationship information acquisition unit acquires, for each set of two character strings, angle relationship information that is relationship information that indicates a relationship between a relative angle that is an angle acquired from pieces of coordinate information regarding the two character strings and an absolute angle that is an angle acquired from pieces of position information regarding the two character strings, and the correspondence information acquisition unit judges whether or not each of the three or more pieces of angle relationship information satisfies a predetermined relationship, excludes a piece of correspondence information corresponding to a piece of angle relationship information that does not satisfy the predetermined relationship from the pieces of correspondence information respectively corresponding to the three or more character strings acquired by the character string acquisition unit, and only acquires the remaining two or more pieces of correspondence information.

With such a configuration, it is possible to automatically acquire appropriate correspondence information that associates coordinate information and position information regarding a location name or the like on map representation data with each other.

A map representation data processing device according to a seventeenth aspect of the present invention is the map representation data processing device according to the sixteenth aspect of the invention, further including: a direction information acquisition unit that acquires a representative value of angle relationship information from the three or more pieces of angle relationship information, and acquires direction information that indicates a direction in the map representation data, using the representative value of angle relationship information; and a direction information output unit that outputs the direction information.

With such a configuration, it is possible to acquire direction information in map representation data.

A map representation data processing device according to an eighteenth aspect of the present invention is a map representation data including: a map representation data storage unit that stores map representation data; a correspondence information storage unit that stores two or more pieces of correspondence information that are each a set of coordinate information and position information output from the map representation data processing device according to any one of the first to seventeenth aspects; a current position information acquisition unit that acquires current position information that specifies a current position; a coordinate information acquisition unit that acquires coordinate information corresponding to the current position information, using the two or more pieces of correspondence information; a data forming unit that forms current position-added map representation data that is the map representation data on which a position indicated by the coordinate information is explicitly indicated; and a map representation data output unit that outputs the current position-added map representation data.

With such a configuration, it is possible to indicate the current position on map representation data, using two or more pieces of correspondence information that have been automatically acquired.

Advantageous Effects of Invention

As described above, with a map representation data processing device according to the present invention, it is possible to automatically acquire coordinate information and position information regarding a location name or the like on map representation data, in association with each other.

BRIEF DESCRIPTION OF DRAWINGS

FIG. 6 is a diagram showing an example of a learning source information according to the same.
FIG. 15 is a diagram showing an example of a location dictionary according to the same.
FIG. 16 is a diagram showing an example of a correspondence information management table according to the same.
FIG. 31 is a diagram showing an example of information that is acquired by the map representation data processing device E according to the same in the middle of processing.
FIG. 32 is a diagram showing an example of information that is acquired by the map representation data processing device E according to the same in the middle of processing.

FIG. 39 is a diagram showing an example of information that is acquired by the map representation data processing device E according to the same in the middle of processing.

DESCRIPTION OF EMBODIMENTS

Figure 1:
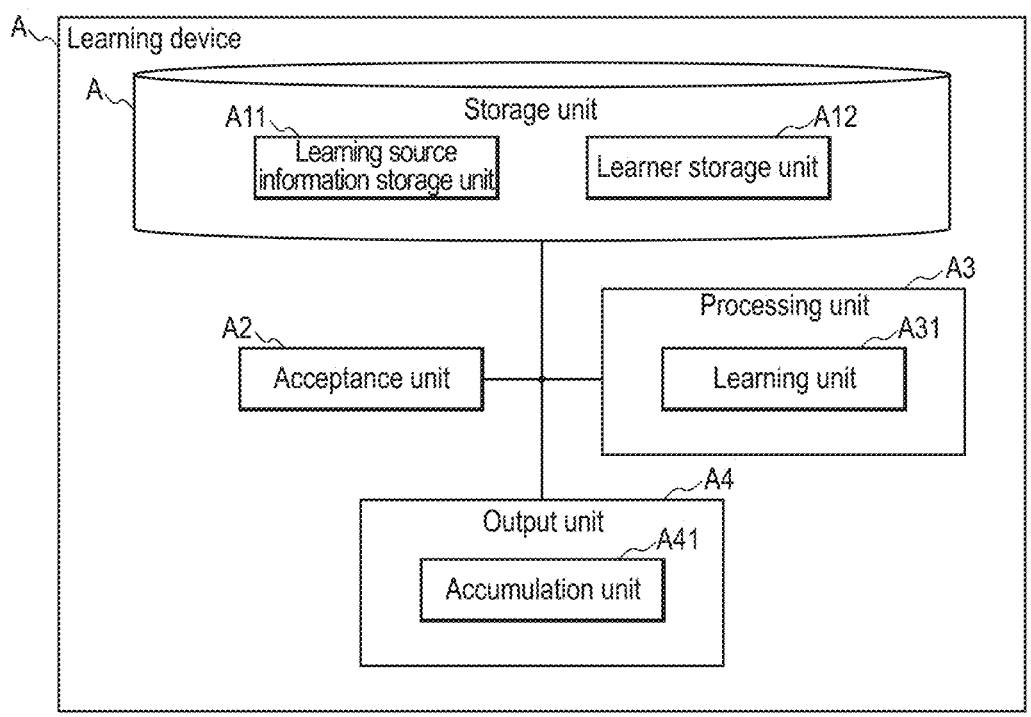
FIG. 1 is a block diagram for a learning device A according to Embodiment 1.

Hereinafter, embodiments of a map representation data processing device and so on will be described with reference to the drawings. Note that the constituent elements with the same reference numerals perform the same operations in the embodiments, and therefore redundant descriptions thereof may be omitted.

Embodiment 1

The present embodiment describes a learning device that forms a learner by learning two or more pieces of learning source information that each contains: a character string that contains two or more characters; and labels for classifying the character strings, using a machine learning technique. Note that a label is related to the number of appearances in a location dictionary, and is any label of two or two or more types of labels. It is preferable that a label indicates an occurrence frequency that is one of three types, namely 1, 0, and 2 or more. Note that using a machine learning technique means the same as using a machine learning algorithm.

The present embodiment also describes a learning device that forms a learning device by providing a character string to a learning module, one character at a time (providing a stream of a character string thereto), and causing the learning module to learn the character string.

Furthermore, the present embodiment describes a classification device that provides a character string to a classification module, using a learner formed by a learning device, and acquires a label corresponding to the character string. Note that the classification module may also be referred to as a prediction module.

Figure 2:
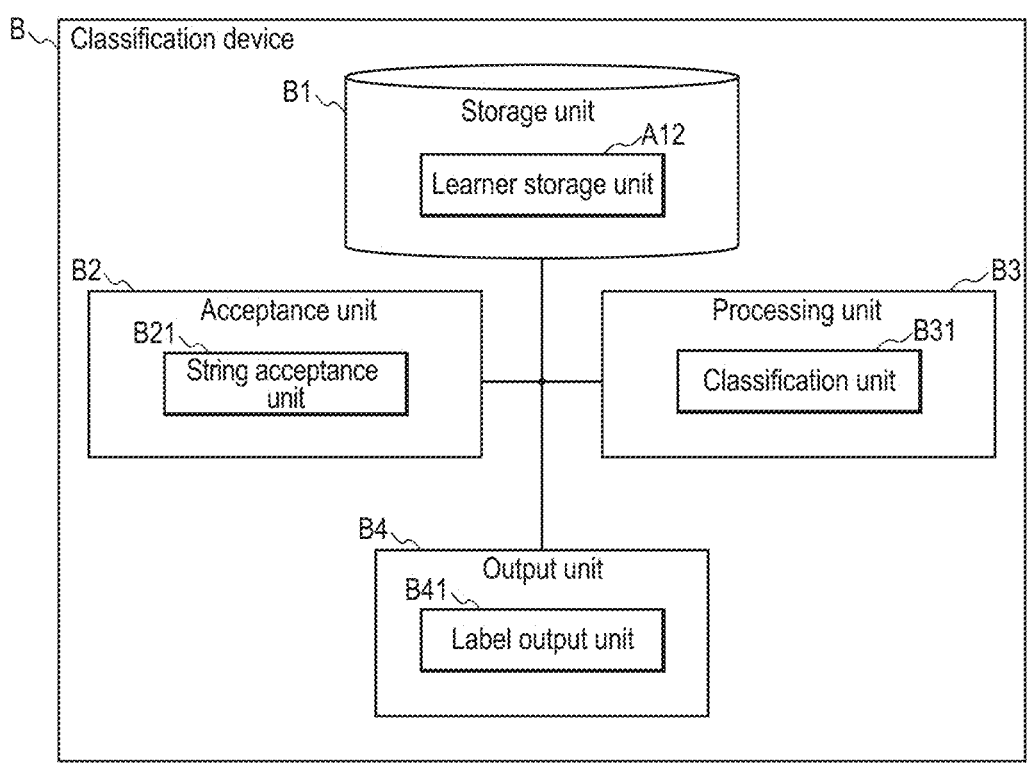
FIG. 2 is a block diagram for a classification device B.

FIG. 1 is a block diagram for a learning device A according to the present embodiment. FIG. 2 is a block diagram for a classification device B according to the present embodiment.

The learning device A includes a storage unit A1, an acceptance unit A2, a processing unit A3, and an output unit A4. The storage unit A1 includes a learning source information storage unit A11 and a learner storage unit A12. The processing unit A3 includes a learning unit A31. The output unit A4 includes an accumulation unit A41.

The classification device B includes a storage unit B1, an acceptance unit B2, a processing unit B3, and an output unit B4. The storage unit B1 includes the learner storage unit A12. The acceptance unit B2 includes a character string acceptance unit B21. The processing unit B3 includes a classification unit B31. The output unit B4 includes a label output unit B41.

The storage unit A1 included in the learning device A stores various kinds of information. Examples of various kinds of information include a learning source information described later, a learner described later, and a learning module. The learning module is a program for forming the learning unit A31, and a program for acquiring a learner. Examples of learning modules include functions in machine learning frameworks such as fastText, tinySVM, and TensorFlow, and various kinds of random forest functions and so on.

The learning source information storage unit A11 stores two or more pieces of learning source information. The learning source information is information that is to be learned. The learning source information includes character strings and labels. Each character string includes two or more characters. A label is information regarding the number of appearances in the location dictionary described later. Each label may have information regarding one of two or more kinds of labels.

It is preferable that each label is one of: a first label indicating that the number of appearances in the location dictionary is 1; a second label indicating that the number of appearances in the location dictionary is 0; or a third label indicating that the number of appearances in the location dictionary is 2 or more. That is to say, it is preferable that each label has one of three kinds of information.

The location dictionary is a dictionary regarding location names. The location dictionary contains, for example, two or more pieces of correspondence information that each contain a location name and position information that specifies the position of the location specified by the location name. The location name is, for example, the name of a location, the name of a landscape, the name of a specific location, the name of a prefecture, the name of a municipality, the name of a river, a mountain, a park, a scenic spot, or the like. The location dictionary contains, for example, two or more pieces of correspondence information that each contain a location name and description information regarding the location specified by the location name.

The learner storage unit A12 stores a learner. A learner may also be referred to as a classifier. A learner may also be referred to as a classification model, a prediction model, or the like. A learner is information that is acquired by a learning module that employs a machine learning technique. The machine learning technique may be deep learning, SVM, decision tree, random forest, or the like, and there is no limitation. It is preferable that the machine learning technique is, for example, a technique using a recurrent neural network (RNN). That is to say, it is preferable that the learner is an RNN.

The acceptance unit A2 accepts various kinds of information and instructions. Here, acceptance means acceptance of a user input, reception from an external device, or the like. It suffices if various information and instructions can be acquired through acceptance. Any input means, such as a touch panel, a keyboard, a mouse, a menu screen, or the like, may be employed to input various kinds of information and instructions.

The processing unit A3 performs various kinds of processing. Examples of various kinds of processing include processing that is performed by the learning unit A31.

The learning unit A31 performs learning processing through a machine learning technique, using two or more pieces of learning source information stored in the learning source information storage unit A11, to acquire a learner.

For example, the learning unit A31 sequentially provides a learning module for machine learning with characters that constitute character strings contained in the two or more pieces of learning source information stored in the learning source information storage unit A11, and also provides labels that are paired with the character strings, and executes the learning module to acquire a learner. Note that the processing through which characters that constitute a character string are sequentially provided to the learning module for machine learning may also be referred to as processing through which a stream of a character string is provided to the learning module for machine learning. That is to say, it may be said that the learning unit A31 learns streams of character strings contained in two or more pieces of learning source information. The learning module for machine learning is stored in the storage unit A1, for example.

Examples of available machine learning techniques for acquiring a learner include deep learning, SVR, random forest, decision tree, and so on. Examples of the learning module for machine learning include functions in machine learning frameworks such as fastText, tinySVM, and TensorFlow, and various kinds of random forest functions and so on.

The learner to be acquired by the learning unit A31 is information that is used to output a label when a character string is input to a classification module for machine learning. The learner to be acquired by the learning unit A31 is information that is used to output a label when characters that constitute a character string are sequentially input to a classification module for machine learning, one character at a time.

The learning unit A31 may be regarded as including a learning module or not including a learning module.

The output unit A4 outputs various kinds of information. Examples of various kinds of information include a learner. Here, "output" typically means accumulation on a recording medium, but may be regarded as a concept that includes displaying on a display device, projection with a projector, printing with a printer, sound output, transmission to an external device, delivery of processing results to another processing apparatus or another program, and so on.

The accumulation unit A41 accumulates the learner acquired by the learning unit A31. The accumulation unit A41 typically accumulates the learner acquired by the learning unit A31, in the learner storage unit A12. However, the accumulation unit A41 may transmit the learner acquired by the learning unit A31 to an external device (not shown).

The storage unit B1 included in the classification device B stores various kinds of information. Examples of various kinds of information include a learner, a classification module for machine learning, and map information.

The machine learning technique may be deep learning, SVM, decision tree, random forest, or the like, and there is no limitation. It is preferable that the machine learning technique is, for example, a technique using a recurrent neural network. The classification module is a program for classifying the accepted character strings, and examples thereof include functions in machine learning frameworks such as fastText, tinySVM, and TensorFlow, and various kinds of random forest functions and so on.

Map information is information regarding a map. Map information is map representation data, for example. Map representation data is information that represents a limited geographical region. It is preferable that map representation data is associated with a map identifier that identifies the map representation data. A map identifier is, for example, an ID, the file name of the file that contains map representation data, the name of the map representation data, or the like. Map representation data is, for example, an old map, an illustration map, a sketch map, a handwritten map, or the like, but there is no limitation on the type thereof. Map representation data typically is image data, but may be vector data or the like, and there is no limitation on the data structure thereof. Map representation data is associated with one or more attribute values. One or more attribute values are attribute values of map representation data. Attribute values are pieces of information that indicate characteristics and features of map representation data. The one or more attribute values associated with the map representation data each contain region specification information. Region specification information is information that specifies the region expressed by the map representation data. The region typically is rectangular, but may be a region that has a non-rectangular shape, such as a triangle, an octagon, a circle, or the like. The region expressed by map representation data may also be referred to as a region represented by map representation data. Region specification information is, for example, sets of (latitude, longitude). Region specification information is, for example, sets of information that indicates coordinates relative to a reference point. However, there is no limitation on the data structure of region specification information, and any information that specifies the region may be used.

One or more attribute values associated with map representation data are, for example, static attribute values, which are attribute values that are static. Alternatively, one or more attribute values associated with map representation data are, for example, dynamic attribute values, which are attribute values that change dynamically. The one or more attribute values may include one or more static attribute values and one or more dynamic attribute values. A static attribute value is, for example, the scale ratio of representation data that serves as a map (simply referred to as a "scale ratio" as appropriate), the actual area of the region on the map indicated by map representation data (simply referred to as an "area" as appropriate), or content information indicating the content of the map. Content information includes the degree of completion of the map representation data, the theme of the map representation data, metadata corresponding to the map representation data, keywords, and so on. Metadata and keywords are, for example, the type of map representation data, the names of landscapes and locations that are present in the region indicated by map representation data, and so on. Examples of types of map representation data include "theme park" indicating that the map is a theme park map, "tourist map" indicating that the map is for sightseeing, information indicating that the map is of a specific region (for example, a school), and so on. The one or more static attribute values may be, for example, a flag indicating that the position indicated by the position specification information is explicitly shown, and a flag indicating that the position indicated by the position specification information cannot be explicitly shown. Dynamic attribute values are, for example, the distance between the position indicated by position specification information and a location that is representative of the map representation data, and user action information regarding a user action performed on the map representation data.

Note that the location that is representative of map representation data is, for example, the center of gravity of the map representation data, a point at the edges of the map representation data, or a point that constitutes the boundary of the region of the map representation data.

It is preferable that map representation data is included in a file. However, map representation data can be data in a database, and there is no limitation on the data format thereof or management method therefor. When map representation data is included in a file, two or more pieces of map representation data may be included in the file. Also, one piece of map representation data may be realized as two or more files. That is to say, one piece of map representation data may be divided into two or more files.

The learner storage unit A12 included in the classification device B stores the learner accumulated by the learning device A.

The acceptance unit B2 accepts various kinds of information and instructions. Here, "acceptance" means, for example, acceptance of a user input, reception from an external device, or the like. It suffices if various information and instructions can be acquired through acceptance. Any input means, such as a touch panel, a keyboard, a mouse, a menu screen, or the like, may be employed to input various kinds of information and instructions.

The character string acceptance unit B21 accepts a character string. Here, "acceptance" is, for example, a concept that includes acceptance of information input from an input device such as a keyboard, a mouse, or a touch panel, reception of information transmitted via a wired or wireless communication line, and acceptance of information read out from a recording medium such as an optical disk, a magnetic disk, or a semiconductor memory.

The character string acceptance unit B21 performs character recognition processing on map information to acquire one or more character strings, for example.

The processing unit B3 performs various kinds of processing. Examples of various kinds of processing include processing that is performed by the classification unit B31.

Using the character string accepted by the acceptance unit B2 and the learner in the learner storage unit A12, the classification unit B31 acquires labels corresponding to the character strings through a machine learning technique.

For example, the classification unit B31 sequentially provides the two or more characters that constitute the character string accepted by the acceptance unit B2 to the classification module for machine learning, one character at a time, provides the learner in the learner storage unit A12 to the classification module, and executes the classification module to acquire labels.

Note that the classification unit B31 may be regarded as including a classification module or not including a classification module.

The output unit B4 outputs various kinds of information. Examples of various kinds of information include labels acquired by the classification unit B31.

The label output unit B41 outputs the labels acquired by the classification unit B31. Here, "output" may be regarded as a concept that includes accumulation on a recording medium, displaying on a display device, projection with a projector, printing with a printer, sound output, transmission to an external device, delivery of processing results to another processing apparatus or another program, and so on.

It is preferable that the storage unit A1, the learning source information storage unit A11, the learner storage unit A12, the storage unit B1, and the learner storage unit A12 are realized using a non-volatile recording medium, but they may be realized using a volatile recording medium.

There is no limitation on the process in which information is stored in the storage unit A1 and so on. For example, information may be stored in the storage unit A1 or the like via a recording medium, or information transmitted via a communication line or the like may be stored in the storage unit A1 or the like, or information input via an input device may be stored in the storage unit A1 or the like.

The acceptance unit A2, the acceptance unit B2, and the character string acceptance unit B21 can be realized using a device driver for the input means such as a touch panel or a keyboard, or control software or the like for controlling the menu screen.

The processing unit A3, the learning unit A31, the accumulation unit A41, the processing unit B3, and the classification unit B31 typically are realized using an MPU, a memory, and so on. The processing procedures performed by the processing unit A3 and so on typically are realized using software, and the software is recorded on a recording medium such as a ROM. However, such processing procedures may be realized using hardware (a dedicated circuit).

The output unit A4, the output unit B4, and the label output unit B41 may be regarded as including or not including an output device such as a display or a speaker. The output unit A4 and so on can be realized using the driver software of the output device, the driver software of the output device and the output device, or the like.

Figure 3:
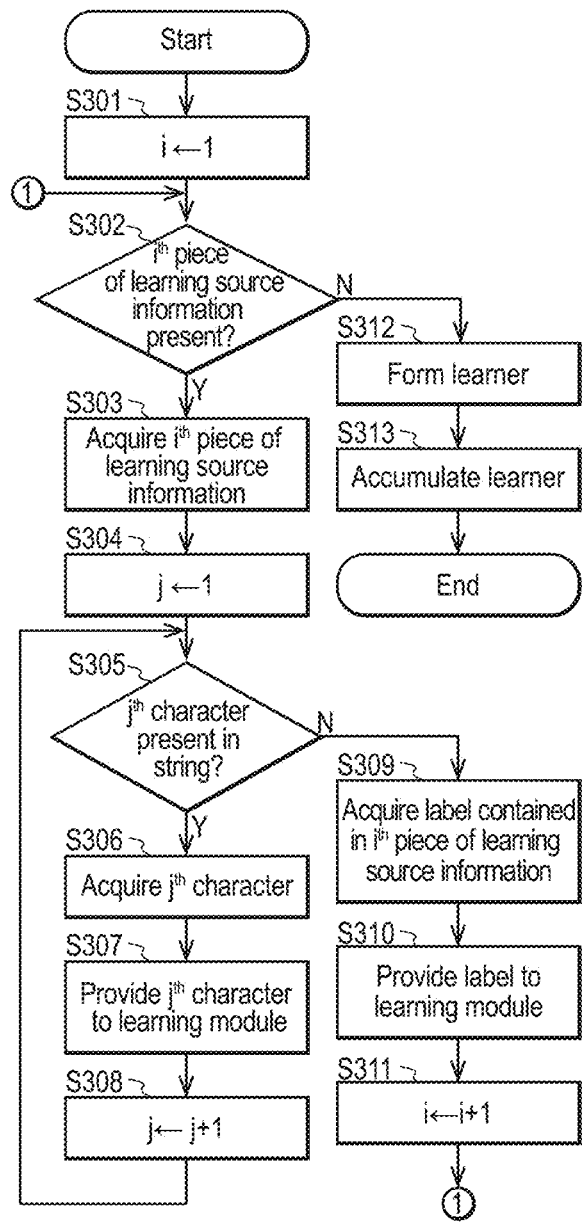
FIG. 3 is a flowchart illustrating examples of operations of the learning device A.

Next, examples of operations of the learning device A will be described with reference to the flowchart shown in FIG. 3.

(Step S301) The learning unit A31 substitutes 1 for a counter i.

(Step S302) The learning unit A31 judges whether or not the $i^{th}$ piece of learning source information is present in the learning source information storage unit A11. If the $i^{th}$ piece of learning source information is present, processing proceeds to step S303, and if the $i^{th}$ piece of learning source information is not present, processing proceeds to step S312.

(Step S303) The learning unit A31 acquires the $i^{th}$ piece of learning source information from the learning source information storage unit A11.

(Step S304) The learning unit A31 substitutes 1 for a counter j.

(Step S305) The learning unit A31 judges whether or not the $j^{th}$ character is present in the character string contained in the $i^{th}$ piece of learning source information acquired in step S303. If the $j^{th}$ character is present, processing proceeds to step S306, and if the $j^{th}$ character is not present, processing proceeds to step S309.

(Step S306) The learning unit A31 acquires the $j^{th}$ character in the character string contained in the $i^{th}$ piece of learning source information acquired in step S303.

(Step S307) The learning unit A31 provides the $j^{th}$ character acquired in step S306 to the learning module in the storage unit A1. Note that the processing performed to provide a character to the learning module is, for example, providing the character as an argument for the learning module that serves as a function or a method, providing the character to the learning module that serves as an execution module, or the like, so that the learning module can perform learning processing using the character, and a broad interpretation is applied.

(Step S308) The learning unit A31 increments the counter j by 1. Processing returns to step S305.

(Step S309) The learning unit A31 acquires the label contained in the $i^{th}$ piece of learning source information acquired in step S303.

(Step S310) The learning unit A31 provides the label acquired in step S309 to the learning module in the storage unit A1. Note that the processing performed to provide a label to the learning module is, for example, providing the label as an argument for the learning module that serves as a function or a method, providing the label to the learning module that serves as an execution module, or the like, so that the learning module can perform learning processing using the label, and a broad interpretation is applied.

(Step S311) The learning unit A31 increments the counter i by 1. Processing returns to step S302.

(Step S312) The learning unit A31 executes the learning module to which character streams and labels are provided, to acquire a learner.

(Step S313) The accumulation unit A41 accumulates the learner acquired in step S312, in the learner storage unit A12. Processing is terminated.

Next, examples of operations of the classification device B will be described with reference to the flowchart shown in FIG. 4.

(Step S401) The character string acceptance unit B21 judges whether or not a character string has been accepted. If a character string has been accepted, processing proceeds to step S402, and if a character string has not been accepted, processing returns to step S401.

(Step S402) The classification unit B31 substitutes 1 for the counter i.

(Step S403) The classification unit B31 judges whether or not the $i^{th}$ character is present in the character string accepted in step S401. If the $i^{th}$ character is present, processing proceeds to step S404, and if the $i^{th}$ character is not present, processing proceeds to step S407.

(Step S404) The classification unit B31 acquires the $i^{th}$ character in the character string accepted in step S401.

(Step S405) The classification unit B31 provides the $i^{th}$ character acquired in step S404 to the classification module in the storage unit B1. Note that the processing performed to provide a character to the classification module is, for example, providing the character as an argument for the classification module that serves as a function or a method, providing the character to the classification module that serves as an execution module, or the like, so that the classification module can perform classification processing using the character, and a broad interpretation is applied.

(Step S406) The classification unit B31 increments the counter i by 1. Processing returns to step S403.

(Step S407) The classification unit B31 provides the learner in the learner storage unit A12 to the classification module in the storage unit B1. Note that the processing performed to provide a learner to the classification module is, for example, providing the learner as an argument for the classification module that serves as a function or a method, providing the learner to the classification module that serves as an execution module, providing link information regarding a link to the learner as an argument for the classification module that serves as a function or a method, providing link information regarding a link to the learner to the classification module that serves as an execution module, or the like, so that the classification module can perform classification processing using the learner, and a broad interpretation is applied.

(Step S408) The classification unit B31 executes the classification module to acquire a label.

(Step S409) The label output unit B41 outputs the label acquired in step S408. Processing returns to step S401.

Figure 4:
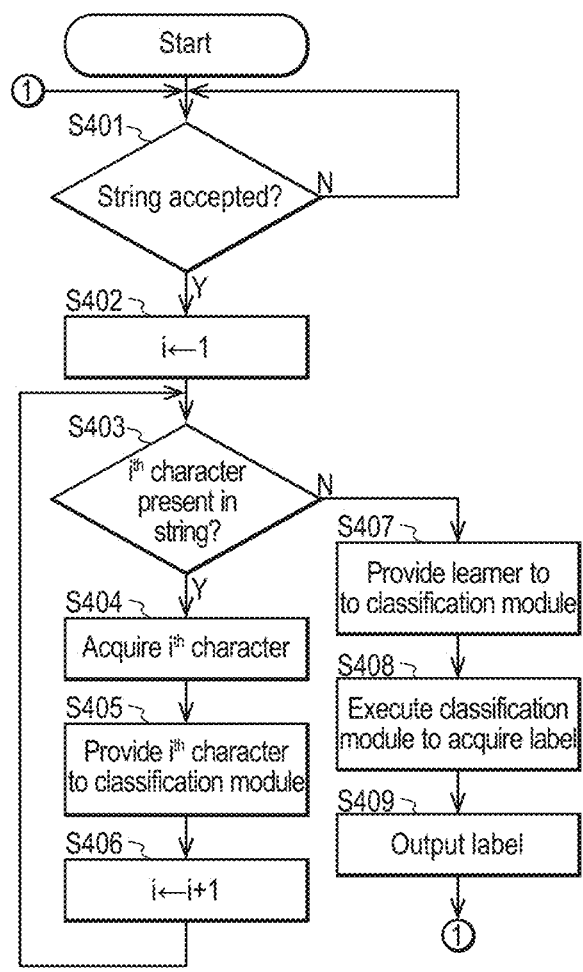
FIG. 4 is a flowchart illustrating examples of operations of the classification device B according to the same.

In the flowchart shown in FIG. 4, processing is terminated when power is turned off or an interruption is made to terminate the processing.

Figure 5:
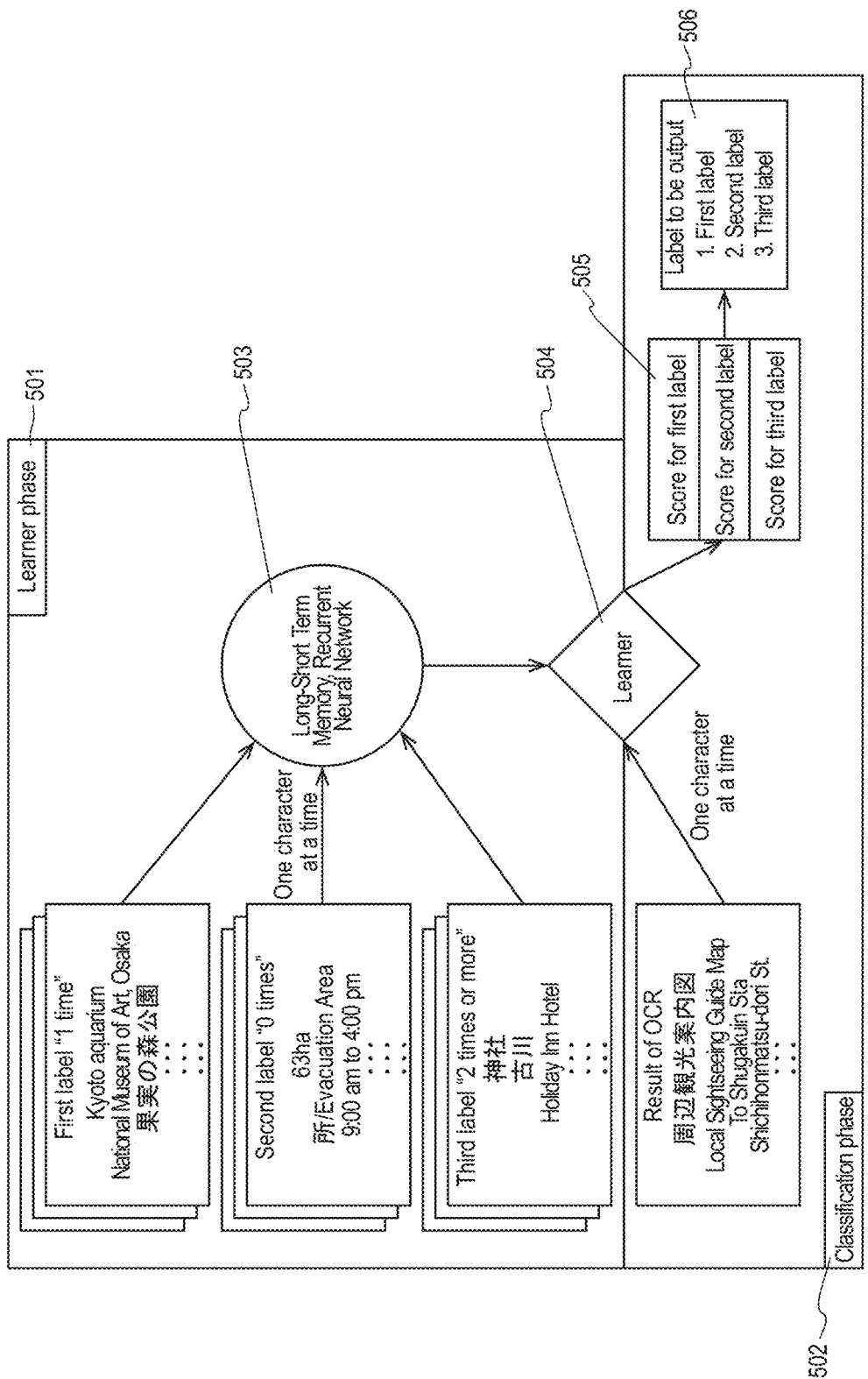
FIG. 5 is an illustration diagram for specific examples of operations of the learning device A and the classification device B according to the same.

The following describes specific examples of operations of the learning device A and the classification device B according to the present embodiment with reference to FIG. 5. The processing performed by learning device A is a learning phase 501. The processing performed by the classification device B is a classification phase 502.

It is assumed that the learning source information storage unit A11 in the learning device A stores many pieces of learning source information that have the structure shown in FIG. 6. In FIG. 6, learning source information includes character strings and labels. Each label is one of: the first label (the value is "1") indicating that the number of appearances in the location dictionary is 1; the second label (the value is "0") indicating that the number of appearances in the location dictionary is 0; or the third label (the value is "2") indicating that the number of appearances in the location dictionary is 2 or more.

In the learning phase 501, the learning device A provides many pieces of learning source information such as the learning source information shown in FIG. 6 to the learning module in the storage unit A1 to form a learner. Here, in the learning phase 501, the learning unit A31 sequentially provides the characters that constitute the character string contained in the learning source information to the learning module, one character at a time. Also, the learning unit A31 provides the labels contained the learning source information to the learning module. Thereafter, the learning unit A31 executes the learning module to acquire a learner. The accumulation unit A41 accumulates the learner 504 in the learner storage unit A12. Note that the learning module here is 503, for example, and is, for example, a module that employs a long short-term memory (LSTM) of recurrent neural networks.

Next, in the classification phase 502, the character string acceptance unit B21 in the classification device B performs character recognition processing on the map information in the storage unit B1 to acquire one or more character strings, for example. Note that the processing through which character recognition processing is performed on map information that is an image, to acquire one or more character strings, is a well-known technique, and therefore the detailed description thereof will be omitted.

For each of one or more character strings, the classification unit B31 sequentially provides the characters that constitute the character string to the classification module, and provides the learner 504 to the classification module, executes the classification module, and acquires scores respectively corresponding to the first label, the second label, and the third label, for each character string (505). Next, the classification unit B31 acquires the label with the highest score. Next, the label output unit B41 outputs the label with the highest score in association with the character string (506).

As described above, according to the present embodiment, it is possible to acquire a learner for appropriately classifying pieces of information regarding location names.

Also, according to the present embodiment, it is possible to appropriately classify pieces of information regarding location names.

Note that the processing in the present embodiment may be realized using software. This software may be distributed through software downloading or the like. Also, this software may be recorded on a recording medium such as a CD-ROM and distributed. Note that the same applies to the other embodiments in the present description. The software that realizes the learning device A in the present embodiment is the program described below. That is to say, the program is a program that enables a computer that can access a learning source information storage unit that stores two or more pieces of learning source information that contain character strings that each contain two or more characters and any one label of two or more types of labels that are labels regarding the number of appearances in a location dictionary, to function as: a learning unit that sequentially provides the characters that constitute the character strings contained in the two or more pieces of learning source information stored in the learning source information storage unit, to a learning module for machine learning, one character at a time, provides labels that are paired with the character strings, to the learning module, and executes the learning module to acquire a learner; and an accumulation unit that accumulates the learner.

The software that realizes the classification device B in the present embodiment is the program described below. That is to say, the program is a program that enables a computer that can access a learner storage unit that stores a learner accumulated by the learning device A, to function as: a character string acceptance unit that accepts a character string; a classification unit that sequentially provides two or more characters that constitute the character string to a classification module for machine learning, one character at a time, provides the learner to the classification module, and executes the classification module to acquire a label; and a label output unit that outputs the label.

Embodiment 2

The present embodiment describes a map representation data processing device that acquires one or more character strings from map representation data, acquires pieces of position information (latitude, longitude) that are respectively paired with the one or more character strings, acquires pieces of coordinate information regarding the one or more character strings on the map representation data, and accumulates the pieces of coordinate information regarding the one or more character strings and the pieces of position information in association with each other.

The present embodiment also describes a map representation data processing device that determines an appropriate character string from one or more character strings acquired from map representation data, and accumulates coordinate information and position information that only correspond to the appropriate character string, in association with each other. It is preferable that the learner acquired by the learning device A described in Embodiment 1 is used for the processing performed to determine an appropriate character string. Furthermore, it is preferable that the classification processing performed in the classification device B described in Embodiment 1 is used for the processing performed to determine an appropriate character string.

Also, the present embodiment describes a map information generation device that acquires one or more graphic feature spots such as intersections from map representation data, acquires pieces of position information that are respectively paired with the one or more graphic feature spots, acquires pieces of coordinate information respectively corresponding to the one or more graphic feature spots, and accumulates the pieces of coordinate information and the pieces of position information regarding the one or more graphic feature spots in association with each other. It is preferable that the graphic feature spots are constituted by one or more kinds of graphic feature spots that are intersections or bridges.

Also, the present embodiment describes a map representation data processing device that acquires two or more character strings from map representation data, acquires a set of pieces of position information that are close enough so that the pieces of position information respectively paired with the two or more character strings satisfy a predetermined condition, and accumulates coordinate information and position information that only correspond to a character string corresponding to the set of pieces of position information thus acquired, in association with each other.

The present embodiment also describes a map representation data processing device that determines a region in accurate map information that corresponds to a region in map representation data. In such a case, it is preferable to determine region in accurate map information considering an outer region of the map representation data where no character string is present.

Furthermore, the present embodiment describes a map representation data processing device that acquires direction information regarding map representation data.

Figure 7:
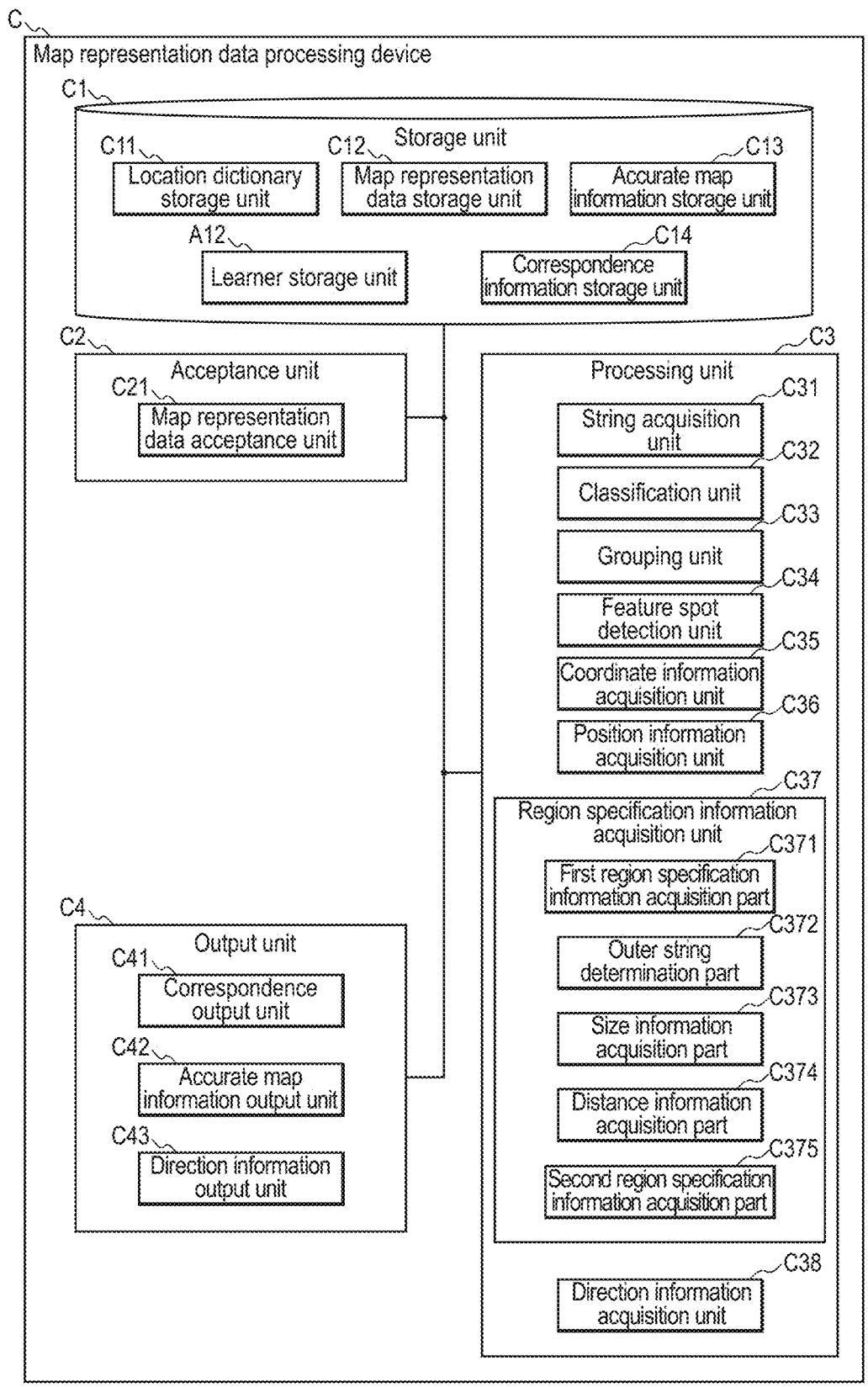
FIG. 7 is a block diagram for a map representation data processing device C according to Embodiment 2.

FIG. 7 is a block diagram for a map representation data processing device C according to the present embodiment. The map representation data processing device C includes a storage unit C1, an acceptance unit C2, a processing unit C3, and an output unit C4.

The storage unit C1 includes a location dictionary storage unit C11, a map representation data storage unit C12, an accurate map information storage unit C13, a learner storage unit A12, and a correspondence information storage unit C14. The acceptance unit C2 includes a map representation data acceptance unit C21. The processing unit C3 includes a character string acquisition unit C31, a classification unit C32, a grouping unit C33, a feature spot detection unit C34, a coordinate information acquisition unit C35, a position information acquisition unit C36, a region specification information acquisition unit C37, and a direction information acquisition unit C38. The region specification information acquisition unit C37 includes, for example, a first region specification information acquisition part C371, an outer character string determination part C372, a size information acquisition part C373, a distance information acquisition part C374, and a second region specification information acquisition part C375. The output unit C4 includes a correspondence output unit C41, an accurate map information output unit C42, and a direction information output unit C43.

The storage unit C1 stores various kinds of information. Examples of various kinds of information include a location dictionary described later, map representation data described later, accurate map information described later, a learner, correspondence information described later, and a classification module. Note that the storage unit C1 need not necessarily include a location dictionary storage unit C11.

The location dictionary storage unit C11 may be located in an external device (not shown).

The location dictionary storage unit C11 stores a location dictionary. The location dictionary contains one or more pieces of location position information. Location position information is information that associates location information that specifies a location and position information that specifies the position of the location with each other. Location position information is, for example, information that contains location information and position information. Location position information is, for example, information that contains a pointer to location information and a pointer to position information. However, there is no limitation on the data structure of location position information.

Location information is, for example, a location name or an ID that specifies a location. The location name is, for example, the name of a location, the name of a landscape, the name of a specific location, the name of a prefecture, the name of a municipality, the name of a river, a mountain, a park, a scenic spot, the name of an intersection, or the like. Position information is (latitude, longitude), for example, but may have a different data format. Note that an ID that specifies a location typically is associated with a location name.

The map representation data storage unit C12 stores one or more pieces of map representation data. Map representation data is data that represents a map. Map representation data is information that represents a limited geographical region. Map representation data is not the accurate map information described later. Map representation data is, for example, data that lacks accuracy as a map. Map representation data is, for example, an old map, an illustration map, a sketch map, a handwritten map, or the like, but there is no limitation on the type thereof. It is preferable that map representation data is associated with a map identifier that identifies the map representation data. A map identifier is, for example, an ID, the file name of the file that contains map representation data, the name of the map representation data, or the like.

The map representation data typically is image data, but may be vector data or the like, and there is no limitation on the data structure thereof. Map representation data may include a character string of location information. When map representation data is image data or vector data, map representation data typically is data that expresses location information. It is preferable that map representation data is included in a file. Map representation data may be a file. However, map representation data can be data in a database, and there is no limitation on the data format thereof or management method therefor. When map representation data is included in a file, two or more pieces of map representation data may be included in the file. Also, one piece of map representation data may be realized as two or more files. That is to say, one piece of map representation data may be divided into two or more files. Needless to say, map representation data may be a single file.

The accurate map information storage unit C13 stores accurate map information. Accurate map information is accurate electronic map information. There is no limitation on the type of the map represented by accurate map information or the data format of map information. Examples of the type of the map include a contour map, a topographical map, a geological map, a land use map, a residential map, a route map, a road map, a guide map, an aerial photograph, a satellite photograph, and so on. Examples of data formats of accurate map information include raster data, vector data, KIWI format, and so on.

The learner storage unit A12 stores one or more learners. It is preferable that the learners in the learner storage unit A12 are learners acquired by the learning device A. In such a case, as described above, each learner is information acquired by sequentially providing two or more pieces of learning source information that contain a character string that contains two or more characters and a label of two or more kinds of labels that are labels regarding the number of appearances in a location dictionary, to a learning module for machine learning, and executing the learning module. Note that each learner need not necessarily be a learner acquired by the learning device A, and may be a learner acquired by learning one or more positive examples that are pieces of location name information and one or more negative examples that are not pieces of location name information, using a machine learning technique.

The correspondence information storage unit C14 stores one or more pieces of correspondence information. Correspondence information is information that indicates correspondence between coordinate information and position information. Correspondence information may be an information set of coordinate information and position information. Correspondence information may also be an information set of a pointer to coordinate information and a pointer to position information. Correspondence information may be associated with location name information, or contain location information. There is no limitation on the data structure of correspondence information. It is preferable that correspondence information is associated with a map representation data identifier that identifies map representation data.

The acceptance unit C2 accepts various kinds of information and instructions. Examples of various kinds of information include map representation data, an operation start instruction, and an output instruction. An operation start instruction is an instruction to start an operation that is performed by the map representation data processing device C to acquire correspondence information. An output instruction is an instruction to output map representation data or the like. An output instruction contains, for example, a map representation data identifier that identifies map representation data.

Here, "acceptance" means, for example, acceptance of a user input, reception from an external device (for example, a terminal device, which is not shown in the drawings), or the like. It suffices if various information and instructions can be acquired through acceptance. Any input means, such as a touch panel, a keyboard, a mouse, a menu screen, or the like, may be employed to input various kinds of information and instructions.

The map representation data acceptance unit C21 accepts map representation data. Here, "acceptance" is a concept that includes acceptance of information input from an input device such as a keyboard, a mouse, or a touch panel, reception of information transmitted via a wired or wireless communication line, and acceptance of information read out from a recording medium such as an optical disk, a magnetic disk, or a semiconductor memory. That is to say, the map representation data acceptance unit C21 may read out map representation data from the map representation data storage unit C12.

The processing unit C3 performs various kinds of processing. Examples of the various kinds of processing include processing that is performed by the character string acquisition unit C31, the classification unit C32, the grouping unit C33, the feature spot detection unit C34, the coordinate information acquisition unit C35, the position information acquisition unit C36, the region specification information acquisition unit C37, the direction information acquisition unit C38, the first region specification information acquisition part C371, the outer character string determination part C372, the size information acquisition part C373, the distance information acquisition part C374, and the second region specification information acquisition part C375.

The character string acquisition unit C31 acquires one or more character strings from the map representation data accepted by the map representation data acceptance unit C21. It is preferable that the character string acquisition unit C31 acquires three or more character strings from the map representation data. For example, the character string acquisition unit C31 acquires one or more character strings from the map representation data through character recognition processing. Note that character recognition processing is a well-known technique, and therefore the detailed description thereof will be omitted. For example, the character string acquisition unit C31 acquires one or more character strings that are included in map representation data.

The classification unit C32 judges whether or not each of the one or more character strings acquired by the character string acquisition unit C31 is a character string that specifies a location.

For example, the classification unit C32 judges whether or not each of the one or more character strings acquired by the character string acquisition unit C31 is a character string that specifies a location that is to be registered. A character string that specifies a location that is to be registered is, for example, location information or unique location information.

The classification unit C32 performs, for example, classification processing on each of the two or more character strings, to determine the character string is location information or non-location information, through a machine learning technique, using the one or more character strings acquired by the character string acquisition unit C31 and the learners.

For example, the classification unit C32 performs learning processing through a machine learning technique, using character strings that are one or more pieces of location information, as positive examples, and character strings that are one or more pieces of non-location information, as negative examples, and performs processing to determine whether each of the one or more character strings acquired by the character string acquisition unit C31 is location information or non-location information, using the acquired learner.

Note that, as described above, the machine learning technique may be deep learning, SVM, decision tree, random forest, or the like, and there is no limitation. Examples of the learning module that performs learning processing to form a learner include functions in machine learning frameworks such as fastText, tinySVM, and TensorFlow, and various kinds of random forest functions and so on. Examples of the classification module that performs determination processing performed by the classification unit C32 include functions in machine learning frameworks such as fastText, tinySVM, and TensorFlow, and various kinds of random forest functions and so on.

It is preferable that the classification unit C32 performs the same processing as the classification unit B31 to acquire labels respectively corresponding to the one or more character strings acquired by the character string acquisition unit C31. In such a case, the classification unit C32 sequentially provides the two or more characters that constitute the character string accepted by the character string acquisition unit C31 to the classification module for machine learning, one character at a time, provides the learner in the learner storage unit A12 to the classification module, and executes the classification module to acquire labels.

It is preferable that the classification unit C32 only judges that character strings corresponding to the first label are character strings that specify locations, for example. Alternatively, the classification unit C32 may determine character strings that correspond to the first label and the third label as character string that specify locations.

The grouping unit C33 determines two or more pieces of position information that indicate positions that are close enough to satisfy a predetermined condition, from among the three or more pieces of position information acquired by the position information acquisition unit C36. That is to say, the grouping unit C33 performs processing to exclude position information regarding positions that would not be located in the map representation data. Note that the one or more pieces of position information regarding the locations that is considered as not being located in the map representation data are pieces of information that indicate locations that are far enough to satisfy a predetermined condition with respect to the other pieces of location information acquired by the position information acquisition unit C36.

The processing performed by the grouping unit C33 is either one of the following two kinds of processing, for example.

(1) Processing using Representative Position Information

For example, the grouping unit C33 determines representative position information that is position information representative of the three or more pieces of position information acquired by the position information acquisition unit C36. Representative position information typically is a piece of position information that indicates a central position of the three or more pieces of position information acquired by the position information acquisition unit C36.

Next, for example, the grouping unit C33 calculates the distance between each piece of position information other than the representative position information and the representative position information, and acquires position information that is other than the representative position information and indicates a distance that is close enough to satisfy a predetermined condition. Such one or more pieces of position information and the representative position information are the pieces of position information determined by the grouping unit C33. Note that the pieces of position information not acquired at this time are pieces of excluded position information.

Note that examples of the method for acquiring representative position information are (1-1) or (1-2) or (1-3) or (1-4) shown below.

(1-1) For example, the grouping unit C33 calculates three or more combinations of distances for two pieces of position information of the three or more pieces of position information acquired by the position information acquisition unit C36, and acquires two pieces of representative position information that indicate the shortest-distance set that is the set of two pieces of position information corresponding to the shortest distance of the three or more combinations of distances.

(1-2) The grouping unit C33 acquires either one piece information of the shortest-distance set acquired in (1-1) above as representative position information.

(1-3) The grouping unit C33 may acquire the center of gravity of the region that includes the three or more pieces of position information acquired by the position information acquisition unit C36 as representative position information.

(1-4) The grouping unit C33 may acquire a piece of position information regarding the position that is closest to the center of gravity of the region that includes the three or more pieces of position information acquired by the position information acquisition unit C36 as representative position information.

Note that the representative position information acquisition algorithm is not limited to (1-1) to (1-4) above.

(2) Clustering Processing

For example, the grouping unit C33 performs position information clustering processing, using the three or more pieces of position information acquired by the position information acquisition unit C36. Thereafter, the grouping unit C33 acquires the two or more pieces of position information acquired through clustering processing. Note that clustering processing is a well-known technique, and therefore the detailed description thereof will be omitted.

Note that pieces of correspondence information corresponding to the pieces of position information determined by the grouping unit C33 are to be accumulated. Correspondence information corresponding to position information is, for example, correspondence information that includes the position information, or correspondence information that includes a pointer to the position information.

The feature spot detection unit C34 detects feature spots that are spots where feature patterns that are predetermined characteristic patterns are expressed, from map representation data. For example, the feature spot detection unit C34 detects feature spots that are spots where feature patterns that are predetermined characteristic patterns are expressed, from map representation data, using an image recognition technique. It is preferable that the feature patterns are constituted by at least one kind of pattern of an intersection and a bridge.

For example, feature patterns of intersections, bridges, or the like are stored in the storage unit C1, and the feature spot detection unit C34, for example, cuts out a region that matches the size of the feature pattern from map representation data while shifting the starting pixel in the map representation data, calculates the degree of similarity between the cut out region and the feature patterns in the storage unit C1, and detects a region with a degree of similarity that is no less than a threshold value, as a feature spot.

Also, for example, the feature spot detection unit C34 performs object recognition processing regarding feature patterns on the map representation data to detect a feature spot. Note that object recognition processing is a well-known technique, and therefore the detailed description thereof will be omitted.

The coordinate information acquisition unit C35 acquires coordinate information (typically, (x,y)) that is information that specifies a coordinate position corresponding to the character string acquired by the character string acquisition unit C31, and that specifies a relative coordinate position in map representation data. A coordinate position corresponding to the character string is coordinate position of a point that is representative of the region of the character string in the map representation data, and is a representative point of the character string. Examples of representative points include the center point of the region of the character string in the map representation data, the upper left point of the region of the character string in the map representation data, the lower right point of the region of the character string in the map representation data, and so on. That is to say, the coordinate position corresponding to the character string acquired by the character string acquisition unit C31 may be the coordinate position of the center point of the region in which the character string is located, the coordinate position of the upper left corner spot of the region in which the character string is located, the coordinate position of the lower right corner spot of the region in which the character string is located, or the like.

The coordinate information acquisition unit C35 may acquire coordinate information that specifies a coordinate position corresponding to the character string corresponding to the position information determined by the grouping unit C33, of the character strings acquired by the character string acquisition unit C31. Even in such a case, it can be said that the coordinate information acquisition unit C35 acquires coordinate information that specifies the coordinate position corresponding to the character string acquired by the character string acquisition unit C31.

The coordinate information acquisition unit C35 acquires coordinate information corresponding to a feature pattern. The coordinate information acquisition unit C35 acquires information regarding the coordinates of the representative point in the region of the feature pattern detected by the feature spot detection unit C34.

The coordinate information acquisition unit C35 acquires, for example, the coordinate position of the center of gravity of the region of the feature pattern detected by the feature spot detection unit C34, as a feature spot. Alternatively, the coordinate information acquisition unit C35 acquires, for example, the coordinate position of the upper left point of the region of the feature pattern in the map representation data, as a feature spot. Alternatively, the coordinate information acquisition unit C35 acquires, for example, the coordinate position of the lower right point of the region of the feature pattern in the map representation data, as a feature spot.

The position information acquisition unit C36 acquires the position information corresponding to the location information that is the character string acquired by the character string acquisition unit C31, using the location dictionary. The position information acquisition unit C36 acquires the position information paired with the location information that is the character string acquired by the character string acquisition unit C31, from the location dictionary. Note that to acquire position information using the location dictionary typically is to acquire position information from the location dictionary.

For example, the position information acquisition unit C36 acquires the position information corresponding to the location information that is the character string corresponding to the feature pattern, from the location dictionary. The character string corresponding to the feature pattern is, for example, a character string that is located at a position closest to the feature pattern. The character string corresponding to the feature pattern is, for example, a character string (for example, "ABC intersection") that is a combination of a character string that is located at a position closest to the feature pattern (for example, "ABC") and the name of the feature pattern (for example, "intersection"). That is to say, the position information acquisition unit C36 acquires a character string that is located at a position closest to the feature pattern and is a character string that is located on the map representation data (for example, "ABC"), reads out the name of the feature pattern "for example "intersection") from the storage unit C1, combines these two character strings to acquire a character string (for example, "ABC intersection"), and acquires position information that is paired with the character string (for example, "ABC intersection") from the location dictionary storage unit C11. Note that the position information acquisition unit C36 may acquire position information from a location dictionary storage unit C11 that is located in an external device (not shown).

For example, the position information acquisition unit C36 reads out a character string (for example, "intersection") corresponding to the feature pattern from the storage unit C1, acquires a character string that contains the character string and is located at a position closest to the feature pattern, and acquires position information corresponding to the character string from the location dictionary storage unit C11.

The region specification information acquisition unit C37 acquires region specification information that specifies a region that includes the positions indicated by the two or more pieces of position information determined by the grouping unit C33, and is a region in the accurate map information.

The region specification information acquisition unit C37 may acquire region specification information that specifies a region that includes the positions indicated by the two or more pieces of position information acquired by the position information acquisition unit C36, and is a region in the accurate map information.

The region specification information acquisition unit C37 acquires the region specification information through processing that is performed by, for example, the first region specification information acquisition part C371, the outer character string determination part C372, the size information acquisition part C373, the distance information acquisition part C374, and the second region specification information acquisition part C375.

The first region specification information acquisition part C371 acquires first region specification information that specifies a first region that includes the positions indicated by the two or more pieces of position information determined by the grouping unit C33, and is a region in the accurate map information. The first region specification information is, for example, position information regarding two points that specify a rectangle. However, the region specified by first region specification information need not necessarily be a rectangle, and may be a polygon, a circle, or the like.

It is preferable that the first region specification information acquisition part C371 acquires first region specification information that specifies a first region that is a rectangular region that includes all the positions indicated by the two or more pieces of position information determined by the grouping unit C33.

It is preferable that the first region specification information acquisition part C371 acquires first region specification information that specifies a first region that is a rectangular region that includes all the positions indicated by the two or more pieces of position information determined by the grouping unit C33, and has the smallest area.

The outer character string determination part C372 determines character strings corresponding to one or more pieces of position information that are located at the outermost positions, of the pieces of position information acquired by the position information acquisition unit C36. It is preferable that the outer character string determination part C372 determines character strings corresponding to four pieces of position information that are located at the outermost positions in four directions (up, down, left, and right on the map representation data). The pieces of position information acquired by the position information acquisition unit C36 need not necessarily be all the pieces of position information acquired by the position information acquisition unit C36. The position information acquired by the position information acquisition unit C36 may be position information determined by the position information acquisition unit C33.

The size information acquisition part C373 acquires size information that specifies the size to the corners of the map representation data outside the one or more character strings determined by the outer character string determination part C372. Note that size information is, for example, the number of pixels. Size information is, for example, a size on coordinates.

The distance information acquisition part C374 acquires distance information that specifies a distance corresponding to the size information acquired by the size information acquisition part C373, using two or more sets each consisting of the coordinate information acquired by the coordinate information acquisition unit C35 and the position information acquired by the position information acquisition unit C36. Distance information is information (in formation in units of m, km, or the like) that specifies the actual distance, or the distance in the real world.

The distance information acquisition part C374 acquires unit information (for example, m/pixel) that is information regarding a distance (for example, information in units of m) in a unit amount of coordinate information (for example, per pixel), using, for example, two or more sets each consisting of the coordinate information (for example, $(x_1,y_1)$ and $(x_2,y_2)$) acquired by the coordinate information acquisition unit C35 and the position information (for example, (X1,Y1) and (X2,Y2)) acquired by the position information acquisition unit C36. That is to say, for example, the distance information acquisition part C374 calculates the number of pixels A between $(x_1,y_1)$ and $(x_2,y_2)$ and the distance B between (X1,Y1) and (X2,Y2), and acquires unit information using the calculation formula "unit information=distance B divided by the number of pixels A". Thereafter, the distance information acquisition part C374 acquires distance information by, for example, multiplying the size information (for example, the number of pixels) acquired by the size information acquisition part C373 and the unit information (for example, the distance per pixel). It is preferable that the distance information acquisition part C374 acquires distance information in four directions, for example.

The second region specification information acquisition part C375 acquires second region specification information that specifies a second region that is expanded from the first region specified by the first region specification information, using the distance information acquired by the distance information acquisition part C374. For example, the second region specification information acquisition part C375 acquires second region specification information that specifies a second region that is the region expanded from the first region specification information by the pieces of distance information regarding the four directions, in the respective directions. The second region specification information is, for example, position information regarding two points that specify a rectangle. However, the region specified by first region specification information need not necessarily be a rectangle, and may be a polygon, a circle, or the like.

The direction information acquisition unit C38 acquires direction information regarding directions in the map representation data, using region specification information or second region specification information. It is preferable that, when region specification information or second region specification information indicates a rectangle, the direction information acquisition unit C38 acquires direction information regarding an angle formed by the rectangular figure indicated by the region specification information or the second region specification information and a reference angle (for example, true north). Direction information is, for example, an angle from true north (information from 0 degrees to 360 degrees, or from 180 degrees to 180 degrees). Note that direction information is, for example, information that specifies the direction of true north in map representation data (for example, a vector), or information that indicates the direction directly upward from the center of the map representation data. The information indicating the direction directly upward from the center of the map representation data is, for example, "0 degrees" when the direction directly upward from the center is true north, and "−90 degrees" or "270 degrees" when the direction directly upward from the center is true east.

For example, the direction information acquisition unit C38 acquires a pair from the pieces of position information regarding the two or more locations acquired by the position information acquisition unit C36, and calculates a first angle that is an actual angle to the reference direction (for example, north) regarding the two positions from the two pieces of position information of the pair. The direction information acquisition unit C38 acquires, for example, the coordinate information regarding the pair acquired by the coordinate information acquisition unit C35. Next, the direction information acquisition unit C38 calculates a second angle that is an angle in map representation data, from the two pieces of coordinate information. Next, the direction information acquisition unit C38 acquires direction information regarding the direction in the map representation data, using the first angle and the second angle. When the first angle is "0 degrees (the two locations are in the relationship of true north and true south) and the second angle is "90 degrees" (the y-axis values of the coordinate information regarding the two points are the same), the direction information acquisition unit C38 acquires direction information "90 degrees".

For example, when the positional relationship indicated by the pieces of location information of the pair regarding a location 1 and a location 2 indicates true north, the first angle between the location 1 and the location 2 is calculated as 0 degrees. The direction information acquisition unit C38 acquires, for example, the coordinate information regarding the pair acquired by the coordinate information acquisition unit C35. Next, the direction information acquisition unit C38 acquires direction information (for example, a vector from the location 1 to the location 2) that indicates the direction of true north in the map representation data, from the two pieces of coordinate information.

It is preferable that, for example, the direction information acquisition unit C38 acquires two or more pairs from location information regarding three or more locations, performs the same processing as described above on each of the two or more pairs to acquire two or more pieces of direction information, and calculates a representative value (for example, an average value, a median value, or the like) of the two or more pieces of direction information. The output unit C4 outputs various kinds of information. Examples of various kinds of information include correspondence information, map representation data, accurate map information, and direction information.

The correspondence output unit C41 outputs the coordinate information acquired by the coordinate information acquisition unit C35 and the position information acquired by the position information acquisition unit C36, in association with each other. To output coordinate information and position information in association with each other may be to output correspondence information that contains coordinate information and position information. Here, "output" typically means accumulation on a recording medium (for example, the correspondence information storage unit C14), but may be regarded as a concept that includes displaying on a display device, projection with a projector, printing with a printer, sound output, transmission to an external device, delivery of processing results to another processing apparatus or another program, and so on. It is preferable that the correspondence output unit C41 outputs location information that associates the coordinate information and position information as well in pair with the coordinate information and the position information.

The correspondence output unit C41 outputs the coordinate information and the position information corresponding to the character string judged by the classification unit C32 as a character string that specifies a location, in association with each other.

The correspondence output unit C41 outputs the coordinate information and the position information corresponding to the character string classified by the classification unit C32 as location information, in association with each other.

The correspondence output unit C41 outputs the two or more pieces of position information determined by the grouping unit C33 and the two or more pieces of coordinate information acquired by the coordinate information acquisition unit C35, in association with each other.

For example, the accurate map information output unit C42 outputs accurate map information in a mode in which the region specified by the region specification information is discernable. Here, "output" may be regarded as a concept that includes displaying on a display device, projection with a projector, accumulation on a recording medium, printing with a printer, sound output, transmission to an external device, delivery of processing results to another processing apparatus or another program, and so on. A mode in which the region specified by the region specification information is discernable is, for example, a mode in which the region specified by the region specification information is enclosed with a frame, or the background color of the region specified by the region specification information is changed from that of other regions. However, there is no limitation of such a mode.

It is preferable that, for example, the accurate map information output unit C42 outputs accurate map information in a mode in which the region specified by two pieces of region specification information is discernable.

The direction information output unit C43 outputs the direction information acquired by the direction information acquisition unit C38. There is no limitation on the mode in which the direction information is output. Here, "output" may be regarded as a concept that includes displaying on a display device, projection with a projector, accumulation on a recording medium, printing with a printer, sound output, transmission to an external device, delivery of processing results to another processing apparatus or another program, and so on.

It is preferable that the storage unit C1, the location dictionary storage unit C11, the map representation data storage unit C12, the accurate map information storage unit C13, the learner storage unit A12, and the correspondence information storage unit C14 are realized using a non-volatile recording medium, but they may be realized using a volatile recording medium.

There is no limitation on the process in which information is stored in the storage unit C1 and so on. For example, information may be stored in the storage unit C1 or the like via a recording medium, or information transmitted via a communication line or the like may be stored in the storage unit C1 or the like, or information input via an input device may be stored in the storage unit C1 or the like.

The acceptance unit C2 and the map representation data acceptance unit C21 can be realized using a device driver for the input means such as a touch panel or a keyboard, or control software or the like for controlling the menu screen.

The processing unit C3, the character string acquisition unit C31, the classification unit C32, the grouping unit C33, the feature spot detection unit C34, the coordinate information acquisition unit C35, the position information acquisition unit C36, the region specification information acquisition unit C37, the direction information acquisition unit C38, the first region specification information acquisition part C371, the outer character string determination part C372, the size information acquisition part C373, the distance information acquisition part C374 and the second region specification information acquisition part C375 typically are realized using an MPU, a memory, and so on. The processing procedures performed by the processing unit C3 and so on typically are realized using software, and the software is recorded on a recording medium such as a ROM. However, such processing procedures may be realized using hardware (a dedicated circuit).

The output unit C4, the correspondence output unit C41, the accurate map information output unit C42, and the direction information output unit C43 may be regarded as including or not including an output device such as a display or a speaker. The output unit C4 can be realized using the driver software of the output device, the driver software of the output device and the output device, or the like.

Next, examples of operations of the map representation data processing device C will be described with reference to the flowchart shown in FIG. 8.

(Step S801) The acceptance unit C2 judges whether or not an operation start instruction has been accepted. If an operation start instruction has been accepted, processing proceeds to step S802, and if an operation start instruction has not been accepted, processing proceeds to step S821.

(Step S802) The processing unit C3 substitutes 1 for the counter i.

(Step S803) The processing unit C3 judges whether or not the $i^{th}$ piece of map representation data is present in the map representation data storage unit C12. If the $i^{th}$ piece of map representation data is present, processing proceeds to step S804, and otherwise processing returns to step S801.

(Step S804) The map representation data acceptance unit C21 acquires the $i^{th}$ piece of map representation data from the map representation data storage unit C12.

(Step S805) The character string acquisition unit C31 acquires one or more character strings expressed on the $i^{th}$ piece of map representation data acquired in step S804. For example, the character string acquisition unit C31 acquires one or more character strings that are expressed on the $i^{th}$ piece of map representation data, through character recognition processing.

(Step S806) The classification unit C32 substitutes 1 for the counter j.

(Step S807) The classification unit C32 judges whether or not the $j^{th}$ character string is present in the character strings acquired in step S805. If the $j^{th}$ character string is present, processing proceeds to step S808, and if the $j^{th}$ character string is not present, processing proceeds to step S813.

(Step S808) the classification unit C32 performs classification processing on the $j^{th}$ character string to acquire a label. Note that classification processing is, for example, the processing performed by the classification device B described above, and is, for example, the processing from step S402 to step S409 in FIG. 4.

(Step S809) The coordinate information acquisition unit C35 judges whether or not the $j^{th}$ character string is location information that is to be registered. If the $j^{th}$ character string is location information that is to be registered, processing proceeds to step S810, and if the $j^{th}$ character string is location information that is not to be registered, processing proceeds to step S812.

Note that location information to be registered is, for example, information indicating that the label acquired in step S808 is a label indicating that the character string is a character string to be registered. Also, a label that indicates that a character string is the character string to be registered is, for example, the first label.

(Step S810) The coordinate information acquisition unit C35 acquires coordinate information regarding a representative point of a region in which the $j^{th}$ character string is located and is on the $i^{th}$ piece of map representation data. Note that the representative point may be the center of gravity of the region, the upper left point, the lower right point, or the like. It is assumed that information regarding the region in which the character string is located is acquired when the character string is acquired from map representation data.

(Step S811) The position information acquisition unit C36 acquires the position information paired with the location information that is the $j^{th}$ character string, from location dictionary storage unit C11. Thereafter, the correspondence output unit C41 at least temporarily accumulates the position information in a buffer (not shown) in pair with the coordinate information acquired in step S810.

(Step S812) The classification unit C32 increments the counter j by 1. Processing returns to step S807.

(Step S813) The grouping unit C33 performs grouping processing on the two or more pieces of two or more accumulated in step S811. An example of grouping processing will be described with reference to the flowchart shown in FIG. 9.

(Step S814) The correspondence output unit C41 substitutes 1 for a counter k.

(Step S815) The correspondence output unit C41 judges whether or not the $k^{th}$ piece of position information is present in the pieces of position information acquired in step S813. If the $k^{th}$ piece of position information is present, processing proceeds to step S816, and if the $k^{th}$ piece of position information is not present, processing proceeds to step S818.

(Step S816) The correspondence output unit C41 acquires coordinate information that is paired with the $k^{th}$ piece of position information from a buffer (not shown). Thereafter, the correspondence output unit C41 accumulates the $k^{th}$ piece of position information and the acquired piece of coordinate information in association with each other, and in association with the $i^{th}$ piece of map representation data, in the correspondence information storage unit C14.

(Step S817) The correspondence output unit C41 increments the counter k by 1. Processing returns to step S807.

(Step S818) The region specification information acquisition unit C37 performs region specification processing. Region specification processing is processing that is performed to specify a region that corresponds to a region of the $i^{th}$ piece of map representation data and is included in accurate map information. An example of region specification processing will be described with reference to the flowchart shown in FIG. 10.

(Step S819) The direction information acquisition unit C38 performs direction acquisition processing. Direction acquisition processing is processing that is performed to acquire direction information that specifies the direction of the $i^{th}$ piece of map representation data. An example of direction acquisition processing will be described with reference to the flowchart shown in FIG. 11.

(Step S820) The processing unit C3 increments the counter i by 1. Processing returns to step S803.

(Step S821) The acceptance unit C2 judges whether or not an output instruction has been accepted. If an output instruction has been accepted, processing proceeds to step S822, and if an output instruction has not been accepted, processing returns to step S801.

(Step S822) The output unit C4 performs output processing. Processing returns to step S801. Note that output processing is an instruction to output map representation data or the like corresponding to the output instruction. An example of output processing will be described with reference to the flowchart shown in FIG. 12.

Figure 8:
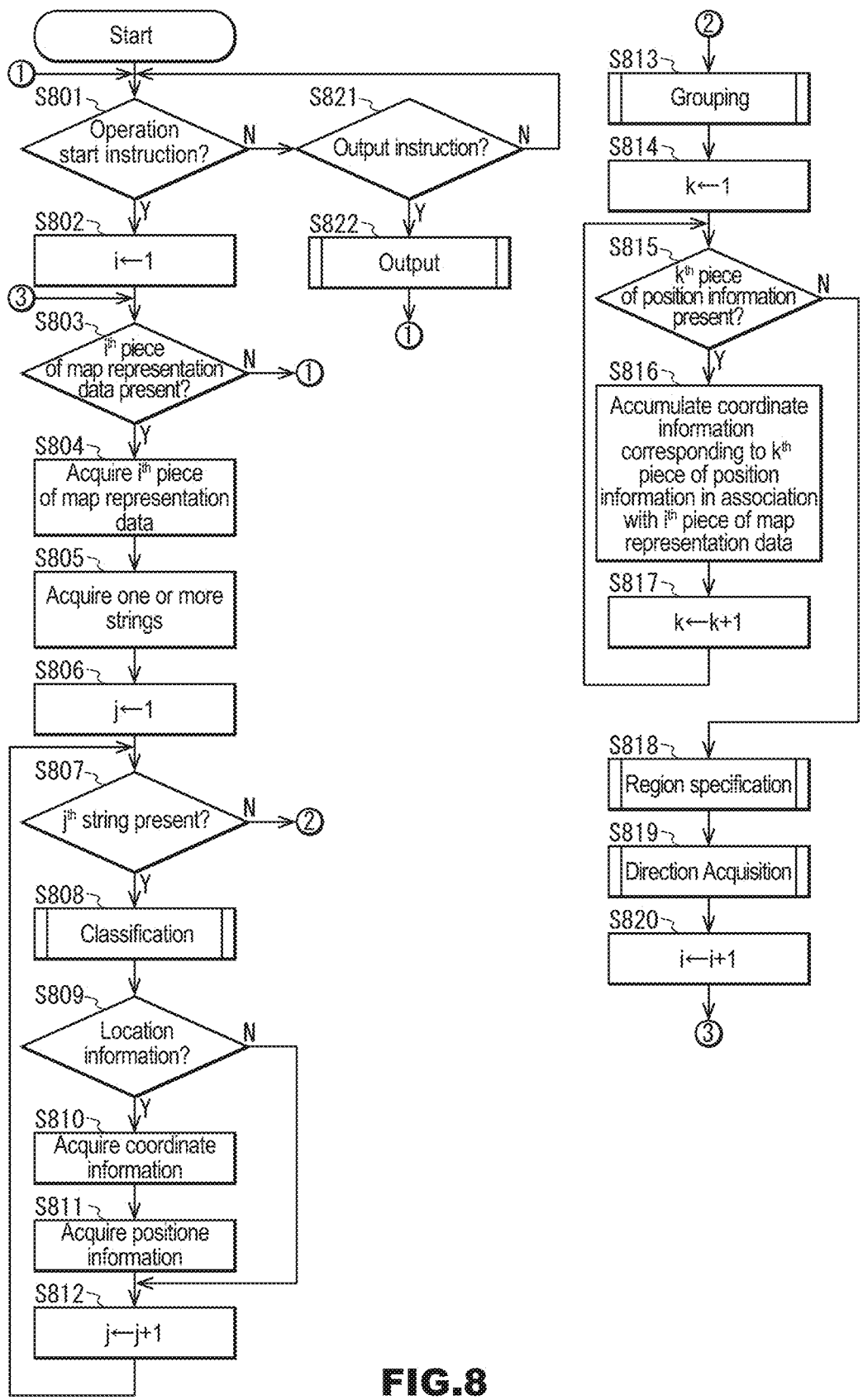
FIG. 8 is a flowchart illustrating examples of operations of the map representation data processing device C according to the same.

In the flowchart shown in FIG. 8, processing is terminated when power is turned off or an interruption is made to terminate the processing.

Figure 9:
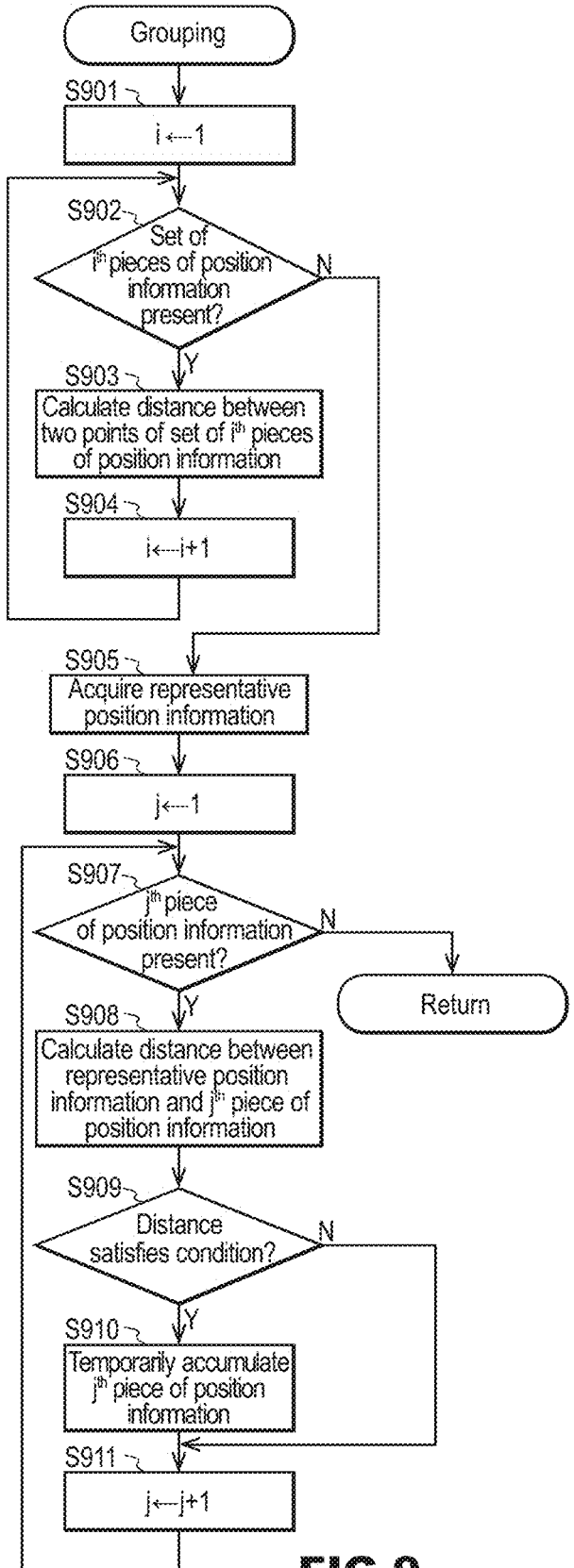
FIG. 9 is a flowchart illustrating an example of grouping processing according to the same.

Next, an example of the grouping processing in step S813 will be described with reference to the flowchart shown in FIG. 9.

(Step S901) The grouping unit C33 substitutes 1 for the counter i.

(Step S902) The grouping unit C33 judges whether or not a set of the $i^{th}$ two pieces of position information is present in the two or more pieces of position information acquired in step S811. If a set of the $i^{th}$ two pieces of position information is present, processing proceeds to step S903, and otherwise processing returns to step S905.

(Step S903) The grouping unit C33 calculates the distance between the two points specified by the $i^{th}$ two pieces of position information.

(Step S904) The grouping unit C33 increments the counter i by 1. Processing returns to step S807.

(Step S905) The grouping unit C33 acquires two pieces of position information corresponding to the smallest distance of the distances between two points calculated in step S903. Thereafter, the grouping unit C33 acquires any one piece of position information of the two pieces of position information as representative position information.

(Step S906) The grouping unit C33 substitutes 1 for the counter j.

(Step S907) The grouping unit C33 judges whether or not the $j^{th}$ piece of position information other than the representative position information is present in the two or more pieces of position information acquired in step S811. If the $j^{th}$ piece of position information is present, processing proceeds to step S908, and if the $j^{th}$ piece of position information is not present, processing returns to higher level processing.

(Step S908) The grouping unit C33 calculates the distance between each piece of position information other than the representative position information and the representative position information, of the two or more pieces of position information acquired in the step S811.

(Step S909) The grouping unit C33 judges whether or not the distance calculated in step S907 is a distance that is short enough to satisfy a predetermined condition (for example, whether or not the distance is less than a threshold value, or whether or not the distance is no greater than a threshold value. If the distance is short enough to satisfy the predetermined condition, processing proceeds to step S910, and if the distance is not short enough to satisfy the predetermined condition, processing proceeds to step S911.

(Step S910) The grouping unit C33 temporarily accumulates the $j^{th}$ piece of position information in a buffer (not shown). The position information accumulated in the buffer is the position information acquired by the grouping unit C33.

(Step S911) The grouping unit C33 increments the counter j by 1. Processing returns to step S807.

Figure 10:
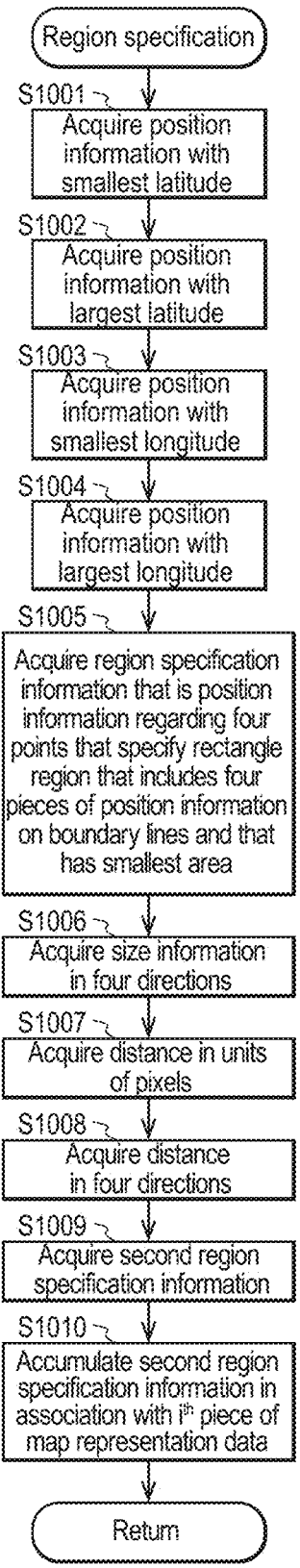
FIG. 10 is a flowchart illustrating an example of region specification processing according to the same.

Next, an example of the region specification processing in step S818 will be described with reference to the flowchart shown in FIG. 10.

(Step S1001) The first region specification information acquisition part C371 acquires position information with the smallest longitude from among the pieces of position information temporarily accumulated by the grouping unit C33 in the buffer (not shown) in step S910.

(Step S1002) The first region specification information acquisition part C371 acquires position information with the largest longitude from among the pieces of position information temporarily accumulated by the grouping unit C33 in the buffer (not shown) in step S910.

(Step S1003) The first region specification information acquisition part C371 acquires position information with the smallest latitude from among the pieces of position information temporarily accumulated by the grouping unit C33 in the buffer (not shown) in step S910.

(Step S1004) The first region specification information acquisition part C371 acquires position information with the largest latitude from among the pieces of position information temporarily accumulated by the grouping unit C33 in the buffer (not shown) in step S910.

(Step S1005) The first region specification information acquisition part C371 acquires region specification information that contains pieces of position information regarding four corner points that specify a region that includes the four pieces of position information acquired from step S1001 to step S1004 at boundaries, contains all the pieces of position information acquired by the grouping unit C33, and is a rectangular region. It is preferable that the first region specification information acquisition part C371 acquires region specification information that contains pieces of position information regarding four corner points that specify a region that includes the four pieces of position information acquired from step S1001 to step S1004 at boundaries, contains all the pieces of position information acquired by the grouping unit C33, and is a rectangular region with the smallest area.

(Step S1006) The outer character string determination part C372 acquires the outermost character strings in the four directions (up, down, left, and right) in the region specified by the region specification information. Thereafter, the size information acquisition part C373 acquires size information indicating the number of pixels between the four outermost character strings and the outer edge of the map representation data.

(Step S1007) The distance information acquisition part C374 acquires the distance per pixel (per one coordinate point), using two or more sets each consisting of position information and coordinate information.

(Step S1008) The distance information acquisition part C374 multiplies the distance per pixel acquired in step S1007 by the four pieces of size information acquired in step S1006, to calculate the distance of expansion in the four directions. Note that the four directions of expansion are the directions respectively perpendicular to the four sides of the rectangle specified by the region specification information.

(Step S1009) The second region specification information acquisition part C375 acquires second region specification information that is information that specifies the region obtained by extending the widths of the first region specification information in the four directions by the distance acquired in step S1008. The second region specification information typically consists of two pieces of position information that specify a rectangle.

(Step S1010) The second region specification information acquisition part C375 accumulates the second region specification information acquired in step S1009, in association with the $i^{th}$ piece of map representation data. Processing returns to higher level processing.

Figure 11:
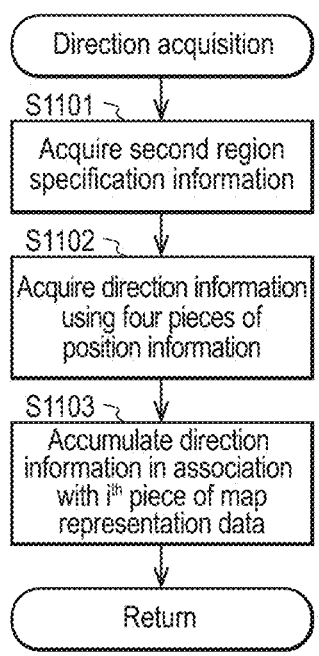
FIG. 11 is a flowchart illustrating an example of direction acquisition processing according to the same.

Next, an example of the direction acquisition processing in step S819 will be described with reference to the flowchart shown in FIG. 11.

(Step S1101) The direction information acquisition unit C38 acquires the second region specification information acquired by the second region specification information acquisition part C375.

(Step S1102) The direction information acquisition unit C38 acquires direction information, using four pieces of position information included in the second region specification information.

(Step S1103) The direction information acquisition unit C38 accumulates the direction information acquired in step S1102, in association with the $i^{th}$ piece of map representation data. Processing returns to higher level processing.

Next, an example of the output processing in step S822 will be described with reference to the flowchart shown in FIG. 12.

(Step S1201) The output unit C4 acquires the map representation data identifier contained in the accepted output instruction.

(Step S1202) The output unit C4 acquires the map representation data identified by the map representation data identifier acquired in step S1201, from the map representation data storage unit C12.

(Step S1203) The output unit C4 acquires one or more pieces of coordinate information that are paired with the map representation data identifier acquired in step S1201, from the correspondence information storage unit C14.

(Step S1204) The output unit C4 acquires direction information that is paired with the map representation data acquired in step S1202.

(Step S1205) The output unit C4 forms map representation data that explicitly indicates the spots respectively specified by the one or more pieces of coordinate information, and forms map representation data that explicitly indicates the direction information acquired in step S1204, on the map representation data acquired in step S1202.

(Step S1206) The output unit C4 acquires second region specification information that is paired with the map representation data acquired in step S1202.

(Step S1207) The output unit C4 acquires accurate map information regarding the region specified by the second region specification information acquired in step S1206, from the accurate map information storage unit C13.

(Step S1208) The output unit C4 acquires one or more pieces of position information that are paired with the map representation data identifier acquired in step S1201, from the correspondence information storage unit C14.

(Step S1209) The output unit C4 forms accurate map information that explicitly indicates the spots respectively specified by the one or more pieces of position information acquired in step S1208, on the accurate map information acquired in step S1207.

(Step S1210) The output unit C4 outputs the map representation data acquired in step S1205. Also, the output unit C4 outputs the accurate map information acquired in step S1209. Processing returns to higher level processing.

Figure 12:
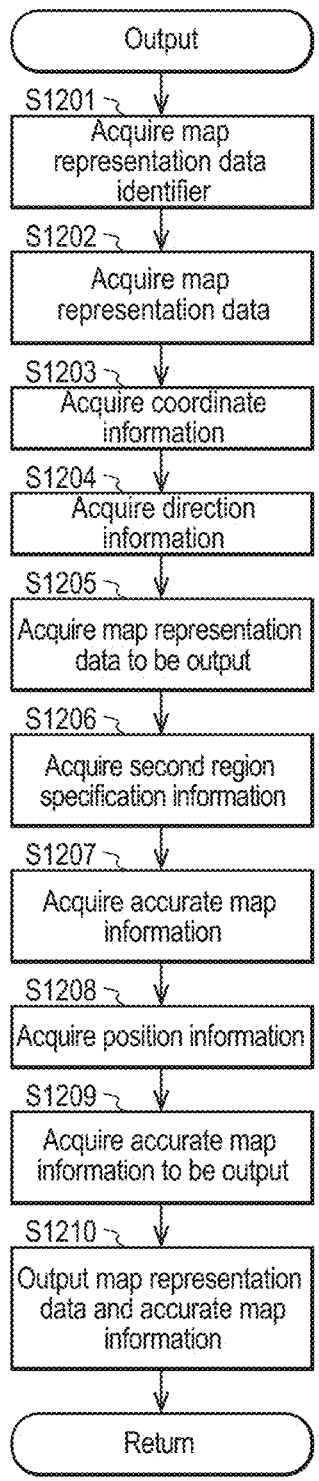
FIG. 12 is a flowchart illustrating an example of output processing according to the same.

In the flowchart shown in FIG. 12, only one of either map representation data or accurate may be output.

Also, in the flowchart shown in FIG. 12, the map representation data to be output may be map representation data that does not explicitly indicate the spots respectively specified by the one or more pieces of coordinate information. Also, in the flowchart shown in FIG. 12, the map representation data to be output may be map representation data that does not explicitly indicate direction information.

Also, in the flowchart shown in FIG. 12, the accurate map information to be output may be map representation data that does not explicitly indicate second region specification information. Also, in the flowchart shown in FIG. 12, the accurate map information to be output may be map representation data that does not explicitly indicate the spots respectively specified by the one or more pieces of position information. Furthermore, in the flowchart shown in FIG. 12, the accurate map information to be output may be map representation data that explicitly indicates region specification information.

The following describes specific operations of the map representation data processing device C according to the present embodiment.

Figure 13:
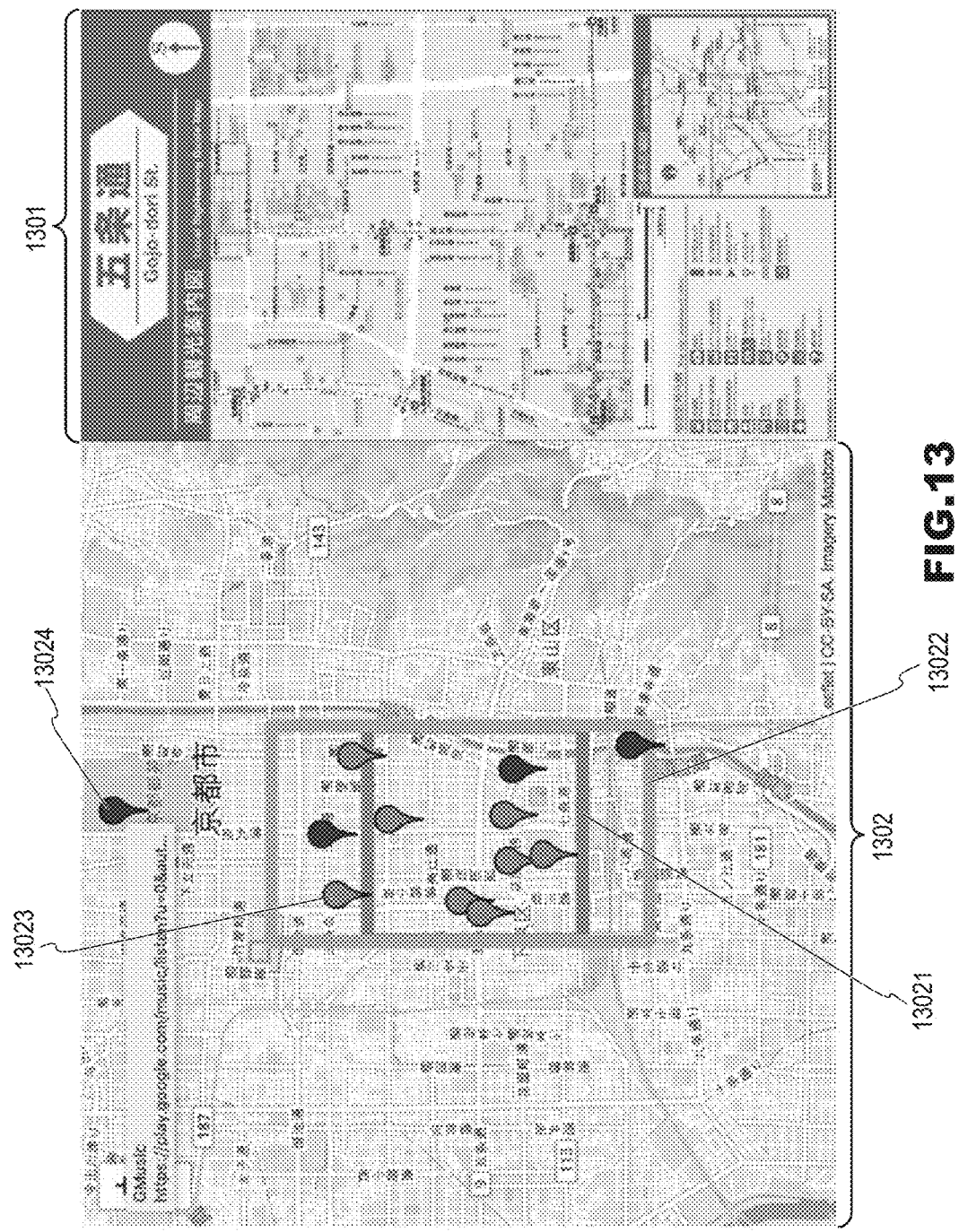
FIG. 13 is a diagram showing an example of map representation data and so on according to the same.
Figure 14:
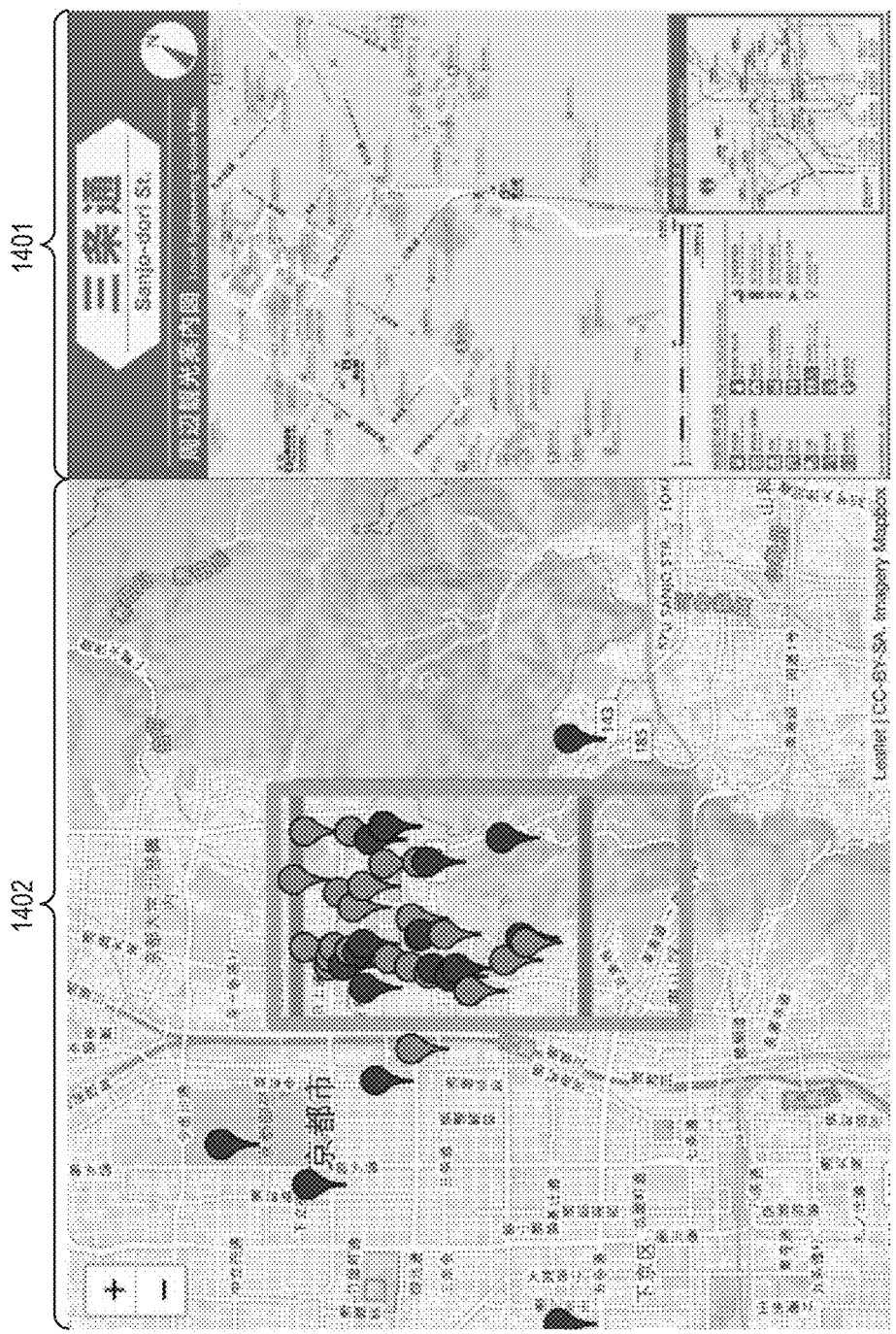
FIG. 14 is a diagram showing an example of map representation data and so on according to the same.

Now, for example, map representation data regarding Gojo-dori street in Kyoto, indicated by 1301 in FIG. 13, and map representation data regarding Sanjo-dori street indicated by 1401 in FIG. 14, are stored in the map representation data storage unit C12. The map representation data indicated by 1301 is stored in pair with a map representation data identifier "Gojo-dori street", and the map representation data indicated by 1401 is stored in pair with a map representation data identifier "Sanjo-dori street".

The location dictionary storage unit C11 stores the location dictionary shown in FIG. 15. The location dictionary stores two or more records that each contain "location information" and "position information". The "location information" here is a meaningless character string, but typically is a location name. The "position information" here is (latitude, longitude).

Furthermore, the correspondence information storage unit C14 stores a correspondence information management table that has the structure shown in FIG. 16. The correspondence information management table stores one or more records that each contain "ID", "map representation data identifier", "coordinate information", "position information", and "location information". "ID" is information that identify the record. "Map representation data identifier" is information that identifies map representation data. "Coordinate information" is coordinate values that indicate the relative position on the map representation data. The "position information" here is (latitude, longitude). The "location information" here is a meaningless character string, but typically is a location name.

In such a case, it is assumed that the user inputs an operation start instruction to the map representation data processing device C.

As a result, the acceptance unit C2 of the map representation data processing device C accepts the operation start instruction. The map representation data processing device C performs the above-described processing on the map representation data regarding "Gojo-dori street" and the map representation data regarding "Sanjo-dori street", and accumulates one or more pieces of correspondence information in the correspondence information in association with the pieces of map representation data. The record accumulated in this way are the records indicated by "ID=1, 2, 3, . . . , 38, . . . " in FIG. 16.

It is also assumed that the user next inputs an output instruction that contains the map representation data identifier "Gojo-dori street" to the map representation data processing device C.

As a result, the acceptance unit C2 of the map representation data processing device C accepts the output instruction. Next, the output unit C4 performs the above-described output processing. As a result, the map representation data indicated by 1301 and the accurate map information indicated by 1302 in FIG. 13 are output. Note that 13021 in FIG. 13 indicates a region that is specified by region specification information. 13022 indicates a region that is specified by second region specification information. 13023 is a pattern that specifies position information corresponding to the first label. Furthermore, 13024 is a pattern that specifies position information corresponding to the third label or has been excluded through grouping processing.

As described above, according to the present embodiment, it is possible to automatically acquire coordinate information and position information regarding a location name or the like on map representation data, in association with each other.

Also, according to the present embodiment, it is possible to extract a character string such as an appropriate location name on map representation data and automatically acquire coordinate information and position information regarding the location name or the like in association with each other.

Also, according to the present embodiment, it is possible to accurately extract a character string such as an appropriate location name on map representation data and automatically acquire coordinate information and position information regarding the location name or the like in association with each other.

Also, according to the present embodiment, it is possible to acquire a graphic feature point on map representation data and automatically acquire coordinate information and position information regarding the graphic feature point in association with each other.

Also, according to the present embodiment, it is possible to clarify the range of accurate map information corresponding to map representation data.

Also, according to the present embodiment, it is possible to clarify the appropriate range of accurate map information corresponding to map representation data.

Furthermore, according to the present embodiment, it is possible to acquire direction information regarding a direction in map representation data.

Note that the essential components in the present embodiment are the location dictionary storage unit C11, the map representation data acceptance unit C21, the character string acquisition unit C31, the coordinate information acquisition unit C35, the position information acquisition unit C36 and the correspondence output unit C41. The other constituent elements of the map representation data processing device C need not necessarily be present.

Also, in the present embodiment, another output example other than that shown in FIG. 13 is shown in FIG. 14.

The software that realizes the map representation data processing device C in the present embodiment is the program described below. That is to say, the program is a program that enables a computer that can access a location dictionary storage unit that stores a location dictionary that contains one or more pieces of location position information each being information that associates location information that specifies a location and position information that specifies a position of the location with each other, to function as: a map representation data acceptance unit that accepts map representation data that is one or more types of maps of an illustration map, a handwritten map, and a sketch map; a character string acquisition unit that acquires a character string from the map representation data; a coordinate information acquisition unit that acquires coordinate information that is information that specifies a coordinate position corresponding to the character string acquired by the character string acquisition unit and is information that specifies a relative coordinate position in the map representation data; a position information acquisition unit that acquires position information corresponding to location information that is the character string acquired by the character string acquisition unit, using the location dictionary; and a correspondence output unit that outputs the coordinate information acquired by the coordinate information acquisition unit and the position information acquired by the position information acquisition unit in association with each other.

Embodiment 3

The present embodiment describes a map representation data processing device D that can explicitly indicate a current position on map representation data, using the correspondence information acquired in Embodiment 2.

Figure 17:
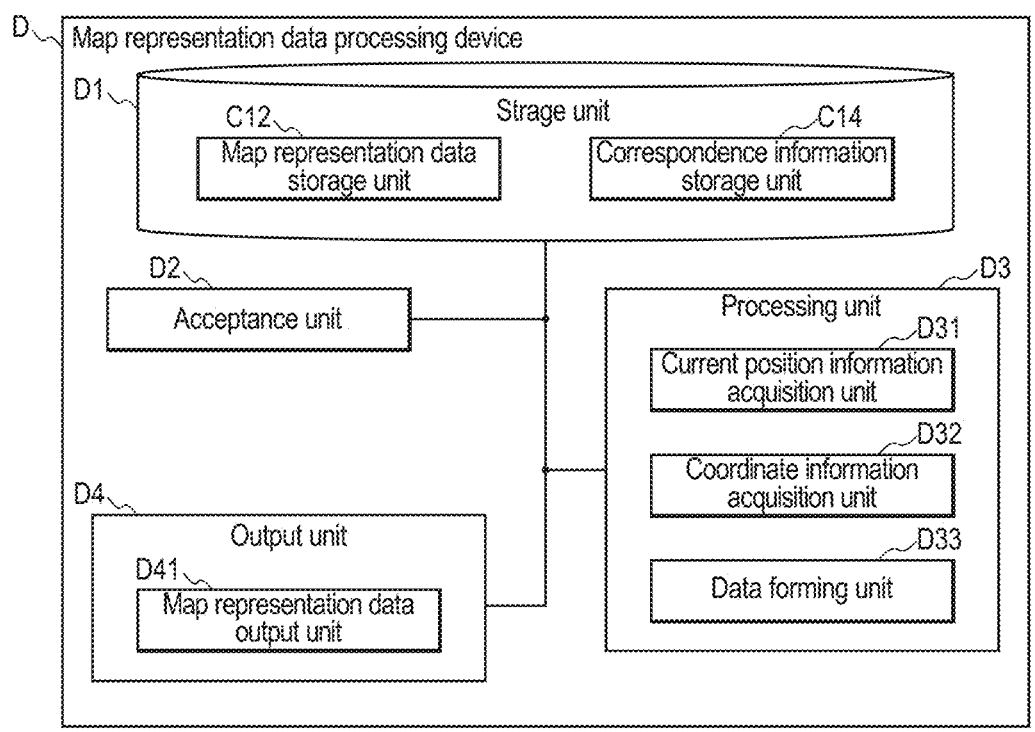
FIG. 17 is a block diagram for a map representation data processing device D according to Embodiment 3.

FIG. 17 is a block diagram for the map representation data processing device D according to the present embodiment.

The map representation data processing device D includes a storage unit D1, an acceptance unit D2, a processing unit D3, and an output unit D4. The storage unit D1 includes the map representation data storage unit C12 and the correspondence information storage unit C14.

The processing unit D3 includes a current position information acquisition unit D31, a coordinate information acquisition unit D32, and a data forming unit D33. The output unit D4 includes a map representation data output unit D41.

The storage unit D1 stores various kinds of information. Examples of various kinds of information include map representation data and correspondence information.

The map representation data storage unit C12 stores one or more pieces of map representation data.

The correspondence information storage unit C14 stores two or more pieces of correspondence information. It is preferable that correspondence information is associated with map representation data.

The acceptance unit D2 accepts various kinds of information and instructions. Examples of various kinds of information include an operation start instruction.

Here, "acceptance" means, for example, acceptance of a user input, reception from an external device (for example, a terminal device, which is not shown in the drawings), or the like. It suffices if various information and instructions can be acquired through acceptance. Any input means, such as a touch panel, a keyboard, a mouse, a menu screen, or the like, may be employed to input various kinds of information and instructions.

The processing unit D3 performs various kinds of processing. Examples of various kinds of processing include processing that is performed by the current position information acquisition unit D31, the coordinate information acquisition unit D32, and the data forming unit D33.

The current position information acquisition unit D31 acquires current position information that specifies the current position. The current position information acquisition unit D31 can be realized using a GPS receiver, for example. The current position information acquisition unit D31 is a well-known technique, and therefore the detailed description thereof will be omitted.

The coordinate information acquisition unit D32 acquires coordinate information corresponding to current position information, using two or more pieces of correspondence information that are paired with the target map representation data. Coordinate information indicates coordinate values that specify the relative position on the map representation data that is displayed.

For example, the coordinate information acquisition unit D32 reads out correspondence information 2 (coordinate information 1 $(x_1,y_1)$, position information 1 (X1,Y1)) and correspondence information 2 (coordinate information 2 $(x_2,y_2)$, position information 2 (X2,Y2)) that are paired with the target map representation data, from the correspondence information storage unit C14. Thereafter, the coordinate information acquisition unit D32 acquires the current position information (X3,Y3) acquired by the current position information acquisition unit D31. Next, the coordinate information acquisition unit D32 calculates (X1-X2), (Y1-Y2), using the position information 1 (X1,Y1) and position information 2 (X2,Y2). Also, the coordinate information acquisition unit D32 calculates $(x_1-x_2)$, $(y_1-y_2)$, using the coordinate information 1 $(x_1,y_1)$ and the coordinate information 2 $(x_2,y_2)$. Next, the coordinate information acquisition unit D32 calculates the number of pixels for a unit distance (for example, 100 m) on the x axis, using (X1-X2) and $(x_1-x_2)$. Also, the coordinate information acquisition unit D32 calculates the number of pixels for a unit distance (for example, 100 m) on the y axis, using (Y1-Y2) and $(y_1-y_2)$. Next, the coordinate information acquisition unit D32 calculates the number of pixels for the unit distance on the x axis using (X1-X3) and adds the number of pixels and $x_1$, to acquire a x coordinate $(x_3)$ for the current position information. Also, the coordinate information acquisition unit D32 calculates the number of pixels for the unit distance on the y axis using (Y1-Y3) and adds the number of pixels and $y_1$, to acquire a y coordinate $(y_3)$ for the current position information.

The data forming unit D33 forms current position-added map representation data that is map representation data on which the position indicated by the coordinate information acquired by the coordinate information acquisition unit D32 is explicitly indicated. Note that there is no limitation on the mode in which the position indicated by the coordinate information is explicitly indicated. The data forming unit D33 places a predetermined pattern at a position indicated by the coordinate information, for example.

The output unit D4 outputs various kinds of information. Examples of various kinds of information include current position-added map representation data.

The map representation data output unit D41 outputs the current position-added map representation data acquired by the data forming unit D33.

It is preferable that the storage unit D1, the map representation data storage unit C12, and the correspondence information storage unit C14 are realized using a nonvolatile recording medium, but they may be realized using a volatile recording medium.

There is no limitation on the process in which information is stored in the storage unit D1 and so on. For example, information may be stored in the storage unit D1 or the like via a recording medium, or information transmitted via a communication line or the like may be stored in the storage unit D1 or the like, or information input via an input device may be stored in the storage unit D1 or the like.

The acceptance unit D2 can be realized using a device driver for the input means such as a touch panel or a keyboard, or control software or the like for controlling the menu screen.

The processing unit D3, the current position information acquisition unit D31, the coordinate information acquisition unit D32, and the data forming unit D33 typically are realized using an MPU, a memory, and so on. The processing procedures performed by the processing unit D3 and so on typically are realized using software, and the software is recorded on a recording medium such as a ROM. However, such processing procedures may be realized using hardware (a dedicated circuit).

The output unit D4 and the map representation data output unit D41 may be regarded as including or not including an output device such as a display or a speaker. The output unit D4 can be realized using the driver software of the output device, the driver software of the output device and the output device, or the like.

Figure 18:
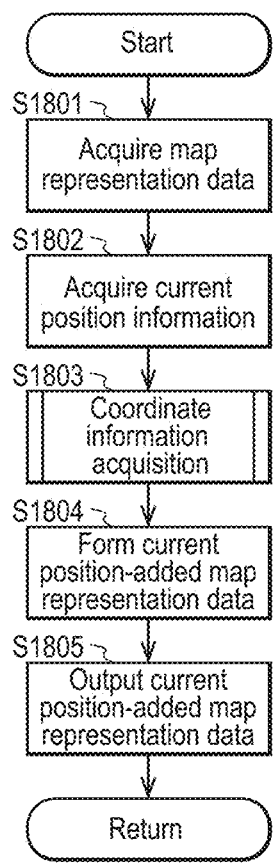
FIG. 18 is a flowchart illustrating examples of operations of the map representation data processing device D according to the same.

Next, examples of operations of the map representation data processing device D will be described with reference to the flowchart shown in FIG. 18.

(Step S1801) The acceptance unit D2 acquires the map representation data to be displayed, from the map representation data storage unit C12.

(Step S1802) The current position information acquisition unit D31 acquires current position information.

(Step S1803) The coordinate information acquisition unit D32 acquires two or more pieces of correspondence information that are paired with the map representation data identifier that identifies the map representation data acquired in step S1801, from the correspondence information storage unit C14. Next, the coordinate information acquisition unit D32 acquires coordinate information corresponding to current position information, using the two or more pieces of correspondence information.

(Step S1804) The data forming unit D33 forms current position-added map representation data that is map representation data acquired in step S1801 on which the position indicated by the coordinate information acquired in step S1803 is explicitly indicated.

(Step S1805) The map representation data output unit D41 outputs the current position-added map representation data formed in step S1804. Processing is terminated.

As described above, according to the present embodiment, it is possible to indicate the current position on map representation data, using two or more pieces of correspondence information that have been automatically acquired.

The software that realizes the map representation data processing device D in the present embodiment is the program described below. That is to say, the program is a program that enables a computer that can access: a map representation data storage unit that stores map representation data; and a correspondence information storage unit that stores two or more pieces of correspondence information that each are a set of coordinate information output by the map representation data processing device C and position information acquired by the position information acquisition unit, to function as: a current position information acquisition unit that acquires current position information that specifies a current position; a coordinate information acquisition unit that acquires coordinate information corresponding to the current position information, using the two or more pieces of correspondence information; a data forming unit that forms current position-added map representation data that is the map representation data on which a position indicated by the coordinate information is explicitly indicated; and a map representation data output unit that outputs the current position-added map representation data.

Embodiment 4

The present embodiment describes a map representation data processing device that acquires three or more location names from map representation data, acquires pieces of coordinate information respectively corresponding to the location names, from the map representation data, acquires pieces of real position information respectively corresponding to the location names, from a location dictionary, and outputs correspondence information that is a set of appropriate coordinate information and position information, using the coordinate information and the position information.

The present embodiment also describes a map representation data processing device that determines an inappropriate location based on relationship information regarding a relationship between correspondence information between two locations, and outputs two or more pieces of correspondence information that do not include inappropriate piece of correspondence information corresponding to the inappropriate location. Note that, in the present embodiment, distance relationship information regarding a distance and angle relationship information regarding an angle, for example, are used to determine an inappropriate location. An inappropriate location is a location corresponding to correspondence information that is considered as an error.

Also, the present embodiment describes a map representation data processing device that acquires and outputs scale information regarding map representation data.

Also, the present embodiment describes a map representation data processing device that acquires and outputs the range of map representation data.

Also, the present embodiment describes a map representation data processing device that adds location names or the like included in the range of map representation data, to the map representation data.

Furthermore, the present embodiment describes a map representation data processing device that acquires and outputs information regarding a direction in map representation data.

Figure 19:
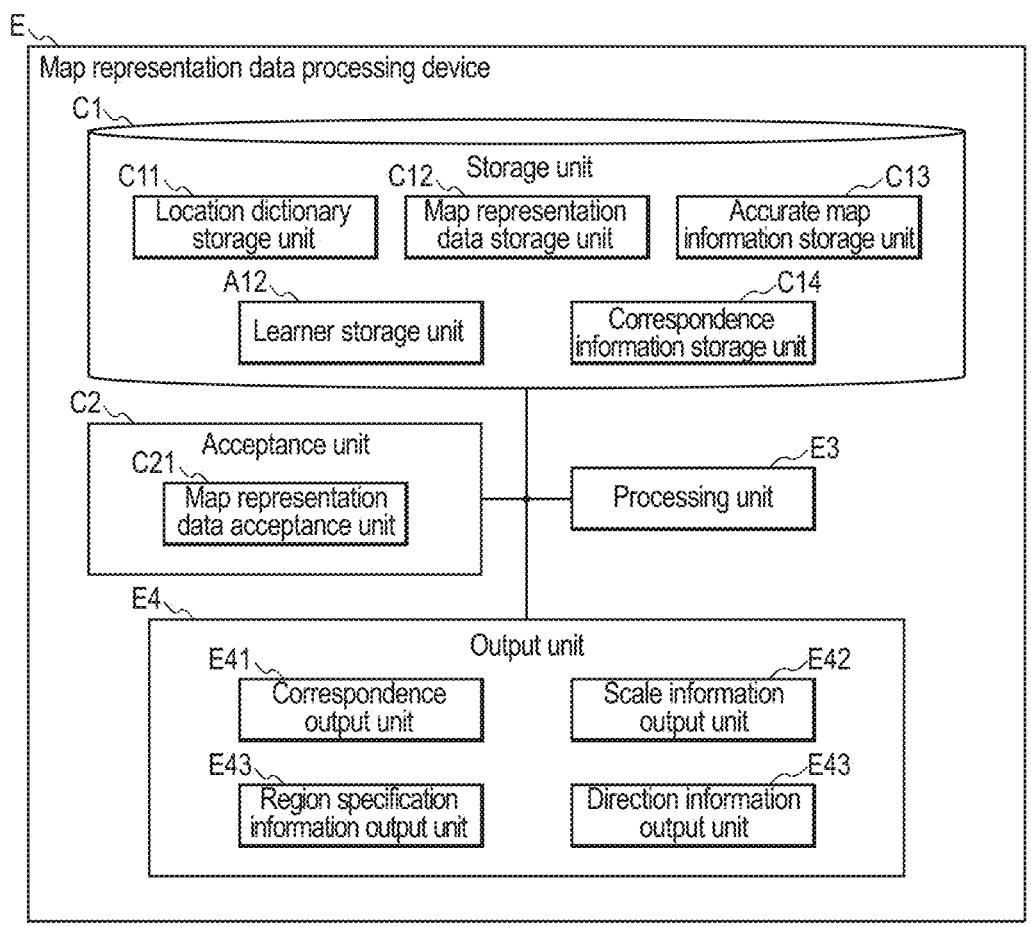
FIG. 19 is a block diagram for a map representation data processing device E according to Embodiment 4.
Figure 20:
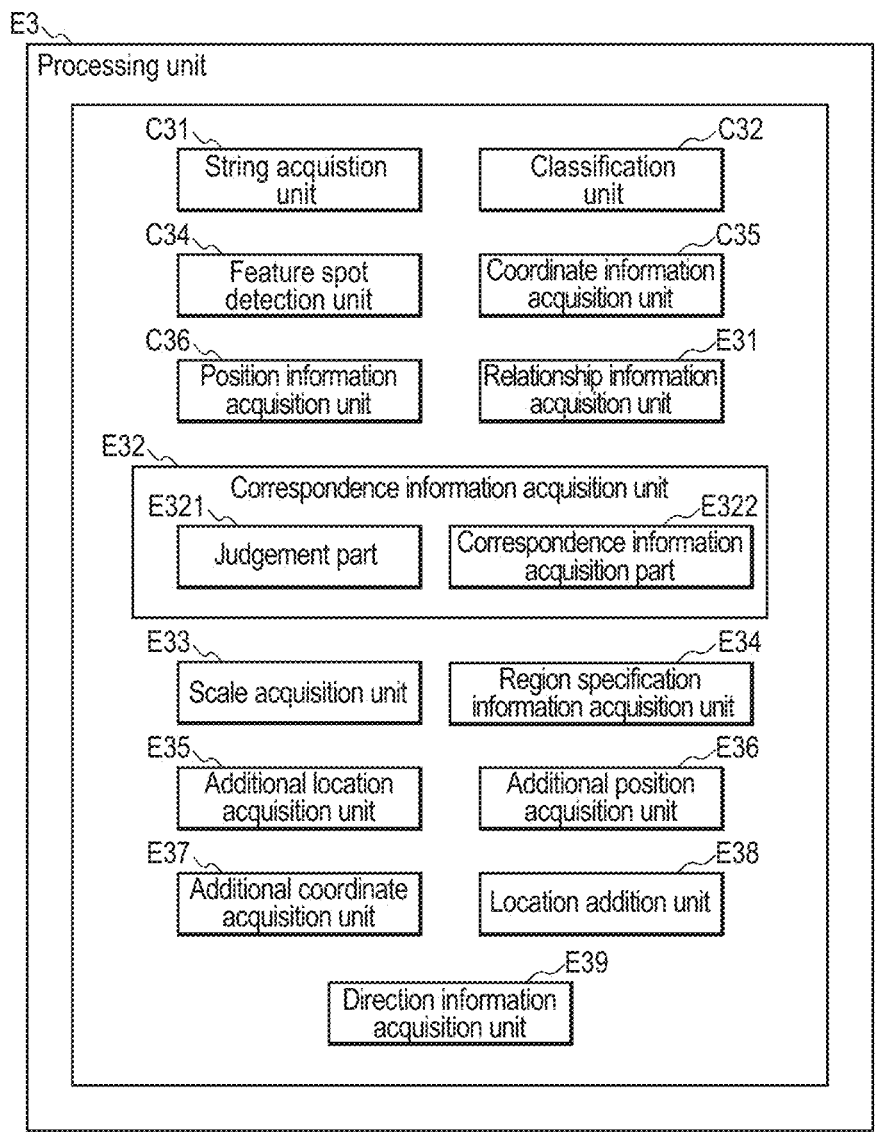
FIG. 20 is a block diagram for a processing unit E3 that is included in the map representation data processing device E according to the same.

FIG. 19 is a block diagram for a map representation data processing device E according to the present embodiment. FIG. 20 is a block diagram for a processing unit E3 that is included in the map representation data processing device E.

The map representation data processing device E includes a storage unit C1, an acceptance unit C2, a processing unit E3, and an output unit E4.

The storage unit C1 includes a location dictionary storage unit C11, a map representation data storage unit C12, an accurate map information storage unit C13, a learner storage unit A12, and a correspondence information storage unit C14. The acceptance unit C2 includes a map representation data acceptance unit C21. The processing unit E3 includes a character string acquisition unit C31, a classification unit C32, a feature spot detection unit C34, a coordinate information acquisition unit C35, a position information acquisition unit C36, a relationship information acquisition unit E31, a correspondence information acquisition unit E32, a scale acquisition unit E33, a region specification information acquisition unit E34, an additional location acquisition unit E35, an additional position acquisition unit E36, an additional coordinate acquisition unit E37, a location addition unit E38, and a direction information acquisition unit E39. The correspondence information acquisition unit E32 includes a judging part E321 and a correspondence information acquisition part E322. The output unit E4 includes a correspondence output unit E41, a scale information output unit E42, a region specification information output unit E43, and a direction information output unit E44.

The processing unit E3 performs various kinds of processing. Examples of the various kinds of processing include processing that is performed by the character string acquisition unit C31, the classification unit C32, the feature spot detection unit C34, the coordinate information acquisition unit C35, the position information acquisition unit C36, the relationship information acquisition unit E31, the correspondence information acquisition unit E32, the scale acquisition unit E33, the region specification information acquisition unit E34, the additional location acquisition unit E35, the additional position acquisition unit E36, the additional coordinate acquisition unit E37, the location addition unit E38, and the direction information acquisition unit E39.

The relationship information acquisition unit E31 acquires relationship information. Relationship information is information regarding relationship between three or more pieces of correspondence information. The relationship information acquisition unit E31 acquires relationship information, using three or more pieces of correspondence information. Relationship information is, for example, distance relationship information described alter, or angle relationship information described later. Note that correspondence information is a set of coordinate information and position information corresponding to a character string acquired by the character string acquisition unit C31. Coordinate information corresponding to a character string acquired by the character string acquisition unit C31 is information acquired by the coordinate information acquisition unit C35. Position information corresponding to a character string acquired by the character string acquisition unit C31 from map representation data is information acquired by the position information acquisition unit C36. A character string typically is the name of a location. A location is, for example, a station, a landscape, a scenic spot, a building, a prefecture, a municipality, an intersection, a park, or the like.

It is preferable that the relationship information acquisition unit E31 acquires relative relationship information between pieces of correspondence information respectively corresponding to two character strings of the three or more character strings acquired by the character string acquisition unit C31, for each set of two character strings.

For example, the relationship information acquisition unit E31 acquires distance relationship information, using correspondence information regarding two character strings, for each set of two character strings. Distance relationship information is information indicating a relationship between a relative distance that is a difference between pieces of coordinate information regarding the two character strings and an absolute distance that is a difference between pieces of position information regarding the two character strings. Note that the set of two character strings is a set of two strings of the three or more character strings acquired by the character string acquisition unit C31.

Distance relationship information is, for example, MPP. MPP is meters per pixel (m/pixel). When the pieces of correspondence information respectively corresponding to the two character strings are correspondence information 1 "coordinate information $1(x_1,y_1)$, position information $1(X_1,$ $Y_1$)" and correspondence information 2 "coordinate information 2($x_2,y_2$), position information 2($X_2,Y_2$)", MPP=" (distance (meters) between position information 1 and position information 2)/(the number of pixels between coordinate information 1 and coordinate information 2). Distance relationship information is, for example, PPM. PPM is "PPM=(the number of pixels between coordinate information 1 and coordinate information 2)/(the distance (meters) between location information 1 and location information 2)". The method of calculating the distance between location information 1 ($X_1,Y_1$) and location information 2 ($X_2,Y_2$) and the method of calculating the number of pixels between coordinate information 1 ($x_1,y_1$) and coordinate information 2 ($x_2,y_2$) are well-known techniques, and therefore the descriptions thereof are omitted here.

For example, the relationship information acquisition unit E31 acquires angle relationship information, using correspondence information regarding two character strings, for each set of two character strings.

Angle relationship information is information that indicates a relative angle and an absolute angle. The relative angle is an angle that can be obtained from coordinate information regarding two character strings. The relative angle is the angle of a straight line connecting two pieces of coordinate information to a reference line (for example, the straight line on the lower side of the rectangular map representation data or the straight line on the right side of the rectangular map representation data). The absolute angle is, for example, the angle between the straight line in a reference direction (for example, east or north) and a straight line obtained by connecting pieces of position information regarding two character strings.

Angle relationship information is, for example, information regarding the difference between the relative angle and the absolute angle (for example, "the relative angle−the absolute angle", "the absolute angle−the relative angle", or "the relative angle−the absolute angle"). Information regarding the difference between the relative angle and the absolute angle may be, for example, (cos (the relative angle−the absolute angle), sin(the relative angle−the absolute angle)), (cos(the absolute angle−the relative angle), sin(the absolute angle−the relative angle)), or the like. Note that information regarding the difference between the relative angle and the absolute angle is referred to as Rotation as appropriate.

The correspondence information acquisition unit E32 only acquires two or more pieces of correspondence information corresponding to relationship information that satisfies a predetermined relationship, of three or more pieces of correspondence information, using three or more pieces of correspondence information.

The correspondence information acquisition unit E32 judges whether or not each of three or more pieces of distance relationship information satisfies a predetermined relationship, excludes a piece of correspondence information corresponding to a piece of distance relationship information that does not satisfy the predetermined relationship from the pieces of correspondence information respectively corresponding to the three or more character strings acquired by the character string acquisition unit C31, and only acquires the remaining two or more pieces of correspondence information.

The correspondence information acquisition unit E32 judges whether or not each of three or more pieces of angle relationship information satisfies a predetermined relationship, excludes a piece of correspondence information corresponding to a piece of angle relationship information that does not satisfy the predetermined relationship from the pieces of correspondence information respectively corresponding to the three or more character strings acquired by the character string acquisition unit C31, and only acquires the remaining two or more pieces of correspondence information.

It is preferable that, when both the distance relationship information and the angle relationship information satisfy the predetermined conditions, the correspondence information acquisition unit E32 acquires only two or more pieces of correspondence information corresponding to the distance relationship information and the angle relationship information.

The judging part E321 included in the correspondence information acquisition unit E32 groups the three or more pieces of relationship information acquired by the relationship information acquisition unit E31, and determines a piece of relationship information that is not included in the group. Note that, for example, Hierarchical Agglomerative Clustering [HAC] can be used as an algorithm for clustering pieces of relational information. For more information regarding HAC, see the Internet URLs "http://pub.ist.ac.at/edels/Papers/1984-J-05-HierarchicalClustering.pdf" and "http://citeseerx.ist.psu.edu/viewdoc/ download?doi=10.1.1.299.7703&rep=rep1&type=pdf". There is no limitation on the algorithm used for clustering the set of pieces of information.

The correspondence information acquisition part E322 excludes a piece of correspondence information corresponding to the piece of relationship information that is not included in the group from the pieces of correspondence information respectively corresponding to the three more character strings acquired by the character string acquisition unit C31, and only acquires the remaining two or more pieces of correspondence information.

The scale acquisition unit E33 acquires a representative value of distance relationship information from the three or more pieces of relationship information, and acquires scale information regarding map representation data, using the representative value of distance relationship information. The representative value is, for example, a mean value or a median value. For example, when the representative value of the distance relationship information (for example, MPP here) is α, the scale acquisition unit E33 acquires scale information "α", for example.

The region specification information acquisition unit E34 acquires relative vertical distances that are vertical distances between the pieces of coordinate information corresponding to the character strings acquired by the character string acquisition unit C31 and the four sides of the map representation data, respectively, and acquires region specification information that specifies the range of the map representation data in the real world, using the relative vertical distances and the scale information (for example, MPP). The range in the real world is the range in the accurate map information.

The region specification information acquisition unit E34 calculates, for example, the relative vertical distances between the pieces of coordinate information contained in the two or more correspondence information ultimately acquired by the correspondence information acquisition unit E32 and the sides (the top side, the bottom side, the left side, and the right side) of the map representation data, respectively. Note that the technique for calculating the vertical distance between a point and a straight line is a well-known technique.

Thereafter, the region specification information acquisition unit E34 acquires, for example, the representative value (for example, a median value or an average value) of the two or more relative vertical distances, for each side. Next, the region specification information acquisition unit E34 acquires, for example, position information regarding the location of the representative value of the relative vertical distances for each side. Next, for example, the region specification information acquisition unit E34 acquires, for each side, the latitude or the longitude of the side, through "distance relationship information (MPP)×the representative value of the relative vertical distances".

The additional location acquisition unit E35 acquires location information in the range indicated by the region specification information, from the location dictionary. It is preferable that the additional location acquisition unit E35 acquires two or more pieces of location information in the range indicated by the region specification information from the location dictionary, and acquires a piece of location information by excluding the character strings acquired by the character string acquisition unit C31, from the acquired pieces of location information. The location dictionary to be used may be a location dictionary that is present in the location dictionary storage unit C11, or a location dictionary that is present in an external device (not shown).

It is also preferable that the additional location acquisition unit E35 acquires location information in the range indicated by region specification information and one or more attribute values of the location information (for example, a station name, whether or not it is a landscape, an intersection name, or the like), and acquires location information that is paired with the one or more attribute values that satisfy the predetermined condition, from the location dictionary.

The additional position acquisition unit E36 acquires position information corresponding to the location information acquired by the additional location acquisition unit E35, from the location dictionary.

The additional coordinate acquisition unit E37 acquires coordinate information corresponding to the position information acquired by the additional position acquisition unit E36. The additional coordinate acquisition unit E37, for example, acquires the difference between position information that is contained in one piece of correspondence information and the position information acquired by the additional position acquisition unit E36, acquires the difference from the coordinate information contained in the one piece of correspondence information, using the difference from the position information and the distance relationship information (MPP), and acquires coordinate information corresponding to the position information acquired by the additional position acquisition unit E36, using the difference between the coordinate information contained in the one correspondence information and the coordinate information.

The location addition unit E38 places the location information (character string) acquired by the additional location acquisition unit E35 at the position indicated by the coordinate information acquired by the additional coordinate acquisition unit E37. Note that location information is added on the map representation data.

The direction information acquisition unit E39 acquires the representative value of angle relationship information from three or more pieces of angle relationship information, and acquires direction information that indicates the direction in the map representation data, using the representative value of angle relationship information.

When angle relationship information (in this case, for example, "a relative angle–an absolute angle") is "−30", north in the real world is 30 degrees from the directly upward direction to the direction upward and rightward in the map representation data, and the direction information acquisition unit E39 acquires, for example, direction information "30 degrees". Here, direction information is a clockwise angle from the direction directly upward in the map representation data. The direction information may be a pattern corresponding to the acquired angle.

The output unit E4 outputs various kinds of information. Examples of various kinds of information include correspondence information, scale information, map representation data, accurate map information, and direction information. Here, "output" typically means accumulation on a recording medium, but may be regarded as a concept that includes displaying on a display device, projection with a projector, printing with a printer, sound output, transmission to an external device, delivery of processing results to another processing apparatus or another program, and so on.

The correspondence output unit E41 accumulates the two or more pieces of correspondence information acquired by the correspondence information acquisition unit E32. The correspondence output unit E41 may display the two or more pieces of correspondence information or transmit them to another device.

The scale information output unit E42 outputs the scale information acquired by the scale acquisition unit E33. "Output" here typically means displaying, but may be accumulation in a recording medium, transmission to an external device, or the like.

The region specification information output unit E43 outputs the region specification information acquired by the region specification information acquisition unit E34. "Output" here typically means display, but may be accumulation in a recording medium, transmission to an external device, or the like.

The direction information output unit E44 outputs the direction information acquired by the direction information acquisition unit E39. "Output" here typically means display, but may be accumulation in a recording medium, transmission to an external device, or the like.

The processing unit E3, the character string acquisition unit C31, the classification unit C32, the feature spot detection unit C34, the coordinate information acquisition unit C35, the position information acquisition unit C36, the relationship information acquisition unit E31, the correspondence information acquisition unit E32, the scale acquisition unit E33, the region specification information acquisition unit E34, the additional location acquisition unit E35, the additional position acquisition unit E36, the additional coordinate acquisition unit E37, the location addition unit E38, and the direction information acquisition unit E39 typically are realized using an MPU, a memory, and so on. The processing procedures performed by the processing unit E3 typically are realized using software, and the software is recorded on a recording medium such as a ROM. However, such processing procedures may be realized using hardware (a dedicated circuit).

The output unit E4, the correspondence output unit E41, the scale information output unit E42, the region specification information output unit E42, and the direction information output unit E44 may be regarded as including or not including an output device such as a display or a speaker. The output unit E4 and so on can be realized using the driver software of the output device, the driver software of the output device and the output device, or the like.

Figure 21:
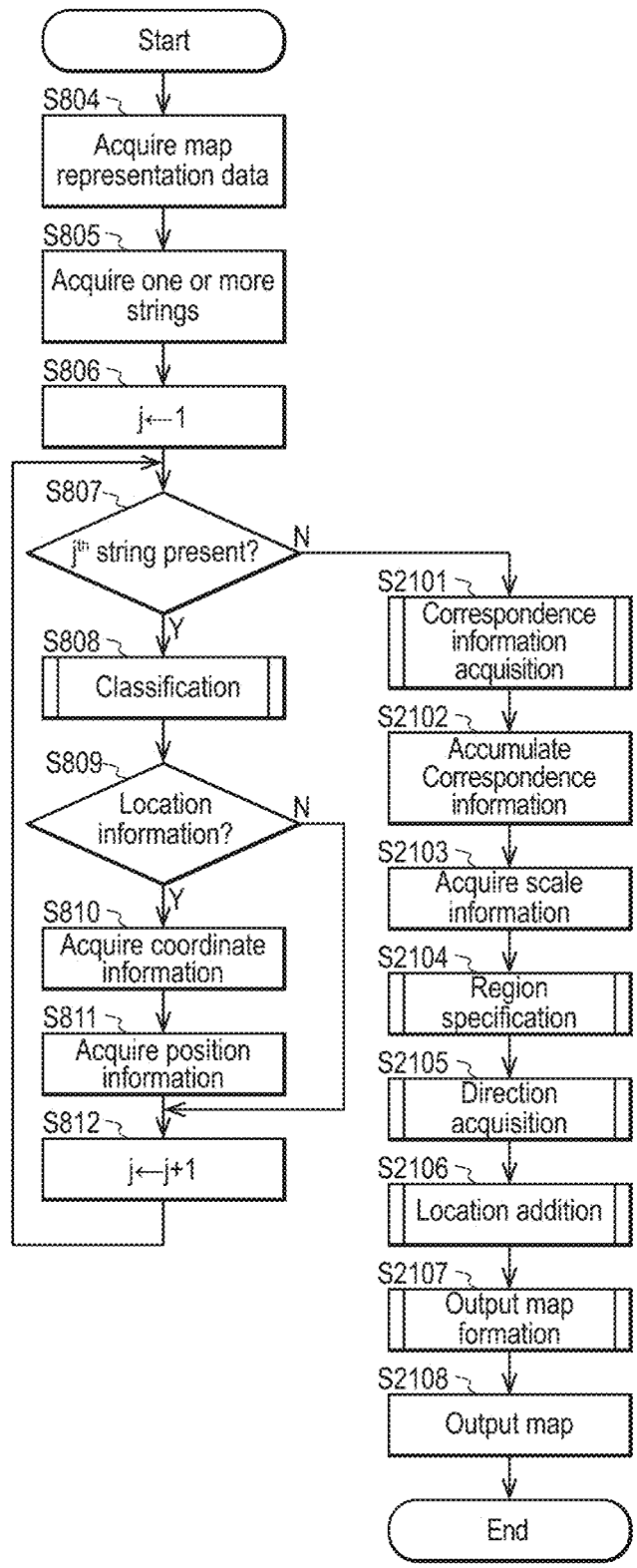
FIG. 21 is a flowchart illustrating examples of operations of the map representation data processing device E according to the same.

Next, examples of operations of the map representation data processing device E will be described with reference to the flowchart shown in FIG. 21. In the flowchart in FIG. 21, descriptions of the same steps as in the flowchart in FIG. 8 are omitted. Note that the flowchart in FIG. 21 has steps S804 to S812.

(Step S2101) The processing unit E3 performs correspondence information acquisition processing, using the map representation data acquired in step S804. An example of correspondence information acquisition processing will be described with reference to the flowchart shown in FIG. 22. Note that correspondence information acquisition processing is processing that is performed to acquire one or more pieces of correspondence information that are to be accumulated. The map representation data to be processed typically is map representation data that is in the map representation data storage unit C12, but may be map representation data that has been received from an external device.

(Step S2102) The correspondence output unit E41 accumulates the one or more pieces of correspondence information acquired in step S2101. Note that the pieces of correspondence information are accumulated in the storage unit C1, for example, but may be in another device. The correspondence output unit E41 accumulates the one or more pieces of correspondence information acquired in step S2101, in association with the map representation data acquired in step S804.

(Step S2103) The scale acquisition unit E33 acquires scale information, using the representative value (for example, MPP) of the distance relationship information acquired in step S2101, and accumulates the scale information in association with the map representation data acquired in step S804. Note that pieces of scale information are accumulated in the storage unit C1, for example, but may be in another device.

(Step S2104) The region specification information acquisition unit E34 performs region specification processing. An example of region specification processing will be described with reference to the flowchart shown in FIG. 25. Note that region specification processing is processing that is performed to acquire information indicating a region in the real world corresponding to the map region indicated by the map representation data.

(Step S2105) The direction information acquisition unit E39 performs direction information acquisition processing. An example of direction information acquisition processing will be described with reference to the flowchart shown in FIG. 26. Note that direction information acquisition processing is processing that is performed to acquire information regarding a direction (may be referred to as an inclination) in the map representation data.

(Step S2106) The additional location acquisition unit E35 and so on performs location addition processing. An example of location addition processing will be described with reference to the flowchart shown in FIG. 27. Location addition processing is processing that is performed to add location information (character strings) not shown on the map representation data.

(Step S2107) The processing unit E3 performs processing to form a map that is to be output. An example of such output map forming processing will be described with reference to the flowchart shown in FIG. 28.

(Step S2108) The output unit E4 outputs the map representation data formed in step S2107 and the accurate map information formed in step S2107. Processing is terminated. Here, the output unit E4 may output only one map of either map representation data or accurate map information.

Next, an example of the correspondence information acquisition processing in step S2101 will be described with reference to the flowchart shown in FIG. 22.

(Step S2201) The correspondence information acquisition unit E31 performs distance relationship information acquisition processing. An example of the distance relationship information acquisition processing will be described with reference to the flowchart shown in FIG. 23. Note that distance correspondence information acquisition processing is processing that is performed to acquire one or more pieces of distance relationship information for a set of two or more pieces of correspondence information.

(Step S2202) The judging part E321 groups the three more pieces of distance relationship information acquired in step S2201. Thereafter, the judging part E321 acquires one or more groups for the pieces of distance relationship information. Note that the above-described HAC is used for grouping, for example.

(Step S2203) The correspondence information acquisition part E322 substitutes 1 for the counter i.

(Step S2204) The correspondence information acquisition part E322 judges whether or not the $i^{th}$ group acquired in step S2202 is present. If the $i^{th}$ group is present, processing proceeds to step S2205, and if the $i^{th}$ group is not present, processing returns to higher level processing.

(Step S2205) The correspondence information acquisition part E322 judges whether or not the $i^{th}$ group satisfies a predetermined condition regarding the number of locations in the group. If the condition is satisfied, processing proceeds to step S2206, and if the condition is not satisfied, processing proceeds to step S2209. Note that the predetermined condition is, for example, that the number of locations (which may also be referred to as character strings) corresponding to the $i^{th}$ group is no less than a threshold value, the number of locations corresponding to the $i^{th}$ group is greater than the threshold value, the percentage of locations corresponding to the $i^{th}$ group is no less than the threshold value, the percentage of locations corresponding to the $i^{th}$ group is greater than the threshold value, or the like. Note that the percentage is "the number of locations corresponding to the $i^{th}$ group/the number of locations belonging to one of the groups".

(Step S2206) The correspondence information acquisition part E322 acquires correspondence information regarding two or more locations corresponding to the $i^{th}$ group.

(Step S2207) The relationship information acquisition unit E31 performs angle relationship information acquisition processing on the correspondence information regarding the two or more locations acquired in step S2206. An example of the angle relationship information acquisition processing will be described with reference to the flowchart shown in FIG. 24.

(Step S2208) The judging part E321 groups the three more pieces of angle relationship information acquired in step S2207. Thereafter, the judging part E321 acquires one or more groups regarding the pieces of angle relationship information. Note that the above-described HAC is used for grouping, for example.

(Step S2209) The correspondence information acquisition part E322 substitutes 1 for the counter j.

(Step S2210) The correspondence information acquisition part E322 judges whether or not the $j^{th}$ group is present in the groups acquired in step S2208. If the $j^{th}$ group is present, processing proceeds to step S2211, and if the $j^{th}$ group is not present, processing proceeds to step S2214.

(Step S2211) The correspondence information acquisition part E322 judges whether or not the $j^{th}$ group satisfies a predetermined condition regarding the number of locations in the group. If the condition is satisfied, processing proceeds to step S2212, and if the condition is not satisfied, processing proceeds to step S2213. Note that the predetermined condition is, for example, that the number of locations (which may also be referred to as character strings) corresponding to the $j^{th}$ group is no less than a threshold value, the number of locations corresponding to the $j^{th}$ group is greater than the threshold value, the percentage of locations corresponding to the $j^{th}$ group is no less than the threshold value, the percentage of locations corresponding to the $j^{th}$ group is greater than the threshold value, or the like. Note that the percentage is "the number of locations corresponding to the $j^{th}$ group/the number of locations belonging to one of the groups".

(Step S2212) The correspondence information acquisition part E322 acquires correspondence information regarding two or more locations corresponding to the $j^{th}$ group.

(Step S2213) The correspondence information acquisition part E322 increments the counter j by 1. Processing returns to step S2210.

(Step S2214) The correspondence information acquisition part E322 increments the counter i by 1. Processing returns to step S2204.

Figure 22:
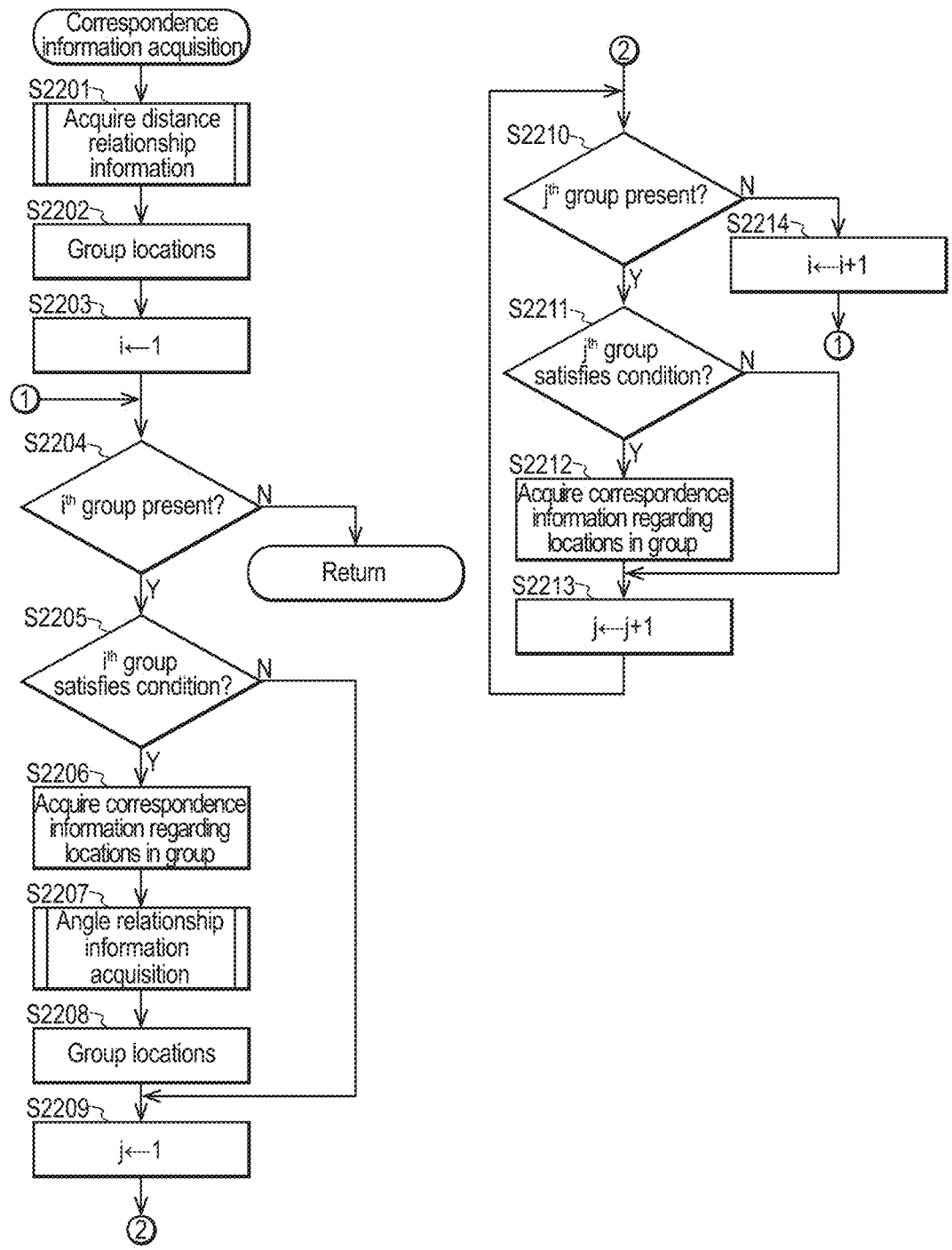
FIG. 22 is a flowchart illustrating an example of correspondence information acquisition processing according to the same.

Note that, in the flowchart in FIG. 22, the correspondence information acquisition part E322 may select only one group that includes the largest number of locations when multiple groups are detected in step S2202 or step S2208.

Figure 23:
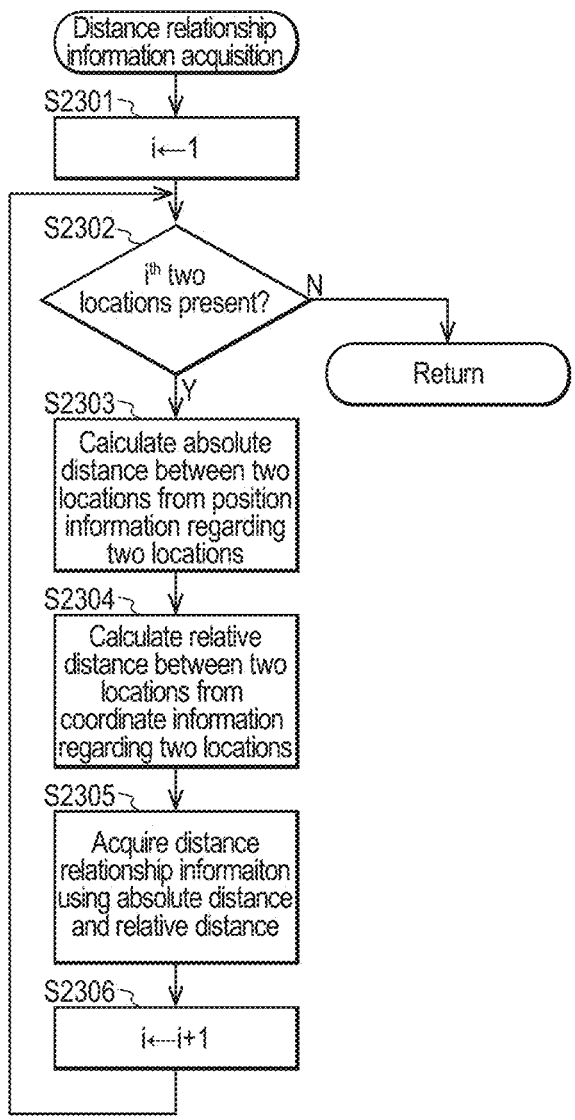
FIG. 23 is a flowchart illustrating an example of distance relationship information acquisition processing according to the same.

Next, an example of the distance relationship information acquisition processing in step S2201 will be described with reference to the flowchart shown in FIG. 23.

(Step S2301) The relationship information acquisition unit E31 substitutes 1 for the counter i.

(Step S2302) The relationship information acquisition unit E31 judges whether or not a set of the $i^{th}$ two locations is present in the three or more locations that are to be processed. If a set of the $i^{th}$ two locations is present, processing proceeds to step S2303, and otherwise processing returns to higher level processing.

(Step S2303) The relationship information acquisition unit E31 acquires pieces of position information regarding the two locations in the $i^{th}$ set, and calculates an absolute distance between the two locations from the two pieces of position information.

(Step S2304) The relationship information acquisition unit E31 acquires pieces of coordinate information regarding the two locations in the $i^{th}$ set, and calculates a relative distance between the two locations from the two pieces of coordinate information.

(Step S2305) The relationship information acquisition unit E31 acquires distance relationship information (for example, MPP), using the absolute distance calculated in step S2303 and the relative distance calculated in step S2304, and temporarily accumulates the distance relationship information in association with information regarding the $i^{th}$ set.

(Step S2306) The relationship information acquisition unit E31 increments the counter i by 1. Processing returns to step S2302.

Figure 24:
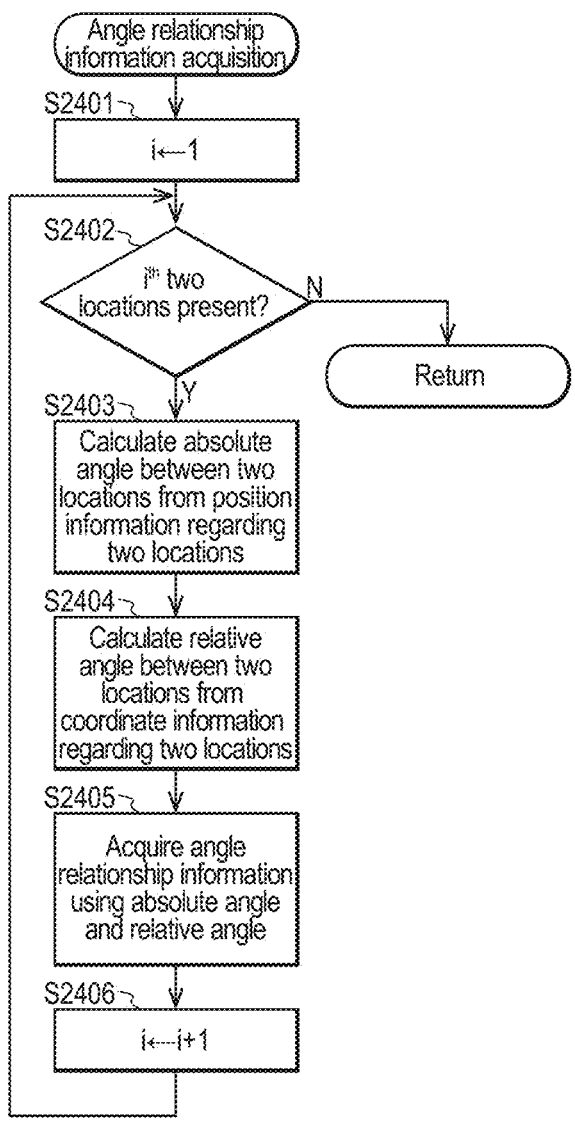
FIG. 24 is a flowchart illustrating an example of angle relationship information acquisition processing according to the same.

Next, an example of the angle relationship information acquisition processing in step S2207 will be described with reference to the flowchart shown in FIG. 24.

(Step S2401) The relationship information acquisition unit E31 substitutes 1 for the counter i.

(Step S2402) The relationship information acquisition unit E31 judges whether or not a set of the $i^{th}$ two locations is present in the three or more locations that are to be processed. If a set of the $i^{th}$ two locations is present, processing proceeds to step S2403, and otherwise processing returns to higher level processing.

(Step S2403) The relationship information acquisition unit E31 acquires pieces of position information regarding the two locations in the $i^{th}$ set, and calculates an absolute angle between the two locations from the two pieces of position information.

(Step S2404) The relationship information acquisition unit E31 acquires pieces of coordinate information regarding the two locations in the $i^{th}$ set, and calculates a relative angle between the two locations from the two pieces of coordinate information.

(Step S2405) The relationship information acquisition unit E31 acquires angle relationship information (for example, Rotation), using the absolute angle calculated in step S2403 and the relative angle calculated in step S2404, and temporarily accumulates the angle relationship information in association with information regarding the $i^{th}$ set.

(Step S2406) The relationship information acquisition unit E31 increments the counter i by 1. Processing returns to step S2402.

Figure 25:
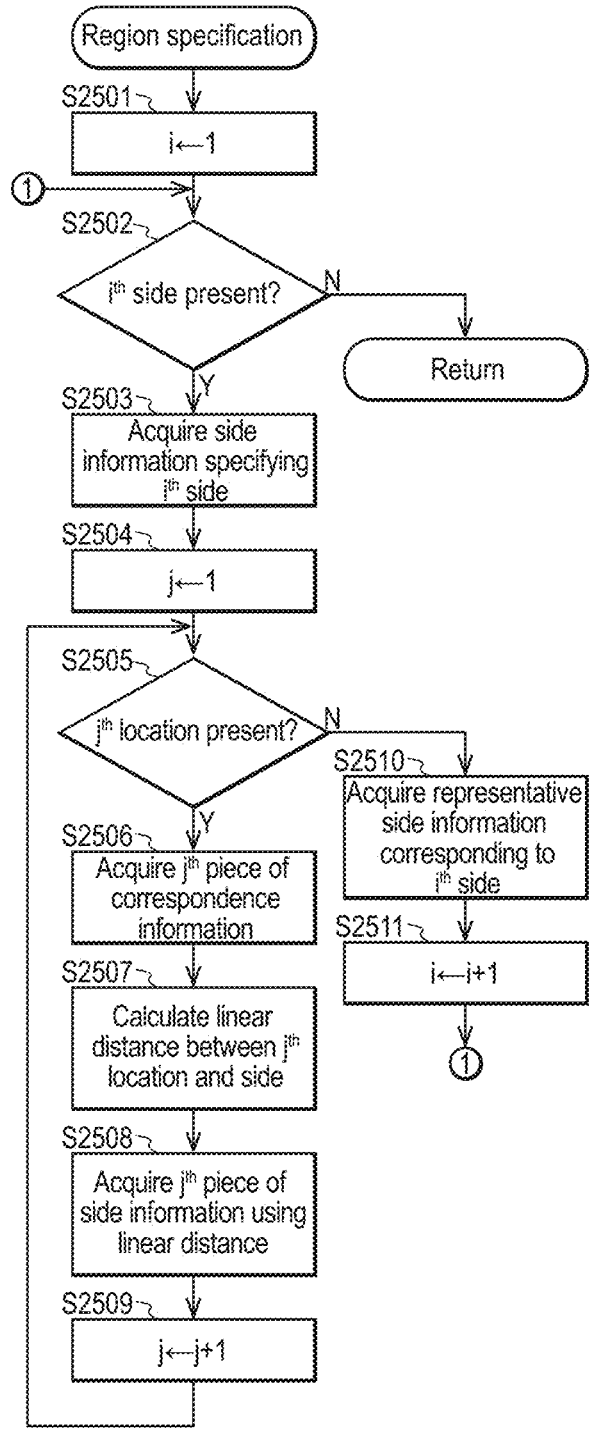
FIG. 25 is a flowchart illustrating an example of region specification processing according to the same.

Next, an example of the region specification processing in step S2104 will be described with reference to the flowchart shown in FIG. 25.

(Step S2501) The relationship information acquisition unit E34 substitutes 1 for the counter i.

(Step S2502) The region specification information acquisition unit E34 judges whether or not the $i^{th}$ side that is to be processed is present. If the $i^{th}$ side is present, processing proceeds to step S2503, and otherwise processing returns to higher level processing. Note that map representation data typically is a rectangle, and the sides to be processed typically are four sides, namely the top side, the bottom side, the left side, and the right side.

(Step S2503) The region specification information acquisition unit E34 acquires side information that specifies the $i^{th}$ side of the map representation data. Side information is, for example, the coordinates $(x_1,y_1)$ and $(x_2,y_2)$ of two end points that form a side. Also, for example, the region specification information acquisition unit E34 acquires coordinate information regarding the two end points of a side of a map representation data file, assuming that the entire map representation data (typically an image file) is map data. The region specification information acquisition unit E34 may, for example, perform contour extraction processing on the map representation data and acquire information regarding the contour lines between regions other than the map (for example, blank regions) and the region of the map. The processing performed to acquire information regarding such contour lines is processing that is performed to acquire side information.

(Step S2504) The region specification information acquisition unit E34 substitutes 1 for the counter j.

(Step S2505) The region specification information acquisition unit E34 judges whether or not the $j^{th}$ piece of target information that is to be processed is present. If the $j^{th}$ target information is present, processing proceeds to step S2506, and if the $j^{th}$ target information is not present, processing proceeds to step S2510. Note that the target information that is to be processed corresponds to a location.

(Step S2506) The region specification information acquisition unit E34 acquires the $j^{th}$ piece of target information that is to be processed.

(Step S2507) The region specification information acquisition unit E34 calculates the linear distance (for example, the number of pixels) in the map representation data between the $j^{th}$ location and the $i^{th}$ side, using the coordinate information contained in the $j^{th}$ piece of target information and the side information regarding the $i^{th}$ side.

(Step S2508) The region specification information acquisition unit E34 acquires the position information regarding the two end points of the $i^{th}$ side, using the position information contained in the $j^{th}$ target information, the linear distance calculated in step S2507, and the representative value (for example, MPP) of the distance relationship information. Note that position information regarding such two end points is referred to as side information.

(Step S2509) The region specification information acquisition unit E34 increments the counter j by one. Processing returns to step S2505.

(Step S2510) The region specification information acquisition unit E34 acquires the representative value (for example, a median value or an average value) of the two or more pieces of side information regarding the $i^{th}$ side. Note that such a representative value is representative side information. Representative side information is, for example, information regarding the middle line of the two or more pieces of side information. Representative edge information is, for example, the average value of the two end points contained in each of the two or more pieces of side information. For example, when the two pieces of side information are side information 1 $(x_{11},y_1)(x_{12},y_{12})$ and side information 2 $(x_{21},y_{21})(x_{22},y_{22})$, the representative side information regarding the average value is $((x_{11}+x_{21}/2), (y_{11}+y_{21}/2))((x_{12}+x_{22}/2),(y_{12}+y_{22}/2))$.

(Step S2511) The region specification information acquisition unit E34 increments the counter i by one. Processing returns to step S2502.

Figure 26:
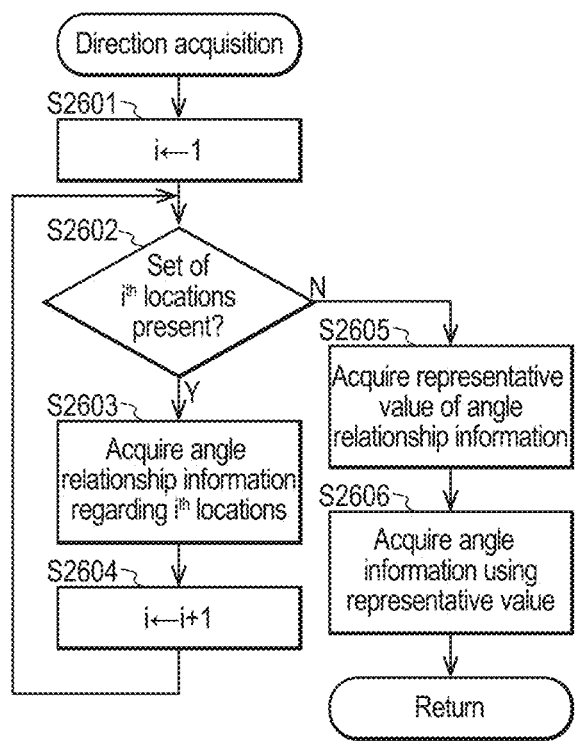
FIG. 26 is a flowchart illustrating an example of direction information acquisition processing according to the same.

Next, an example of the direction information acquisition processing in step S2105 will be described with reference to the flowchart shown in FIG. 26.

(Step S2601) The direction information acquisition unit E39 substitutes 1 for the counter i.

(Step S2602) The direction information acquisition unit E39 judges whether or not a set of the $i^{th}$ locations is present. If a set of the $i^{th}$ locations is present, processing proceeds to step S2603, and if a set of the $i^{th}$ locations is not present, processing proceeds to step S2605.

(Step S2603) The direction information acquisition unit E39 acquires angle relationship information regarding the $i^{th}$ locations.

(Step S2604) The direction information acquisition unit E39 increments the counter i by 1. Processing returns to step S2602.

(Step S2605) The direction information acquisition unit E39 acquires the representative value (for example, the average value or the median value) of the two or more pieces of angle relationship information acquired in step S2603.

(Step S2606) The direction information acquisition unit E39 acquires angle information, using the representative value of the pieces of angle relationship information acquired in step S2605. Processing returns to higher level processing. Note that the direction information acquisition unit E39 acquires angle information, using a calculation formula "angle information=f(the representative value of angle relationship information)". Note that the calculation formula is, for example, "angle information=−1×(the representative value of angle relationship information)".

Next, an example of the location addition processing in step S2106 will be described with reference to the flowchart shown in FIG. 27.

(Step S2701) The additional location acquisition unit E35 substitutes 1 for the counter i.

(Step S2702) The additional location acquisition unit E35 judges whether or not the $i^{th}$ piece of location position information is present in the location dictionary. If the $i^{th}$ piece of location position information is present, the processing proceeds to step S2703, and if the $i^{th}$ piece of location position information is not present, processing returns to higher level processing.

(Step S2703) The additional position acquisition unit E36 acquires the position information contained in the $i^{th}$ piece of location position information from the location dictionary.

(Step S2704) The additional location acquisition unit E35 judges whether or not the position information acquired in step S2703 is within the range of the region indicated by the region specification information. If the position information is within the range of the region, processing proceeds to step S2705, and if the position information is not within the range of the region, processing proceeds to step S2711. Note that the processing performed to determine whether or not a piece of position information is position information regarding a location in the region when region specification information that indicates the range of the region is present is a well-known technique.

(Step S2705) The additional coordinate acquisition unit E37 acquires coordinate information corresponding to the position information acquired in step S2703.

(Step S2706) The additional position acquisition unit E35 acquires location information that is contained in the $i^{th}$ piece of location position information, from the location dictionary.

(Step S2707) The additional location acquisition unit E35 judges whether or not to place the location information acquired in step S2706 on the map representation data. If the location information is to be placed, processing proceeds to step S2708, and if the location information is not to be placed, processing proceeds to step S2709. Note that the additional location acquisition unit E35 judges that the location information is to be placed when, for example, one or more attribute values corresponding to the location information acquired in step S2706 satisfy a predetermined condition.

(Step S2708) The location addition unit E38 places the character strings of the location information acquired in S2706 at the position that is on the map representation data and is indicated by the coordinate information acquired in step S2705.

(Step S2709) The correspondence information acquisition unit E32 forms correspondence information that contains the correspondence information acquired in step S2703 and the coordinate information acquired in step S2705.

(Step S2710) The correspondence output unit E41 accumulates the correspondence information acquired in step S2709.

(Step S2711) The counter i is incremented by 1. Processing returns to step S2702.

Next, an example of the output map forming processing in step S2107 will be described with reference to the flowchart shown in FIG. 28.

(Step S2801) The output unit E4 acquires map representation data that is to be processed. It is preferable that the map representation data here is data to which locations have been added through the above-described location addition processing.

(Step S2802) The processing unit E3 acquires current position information. Note that the processing unit E3 may include the current position information acquisition unit D31.

(Step S2803) The processing unit E3 acquires coordinate information corresponding to the current position information acquired in step S2802, using two or more pieces of correspondence information. Note that processing unit E3 may include the coordinate information acquisition unit D32.

(Step S2804) The processing unit E3 forms current position-added map representation data that is map representation data on which the position indicated by the coordinate information acquired in step S2803 is explicitly indicated. Note that the processing unit E3 may include the data forming unit D33.

(Step S2805) The processing unit E3 acquires the region specification information acquired through the above-described region specification processing.

(Step S2806) The processing unit E3 acquires accurate map information that includes the region indicated by the region specification information acquired in step S2805.

(Step S2807) The processing unit E3 forms accurate map information that explicitly indicates the range of the region indicated by the region specification information. Processing returns to higher level processing.

Figure 28:
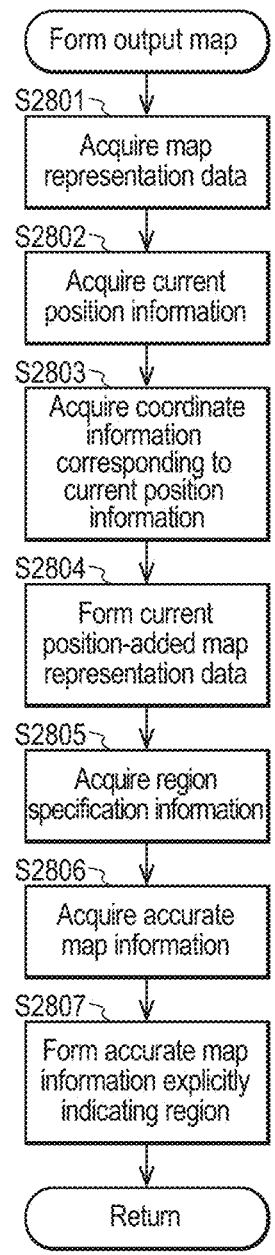
FIG. 28 is a flowchart illustrating an example of output map forming processing according to the same.

Note that, in the flowchart in FIG. 28, direction information and scale information may be added to the current position-added map representation data.

The following describes examples of specific operations of the map representation data processing device E according to the present embodiment.

Figure 29:
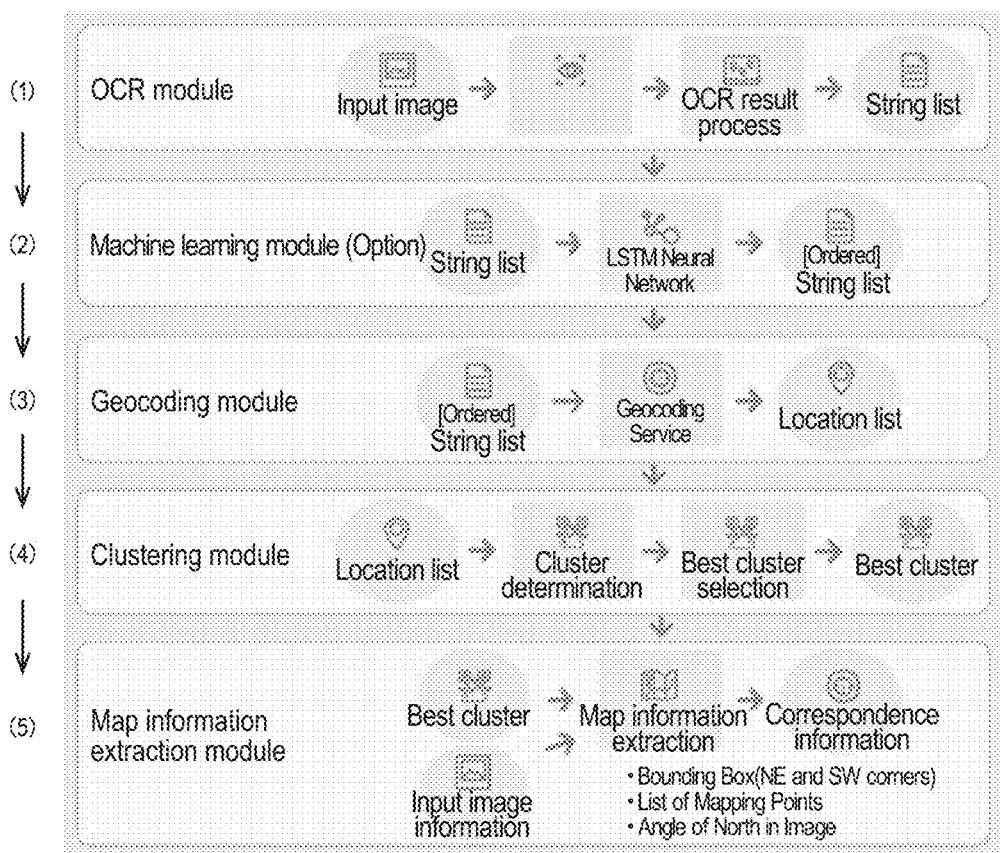
FIG. 29 is a diagram showing a specific example of processing that is performed by the map representation data processing device E according to the same.

In these specific examples, the map representation data processing device E performs the processing shown in FIG. 29.

Specifically, the map representation data processing unit E sequentially performs (1) an operation through an OCR module, (2) an operation through a machine learning module, (3) an operation through a geocoding module, (4) an operation through a clustering module, and (5) an operation through a map information extraction module. Note that the processing in (2) is an option in FIG. 29.

Figure 30:
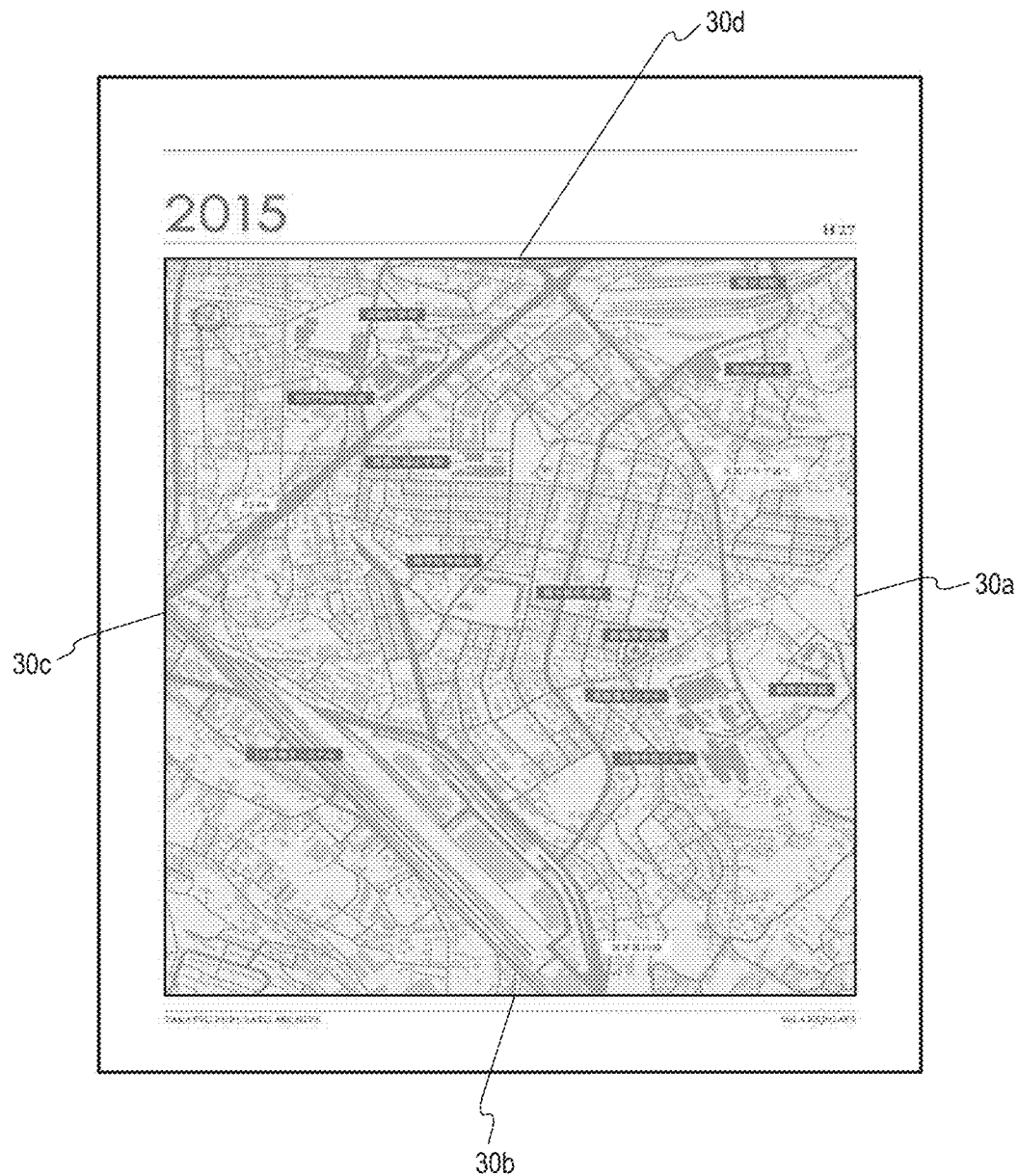
FIG. 30 is a diagram showing an example of map representation data according to the same.

Now, it is assumed that the map representation data shown in FIG. 30 is stored in the map representation data storage unit C12. Note that map representation data is referred to as an input image when necessary.

In such a situation, it is assumed that the map representation data acceptance unit C21 reads out the input image from the map representation data storage unit C12.

It is assumed that the character string acquisition unit C31 has performed character recognition processing (OCR) on an input image, and has acquired a list of character strings, namely "Takatsu Post Office", "Kajigaya Station", "2015", "Kawasaki Shimin Plaza", "Toranomon Hospital Branch", and "Cargo Terminal".

Also, the coordinate information acquisition unit C35 acquires coordinate information regarding each of the character strings acquired by the character string acquisition unit C31. This coordinate information is the relative coordinates (x,y) in the input image. The coordinate information acquisition unit C35 acquires coordinate information regarding the center of gravity of the region in which the character strings are arranged, for example.

Next, the classification unit C32 judges whether or not each character string acquired by the character string acquisition unit C31 is location information, using a machine learning technique (LSTM Neural Netowork in this example), and judges that "2015" is not location information, and writes a location information flag "−1". Through the above-described processing, the information shown in FIG. 31 can be acquired, for example. Note that the location information flag is a flag that is used to determine whether or not a character string is location information.

Next, the position information acquisition unit C36 searches the location dictionary, using the character strings "Takatsu Post Office", "Kajigaya Station", "Kawasaki Shimin Plaza", "Toranomon Hospital Branch", and "Cargo Terminal" as keys, to acquire pieces of position information (latitude, longitude) respectively corresponding to the character strings. Thus, the information shown in FIG. 32 are acquired, for example.

Figure 33:
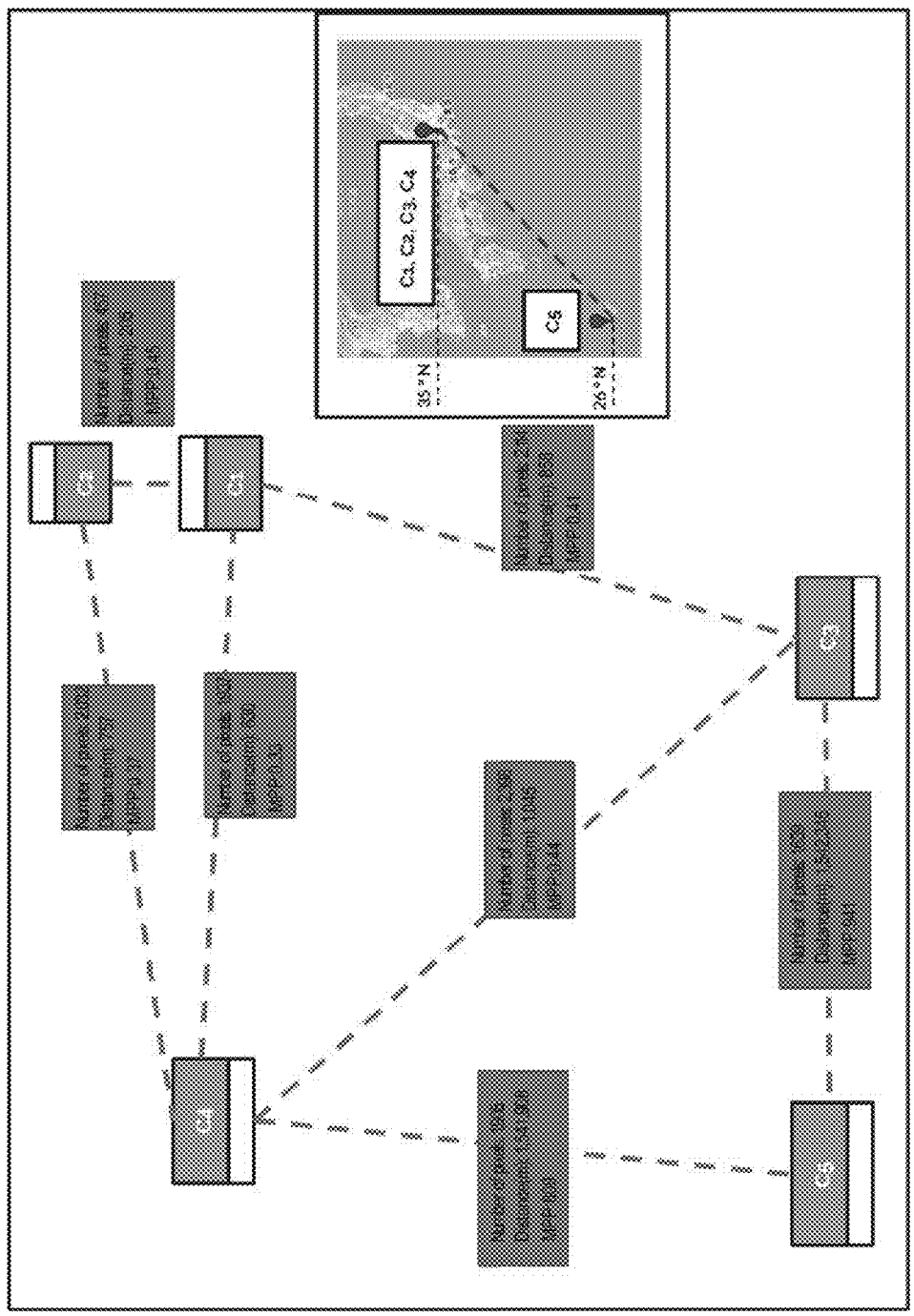
FIG. 33 is a diagram showing an image of information that is acquired by the map representation data processing device E according to the same in the middle of processing.
Figure 34:
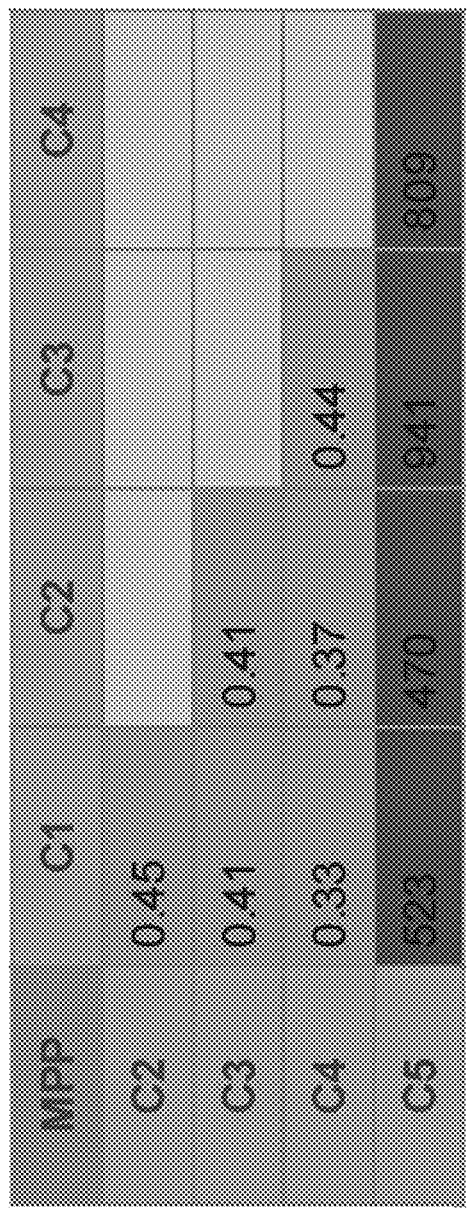
FIG. 34 is a diagram showing an example of information that is acquired by the map representation data processing device E according to the same in the middle of processing.

Next, the correspondence information acquisition unit E31 performs inspection processing using distance relationship information, as described below. That is to say, the relationship information acquisition unit E31 calculates the relative distance (the number of pixels in this example) that is the difference in coordinate information between the locations that belong to pairs of locations "C1-C2", "C1-C3", "C2-C4", "C3-C4", "C3-C5", and "C4-C5" of the locations C1 "Takatsu Post Office", C2 "Kajigaya Station", C3 "Kawasaki Shimin Plaza", C4 "Toranomon Hospital Branch", and C5 "Cargo Terminal", from the coordinate information of each location. Also, the relationship information acquisition unit E31 calculates the absolute distance (meters in this example) that is the difference in position information between the locations that belong to the pairs of locations "C1-C2", "C1-C3", "C2-C4", "C3-C4", "C3-C5", and "C4-C5", from the position information of each location. Thereafter, the relationship information acquisition unit E31 calculates the distance relationship information (MPP in this example) for each pair of two locations, using the relative distance and the absolute distance through "absolute distance/relative distance" (see FIG. 33). As a result of such processing, the distance relationship information table shown in FIG. 34 is acquired.

next, the correspondence information acquisition unit E32 performs clustering on the distance relationship information in FIG. 34 to divide it into a group consisting of "0.45", "0.41", "0.33", "0.41", "0.37", and "0.44", and a group consisting of "523", "470", "941", and "809". Thereafter, the correspondence information acquisition unit E32 acquires location identifiers "C1", "C2", "C3", and "C4" corresponding to the group consisting of "0.45", "0.41", "0.33", "0.41", "0.37", and "0.44", and a location identifier "C5" corresponding to the group consisting of "523", "470", "941", and "809".

Figure 35:
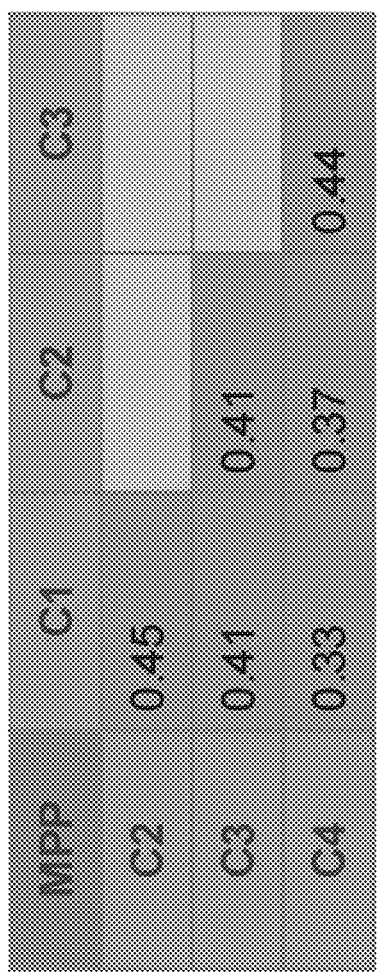
FIG. 35 is a diagram showing an example of information that is acquired by the map representation data processing device E according to the same in the middle of processing.

Thereafter, the correspondence information acquisition unit E32 selects the location identifiers of the group for which the number of location identifiers is large enough to satisfy a predetermined condition. Here, the predetermined condition is, for example, "the number of location identifiers is the largest", "the number of location identifiers is no less than a threshold value (3, for example)", "the number of location identifiers is greater than a threshold value (5, for example)", or the like. Thereafter, the correspondence information acquisition unit E32 acquires the location identifiers "C1", "C2", "C3", and "C4". That is to say, the correspondence information acquisition unit E32 selects "Takatsu Post Office", "Kajigaya Station", "Kawasaki Shimin Plaza", and "Toranomon Hospital Branch", and excludes (deletes) "Cargo Terminal". Through the above-described processing, the distance relationship information table shown in FIG. 35 is acquired. That is to say, as a result of the inspection processing performed using distance relationship information, "Cargo Terminal" is excluded.

Figure 36:
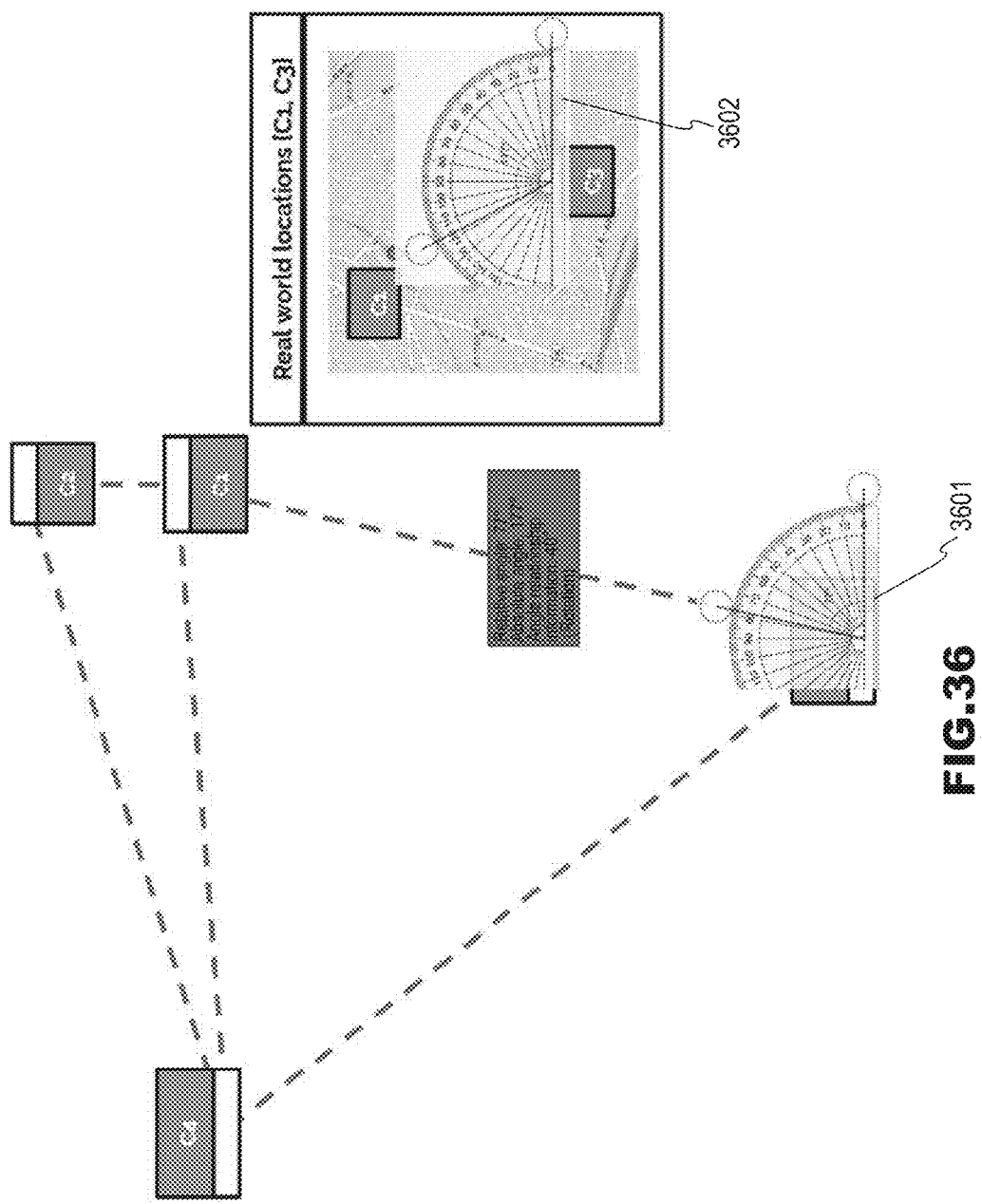
FIG. 36 is a diagram showing an image of information that is acquired by the map representation data processing device E according to the same in the middle of processing.

Next, the correspondence information acquisition unit E31 performs inspection processing using angle relationship information, as described below. That is to say, the relationship information acquisition unit E31 calculates the relative angle and the absolute angle between the locations that belong to pairs of locations "C1-C2", "C1-C3", "C2-C4", and "C3-C4", of the locations C1 "Takatsu Post Office", C2 "Kajigaya Station", C3 "Kawasaki Shimin Plaza", and C4 "Toranomon Hospital Branch". Note that the relationship information acquisition unit E31 uses coordinate information regarding two locations that constitute a pair to calculate the relative angle between the two locations. Also, the relationship information acquisition unit E31 uses coordinate information regarding two locations that constitute a pair to calculate the absolute angle between the two locations. 3601 in FIG. 36 indicates an image of the relative angle (an angle with respect to the base in a rectangular input image) between C1 and C3. 3602 in FIG. 36 indicates an image of the absolute angle (an angle with respect to the east-west direction in the real world) between C1 and C3. Thereafter, the relationship information acquisition unit E31 calculates angle relationship information (Rotation) using the relative angle and the absolute angle. Here, the relationship information acquisition unit E31 calculates angle relationship information through "angle relationship information=the relative angle−the absolute angle".

Figure 37:
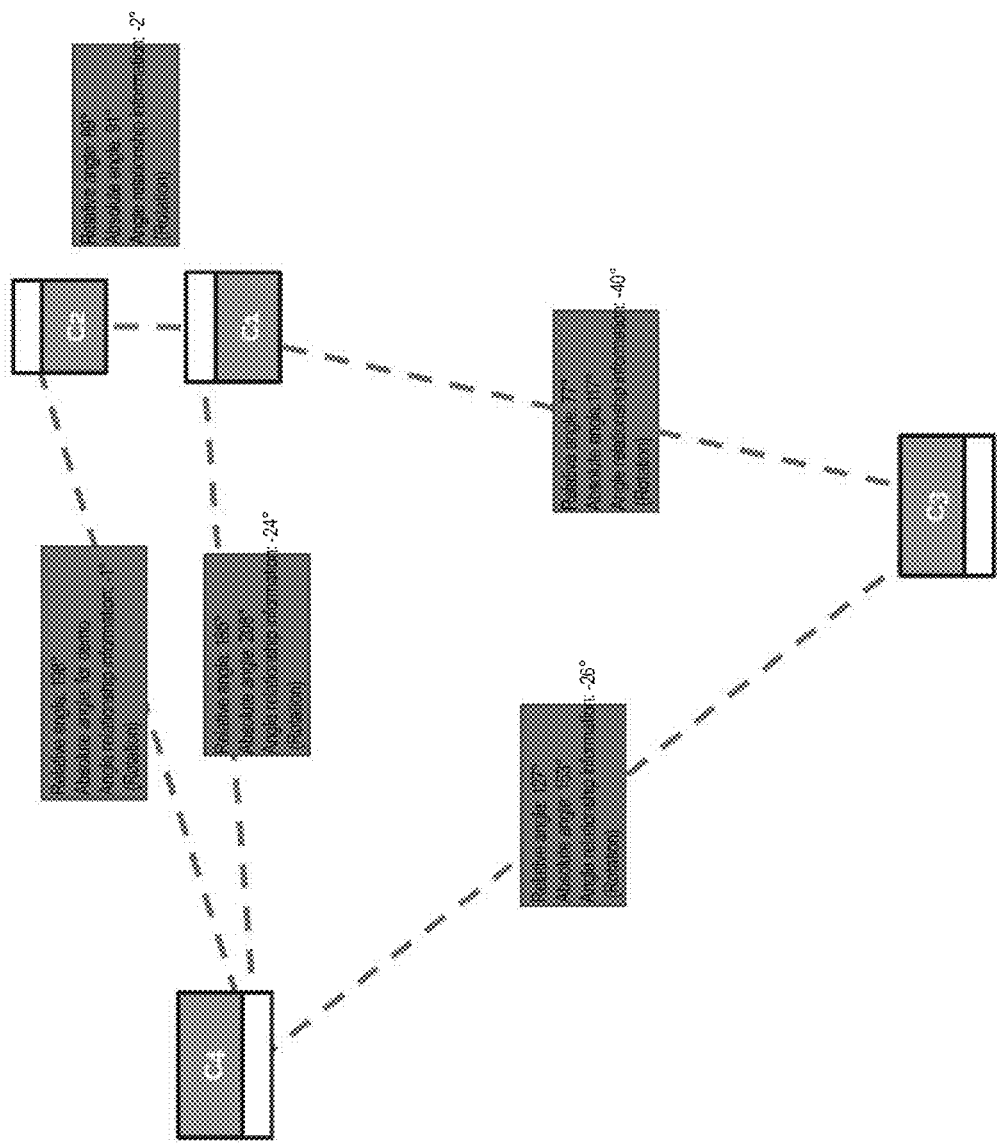
FIG. 37 is a diagram showing an image of information that is acquired by the map representation data processing device E according to the same in the middle of processing.
Figure 38:
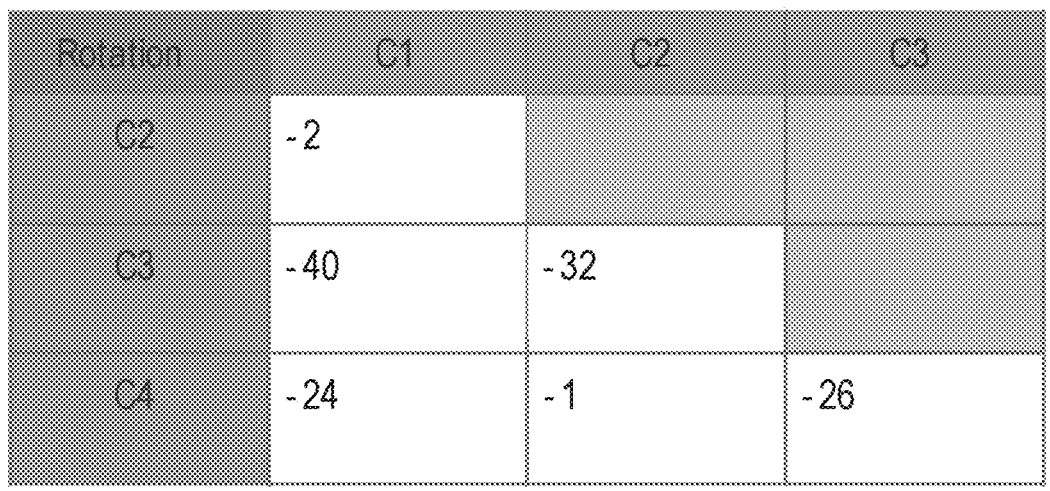
FIG. 38 is a diagram showing an example of information that is acquired by the map representation data processing device E according to the same in the middle of processing.

Through the above-described processing, the relationship information acquisition unit E31 acquires the information shown in FIG. 37. FIG. 38 shows a table formed from the information shown in FIG. 37. The relationship information acquisition unit E31 calculates (cos(angle relationship information), sin(angle relationship information)) from the angle relationship information in FIG. 38, and calculates vector data for each pair of locations (see FIG. 39). Note that vector data may be considered as angle relationship information.

Next, the correspondence information acquisition unit E32 performs clustering on the vectors shown in FIG. 39, to acquire a group 1 "(cos(−2), sin(−2)) (cos(−1), sin(−2))", and a group 2 "(cos(−40), sin(−40)) (cos(−24), sin(−24)) (cos(−32), sin(−32)) (cos(−26), sin(−26))".

Thereafter, the correspondence information acquisition unit E32 acquires the location identifier "C2" corresponding to the group 1 and the location identifiers "C1", "C3", and "C4" corresponding to the group 2.

Thereafter, the correspondence information acquisition unit E32 selects the location identifiers of the group for which the number of location identifiers is large enough to satisfy a predetermined condition. Thereafter, the correspondence information acquisition unit E32 acquires the location identifiers "C1", "C3," and "C4". That is to say, the correspondence information acquisition unit E32 selects "Takatsu Post Office", "Kawasaki Shimin Plaza", and "Toranomon Hospital Branch", and excludes (deletes) "Kajigaya Station".

Figure 40:
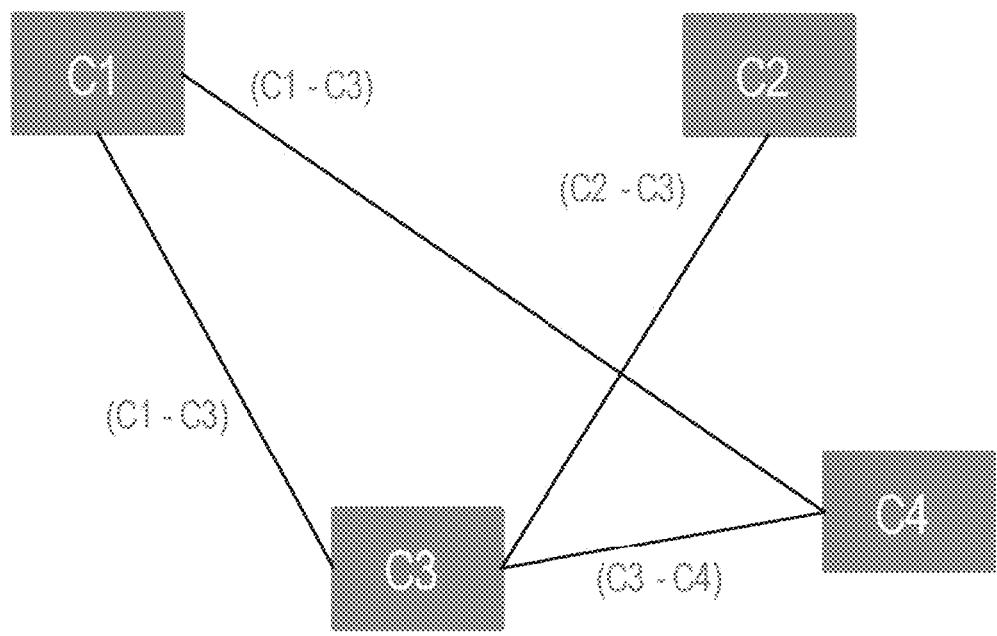
FIG. 40 is an image diagram illustrating processing that is performed by the map representation data processing device E according to the same.

Note that, as shown in FIG. 40, the correspondence information acquisition unit E32 may create links between the locations corresponding to the appropriate values "(cos (−40), sin(−40)) (cos(−24), sin(−24)) (cos(−32), sin(−32)) (cos(−26), sin(−26))" in the group 2, and acquire the location identifiers "C1", "C3", and "C4" in the largest closed space. Also, the correspondence information acquisition unit E32 may create links between the locations corresponding to the appropriate values in the group 2, and perform processing to delete the location identifier "C2" that is not a closed space, for example.

Through the above-described processing, the correspondence information acquisition unit E32 selects three locations "Takatsu Post Office", "Kawasaki Shimin Plaza", and "Toranomon Hospital Branch" as locations of the pieces of correspondence information to be accumulated. Thereafter, the correspondence information acquisition unit E32 acquires the pieces of correspondence information (coordinate information, position information) regarding the three locations. Note that the pieces of correspondence information may be linked with character strings (the names of the locations).

Next, the correspondence output unit E41 accumulates the three pieces of correspondence information thus acquired. Note that the pieces of correspondence information are accumulated in the correspondence information storage unit C14 or an external device (not shown), for example.

Figure 41:
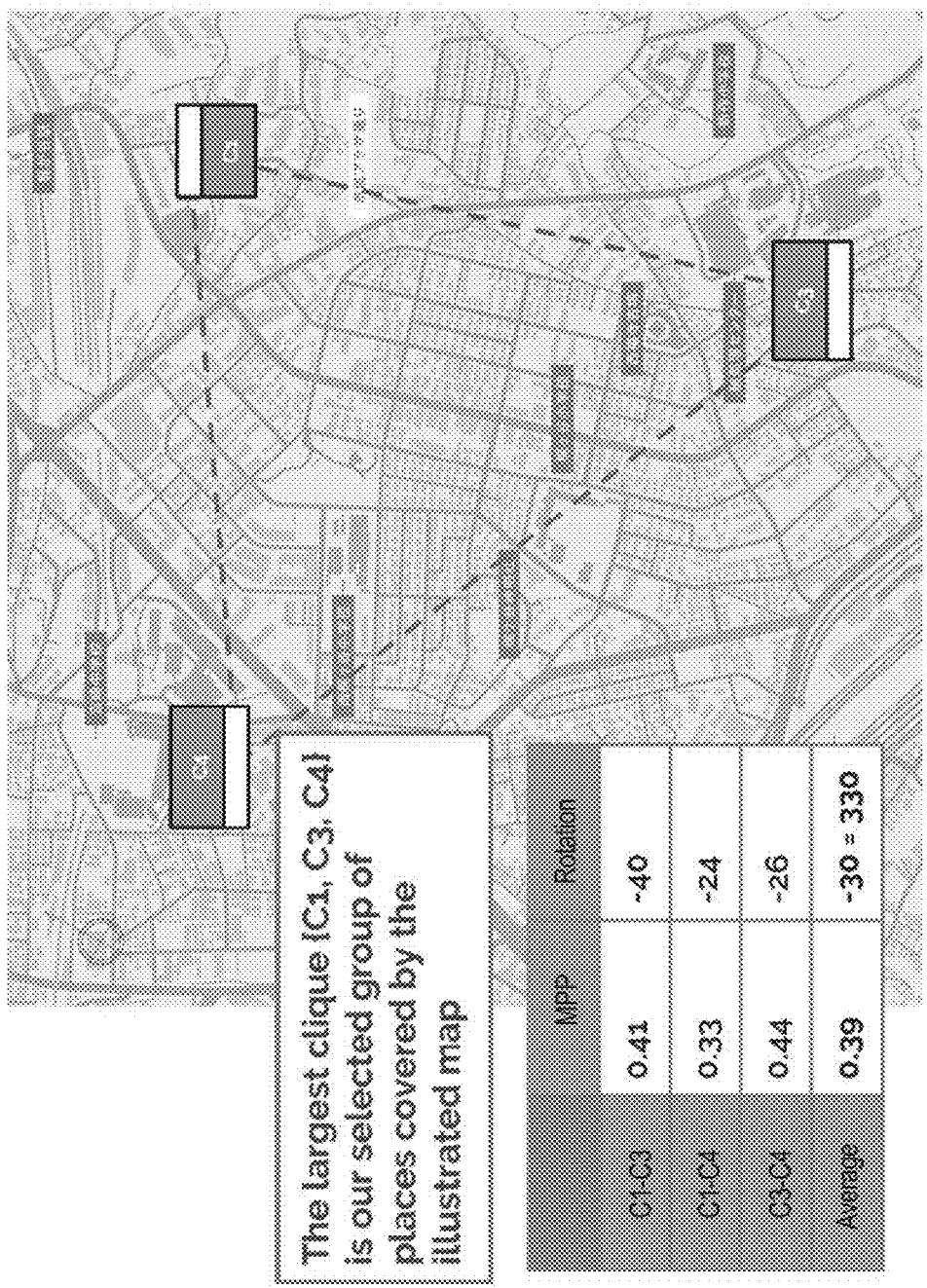
FIG. 41 is an image diagram illustrating processing that is performed by the map representation data processing device E according to the same.

Next, the correspondence information acquisition unit E32 acquires MPPs "0.41", "0.33", and "0.44" corresponding to the three locations "C1", "C3", and "C4". Next, the correspondence information acquisition unit E32 calculates the representative value (the average value in this example) of the three MPPs to obtain "0.39" (see FIG. 41).

Next, the scale acquisition unit E33 acquires scale information (for example, "0.39"), using the representative value (MPP "0.39") of the distance relationship information thus acquired, and accumulates it in association with the input image.

Figure 42:
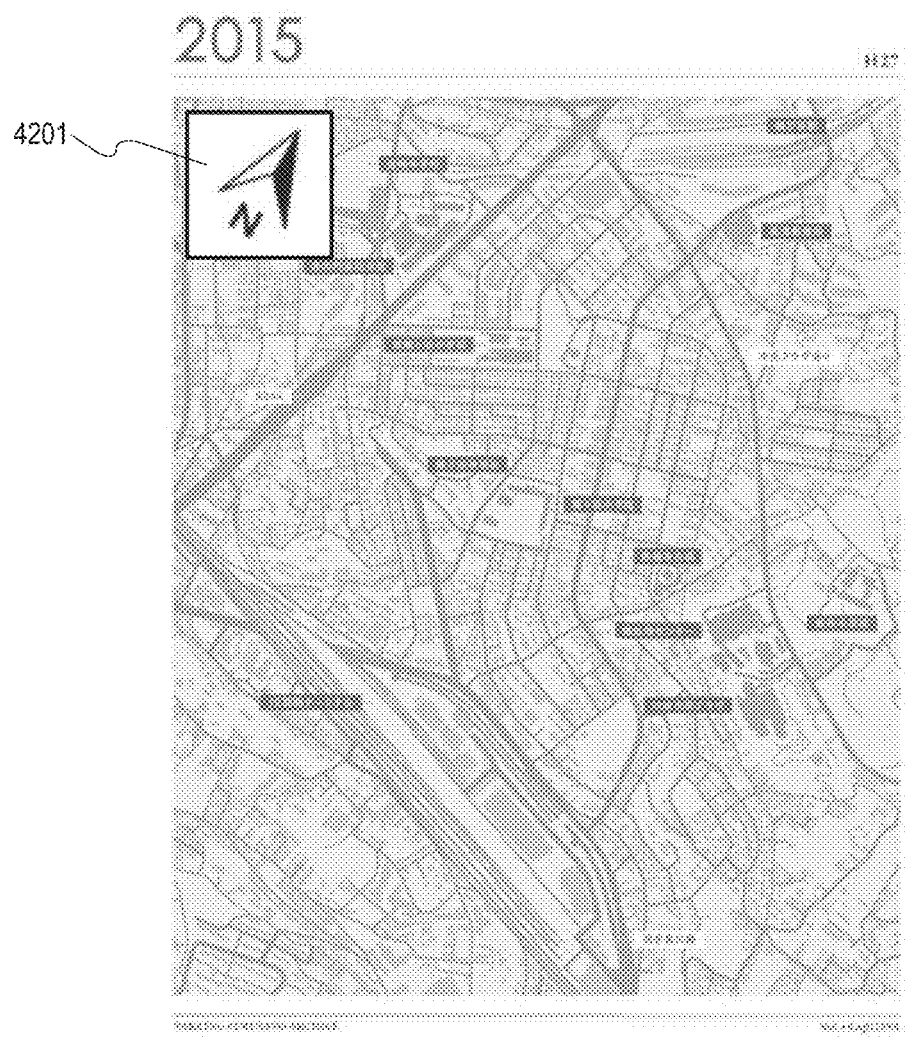
FIG. 42 is a diagram showing an example of an output from the map representation data processing device E according to the same.

Next, the direction information acquisition unit E39 performs direction information acquisition processing as described below. That is to say, the direction information acquisition unit E39 acquires pieces of angle relationship information "−40", "−24", and "−26" of the pairs of the location identifiers "C1", "C3,", and "C4". Next, the direction information acquisition unit E39 acquires the representative value (the average value in this example) "−30" of the pieces of angle relationship information. Next, the direction information acquisition unit E39 acquires "30 degrees", using a calculation formula "angle information=1×(the representative value of angle relationship information)". Thereafter, the direction information acquisition unit E39 acquires a pattern (angle information in this example) that indicates a direction that is tilted from true north to the east by 30 degrees (30 degrees clockwise). Thereafter, the direction information output unit E44 adds a pattern (angle information) indicating the angle, to the input image, and outputs it. Such an output example is shown in FIG. 42. 4201 in FIG. 42 indicates an example of angle information.

Next, the region specification information acquisition unit E34 performs region specification processing as described below. For example, first, the region specification information acquisition unit E34 detects the sides (30a,30b,30c,30d) of the region of the map in the input image shown in FIG. 30, using a contour extraction technique. Note that the technique of detecting a region through a contour extraction technique is a known technique.

Figure 43:
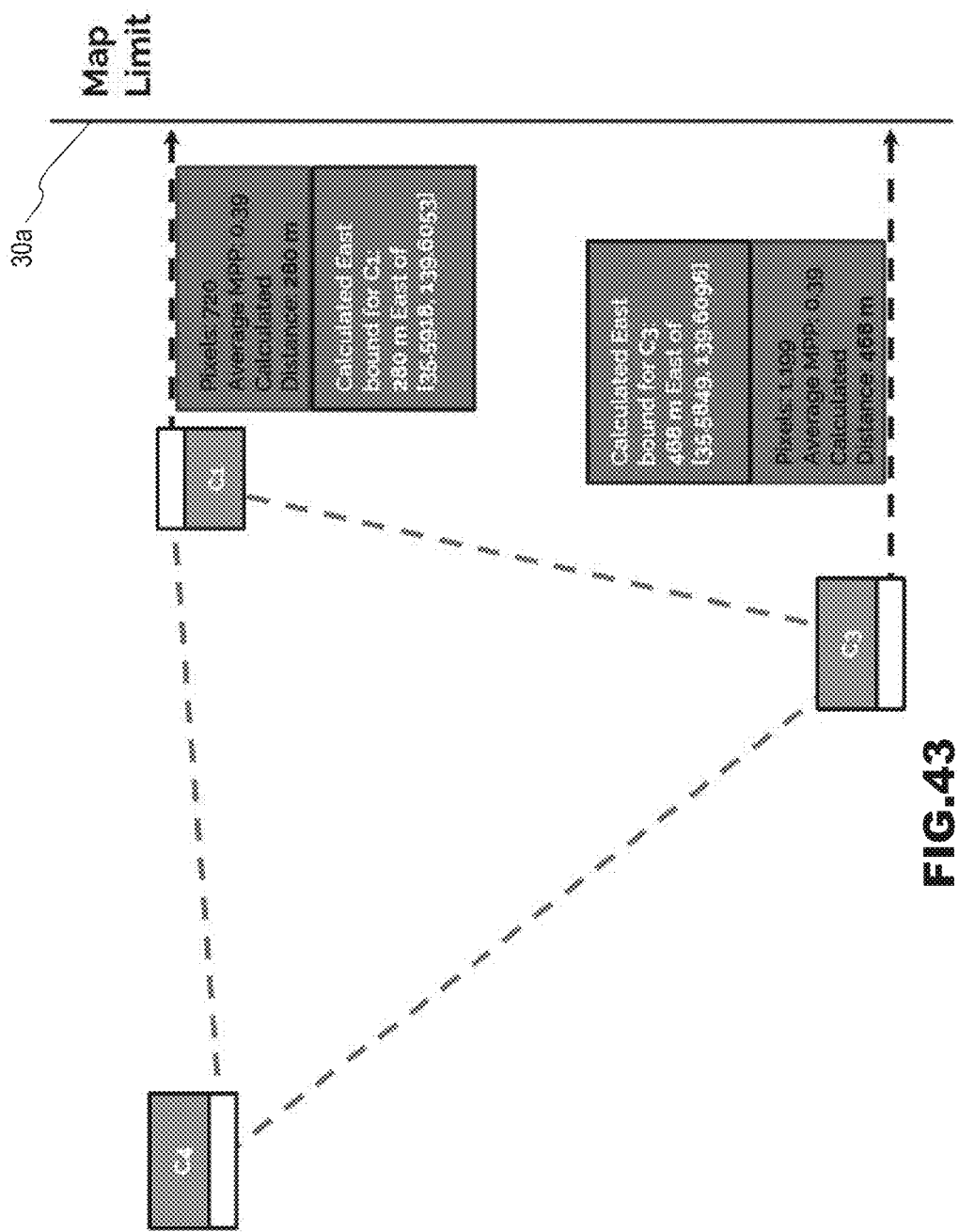
FIG. 43 is an image diagram illustrating processing that is performed by the map representation data processing device E according to the same.

Next, the region specification information acquisition unit E34 acquires the relative distance (the number of pixels in this example) "720" from the location indicated by the location identifier "C1" to the right side 30a. Note that the relative distance is the number of pixels in an orthogonal line from the location indicated by "C1" to the right side 30a. Next, the region specification information acquisition unit E34 calculates the absolute distance "280 m" to the right side 30a through a calculation "720×0.39", using the representative value (0.39) of the MPPs and the number of pixels "720". Next, it is assumed that the region specification information acquisition unit E34 acquires position information "]135.5918,139.6053] regarding the location directly rightward of the location indicated by "C1", in the right side 30a, using the position information regarding "C1" and the absolute distance "280 m" (see FIG. 43).

Similarly, the region specification information acquisition unit E34 acquires the number of pixels "1199" from the location indicated by the location identifier "C3" to the right side 30*a*. Also, the region specification information acquisition unit E34 multiplies the number of pixels "1199" by the representative value (0.39) of the MPPs to calculate the absolute distance "468 m" from the location indicated by the location identifier "C3" to the right side 30*a*. Also, the region specification information acquisition unit E34 acquires position information [35.5849,139.6096] regarding the location directly rightward of the location indicated by "C3", in the right side 30*a*, using the position information regarding "C3" and the absolute distance "468 m" (see FIG. 43). Similarly, the region specification information acquisition unit E34 acquires position information regarding the location directly rightward of the location indicated by "C4", in the right side 30*a*.

Figure 44:
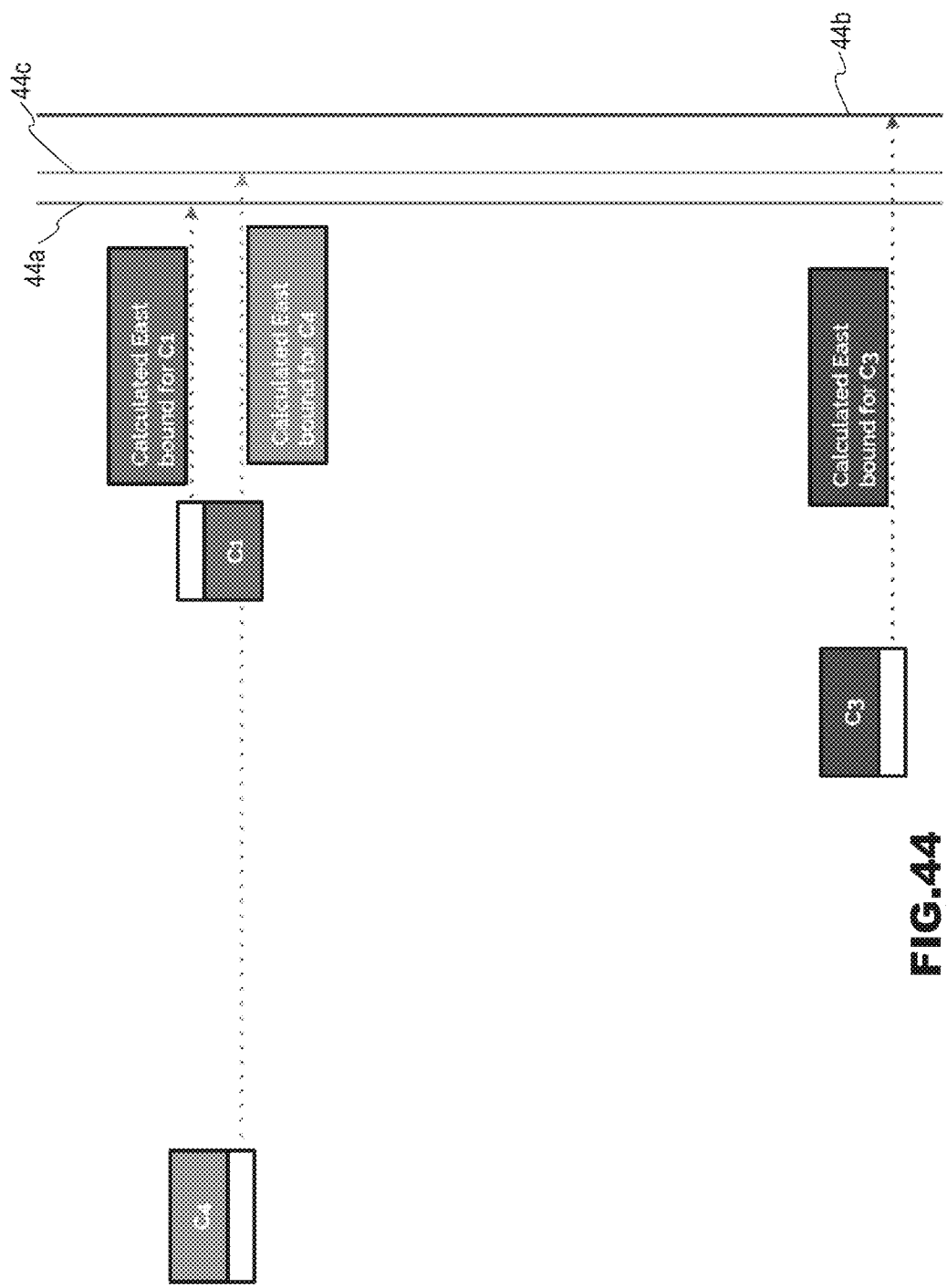
FIG. 44 is an image diagram illustrating processing that is performed by the map representation data processing device E according to the same.

Next, the region specification information acquisition unit E34 "acquires information regarding the right side from the locations "C1", "C3", and "C4", (straight line information) [44*a*,44*b*,44*c*], using positional information regarding the locations on the right side corresponding to the locations "C1", "C3", and "C4" and angle information. Such a conceptual diagram is shown in FIG. 44. Next, the region specification information acquisition unit E34 acquires the representative value (the median value 44*c* in this example) for the right side using the three pieces of information regarding the right side. This representative value for the right side is determined as the boundary line of the right side in the accurate map information. The representative value for the right side may be an average value.

Figure 45:
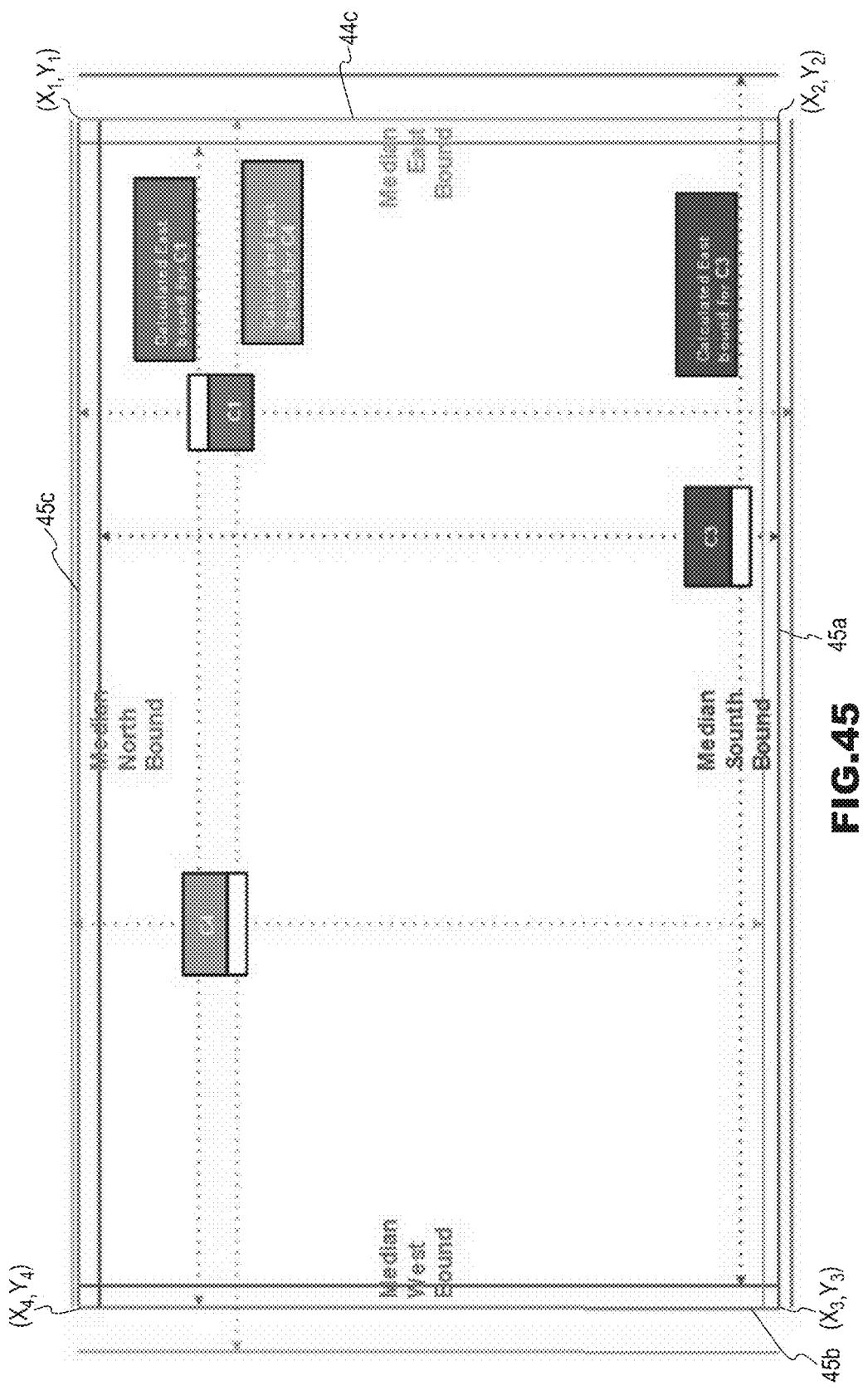
FIG. 45 is an image diagram illustrating processing that is performed by the map representation data processing device E according to the same.

The region specification information acquisition unit E34 performs the same processing as the acquisition processing performs to acquire the boundary line of the light side in the accurate map information, to acquire information regarding the bottom side (45*a*), the left side (45*b*), and the top side (45*c*) in the accurate map information. Next, the region specification information acquisition unit E34 acquires the intersections $(X_1,Y_1)$, $(X_2,Y_2)$, $(X_3,Y_3)$, and $(X_4,Y_4)$ of the four sides (44*c*, 45*a*, 45*b*, and 45*c*) (see FIG. 45). Note that each intersection is (latitude, longitude).

Through the above-described processing, the region specification information acquisition unit E34 acquires region specification information that corresponds to region in the map in the input image, and specifies the region in the accurate map information. Note that region specification information is information regarding four intersections, or information regarding two points $(X_1,Y_1)$ and $(X_3,Y_3)$, or information regarding two points $(X_2,Y_2)$ and $(X_4,Y_4)$.

Figure 46:
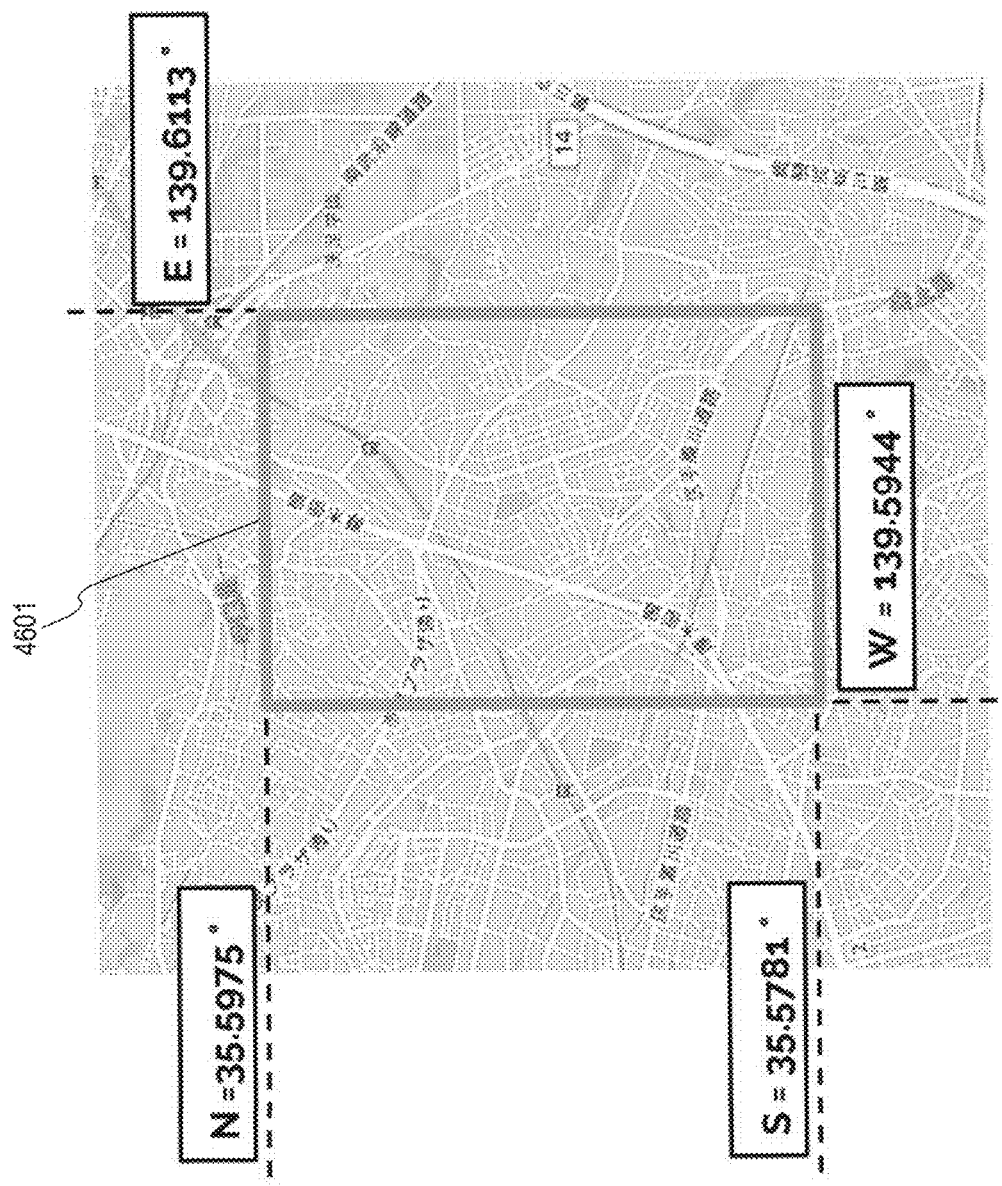
FIG. 46 is a diagram showing an example of an output of accurate map information from the map representation data processing device E according to the same.

Next, the processing unit E3 reads out accurate map information including the region specified by the region specification information. Next, the processing unit E3 forms accurate map information that explicitly indicates the region specified by the region specification information. Next, the output unit E4 outputs accurate map information that explicitly indicates the region specified by the region specification information. An output example of such accurate map information is shown in FIG. 46. The region is a rectangle and is indicated by 4601.

Figure 27:
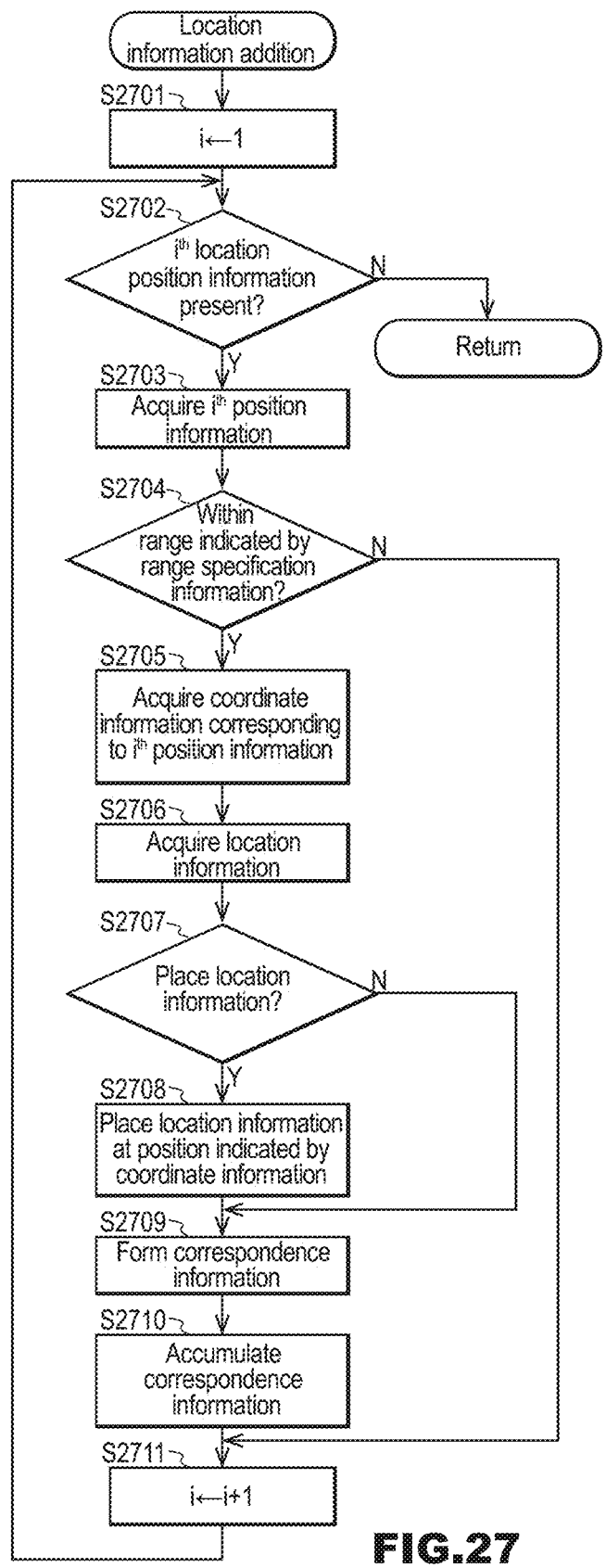
FIG. 27 is a flowchart illustrating an example of location addition processing according to the same.

Next, through the processing according to the flowchart in FIG. 27, the additional location acquisition unit E35 searches the location dictionary to acquire one or more pieces of location position information located within the region specified by the region specification information. Next, the additional location acquisition unit E35 acquires location information contained in each of the one or more pieces of location position information. Next, the additional coordinate acquisition unit E37 acquires coordinate information corresponding to the location information contained in each of the one or more pieces of location position information. Next, the location addition unit E38 places the character strings of the acquired location information on the input image at positions indicated by the acquired coordinate information. Through the above-described processing, accurate map information that is to be output is formed.

Next, the output unit E4 outputs the formed accurate map information. As described above, according to the present embodiment, it is possible to automatically acquire appropriate correspondence information that associates coordinate information and position information regarding a location name or the like on map representation data, with each other.

Also, according to the present embodiment, it is possible to acquire a range in the real world supported by map representation data.

Also, according to the present embodiment, it is possible to add new location information to map representation data.

Furthermore, according to the present embodiment, it is possible to acquire direction information regarding map representation data.

Note that the map representation data processing device D described in Embodiment 3 can explicitly indicate the current position on map representation data, using one or more pieces of correspondence information automatically acquired in the present embodiment.

In such a case, it is possible to indicate the current position on map representation data, using two or more pieces of correspondence information that have been automatically acquired by the map representation data processing device E.

Furthermore, the processing in the present embodiment may be realized using software. This software may be distributed through software downloading or the like. Also, this software may be recorded on a recording medium such as a CD-ROM and distributed. Note that the same applies to the other embodiments in the present description. The software that realizes the information processing device in the present embodiment is the program described below. That is to say, the program enables a computer to function as: a map representation data acceptance unit that accepts map representation data that is one or more types of maps of an illustration map, a handwritten map, and a sketch map; a character string acquisition unit that acquires three or more character strings from the map representation data; a coordinate information acquisition unit that acquires pieces of coordinate information that are pieces of coordinate information corresponding to the three or more character strings acquired by the character string acquisition unit and are pieces of coordinate information in the map representation data; a position information acquisition unit that acquires pieces of position information corresponding to pieces of location information that are three or more character strings acquired by the character string acquisition unit, using a location dictionary that contains one or more pieces of location position information that associate the pieces of location information that specify locations and pieces of position information that specify positions of the locations with each other; a relationship information acquisition unit that acquires relationship information regarding a relationship between pieces of correspondence information that are sets of the pieces of coordinate information and the pieces of position information corresponding to the three or more character strings acquired by the character string acquisition unit; a correspondence information acquisition unit that acquires only two or more pieces of correspondence information corresponding to a piece of relationship information that satisfies a predetermined relationship, of the three or more pieces of correspondence information, using the relationship information; and a correspondence output unit that accumulates the two or more pieces of correspondence information acquired by the correspondence information acquisition unit.

Figure 47:
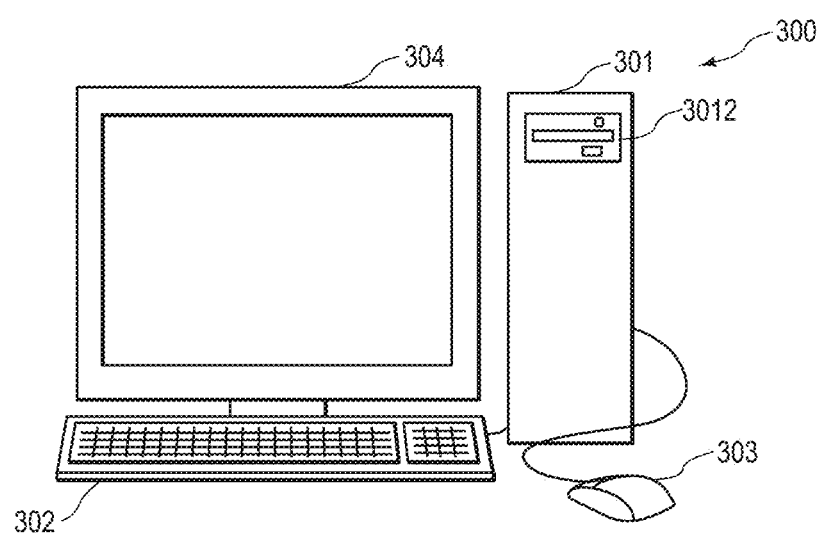
FIG. 47 is an overview diagram for a computer system according to the above-described embodiments.

FIG. 47 shows the external appearance of a computer that executes the program described herein to realize the map representation data processing device C and so on of the various embodiments described above. The above-described embodiments can be realized using computer hardware and a computer program that runs thereon. FIG. 47 is an overview diagram for this computer system 300, and FIG. 48 is a block diagram for the system 300.

In FIG. 47, the computer system 300 includes a computer 301 that includes a CD-ROM drive, a keyboard 302, a mouse 303, and a monitor 304.

Figure 48:
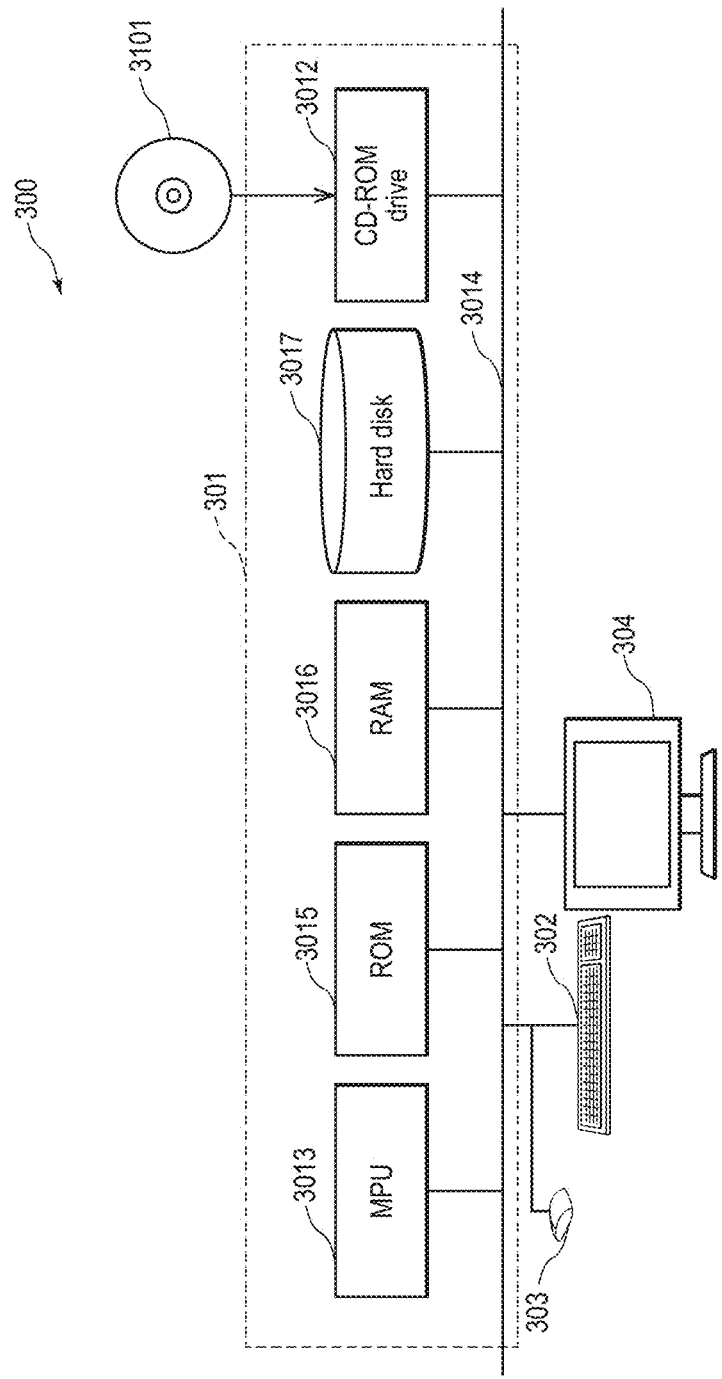
FIG. 48 is a block diagram for the computer system according to the same.

In FIG. 48, the computer 301 includes, in addition to the CD-ROM drive 3012, an MPU 3013, a bus 3014 that is connected to the CD-ROM drive 3012 and so on, a ROM 3015 for storing programs such as a boot-up program, a RAM 3016 that is connected to the MPU 3013 and is used to temporarily store application program instructions and provide a temporary storage space, and a hard disk 3017 for storing application programs, system programs, and data. Here, although not shown in the drawings, the computer 301 may further include a network card that provides connection to a LAN.

The program that enables the computer system 300 to perform the functions of the map representation data processing device C and so on according to the above-described embodiments may be stored in the CD-ROM 3101, inserted into the CD-ROM drive 3012, and furthermore transferred to the hard disk 3017. Alternatively, the program may be transmitted to the computer 301 via a network (not shown) and stored on the hard disk 3017. The program is loaded into the RAM 3016 when the program is to be executed. The program may be directly loaded from the CD-ROM 3101 or the network.

The program does not necessarily have to include an operating system (OS), a third-party program, or the like that enables the computer 301 to perform the functions of the map representation data processing device C and so on according to the embodiment described above. The program need only contain the part of the instruction that calls an appropriate function (module) in a controlled manner to achieve a desired result. How the computer system 300 works is well known and the detailed descriptions thereof will be omitted.

In the above-described program, the step of transmitting information and the step of receiving information do not include processing performed by hardware, for example, processing performed by a modem or interface card in the step of transmitting (processing that can only be performed by hardware).

There may be a single or multiple computers executing the above-described program. That is to say, centralized processing or distributed processing may be performed.

In addition, in each of the above-described embodiments, two or more communication means that are present in one device are physically one.

In the above-described embodiments, each kind of processing may be realized as centralized processing that performed by a single device, or distributed processing performed by multiple devices. That is to say, the map representation data processing device C may operate as a stand-alone device.

As a matter of course, the present invention is not limited to the above-described embodiments, and various changes are possible, and such variations are also included within the scope of the present invention.

INDUSTRIAL APPLICABILITY

As described above, the map representation data processing device according to the present invention has the effect of being able to automatically acquire coordinate information and position information regarding location names or the like on map representation data in association with each other, and is useful as a map representation data processing device and so on.

REFERENCE SIGNS LIST

A Learning Device
B Classification Device
C, D, E Map Representation Data Processing Device
A1, B1, C1, D1 Storage Unit
A2, B2, C2, D2 Acceptance Unit
A3, B3, C3, D3, E3 Processing Unit
A4, B4, C4, D4, E4 Output Unit
A11 Learning Source Information Storage Unit
A12 Learner Storage Unit
A31 Learning Unit
A41 Accumulation Unit
B21 Character String Acceptance Unit
B31 Classification Unit
B41 Label Output Unit
C11 Location Dictionary Storage Unit
C12 Map Representation Data Storage Unit
C13 Accurate Map Information Storage Unit
C14 Correspondence Information Storage Unit
C21 Map Representation Data Acceptance Unit
C31 Character String Acquisition Unit
C32 Classification Unit
C33 Grouping Unit
C34 Feature Spot Detection Unit
C35 Coordinate Information Acquisition Unit
C36 Position Information Acquisition Unit
C37 Region Specification Information Acquisition Unit
C38 Direction Information Acquisition Unit
C41 Correspondence Output Unit
C42 Accurate Map Information Output Unit
C43 Direction Information Output Unit
C371 First Region Specification Information Acquisition Part
C372 Outer Character String Determination Part
C373 Size Information Acquisition Part
C374 Distance Information Acquisition Part
C375 Second Region Specification Information Acquisition Part
D31 Current Position Information Acquisition Unit
D32 Coordinate Information Acquisition Unit
D33 Data Forming Unit
D41 Map Representation Data Output Unit
E31 Relationship Information Acquisition Unit
E32 Correspondence Information Acquisition Unit
E33 Scale Acquisition Unit
E34 Region Specification Information Acquisition Unit
E35 Additional Location Acquisition Unit
E36 Additional Position Acquisition Unit
E37 Additional Coordinate Acquisition Unit
E38 Location Addition Unit
E39 Direction Information Acquisition Unit
E41 Correspondence Output Unit
E42 Scale Information Output Unit E43 Region Specification Information Output Unit
E44 Direction Information Output Unit
E321 Judging Part
E322 Correspondence Information Acquisition Part

The invention claimed is:

1. A map representation data processing device comprising:
   a map representation data acceptance unit that accepts map representation data that is one or more types of maps of an illustration map, a handwritten map, and a sketch map;
   a character string acquisition unit that acquires a character string from the map representation data;
   a coordinate information acquisition unit that acquires coordinate information that is information that specifies a coordinate position corresponding to the character string acquired by the character string acquisition unit and is information that specifies a relative coordinate position in the map representation data;
   a position information acquisition unit that acquires pieces of position information corresponding to pieces of location information that are character strings acquired by the character string acquisition unit, using a location dictionary that contains one or more pieces of location position information that associate the pieces of location information that specify locations and the pieces of position information that specify positions of the locations with each other; and
   a correspondence output unit that outputs the coordinate information acquired by the coordinate information acquisition unit and the position information acquired by the position information acquisition unit in association with each other.

2. The map representation data processing device according to claim 1,
   wherein the character string acquisition unit acquires two or more character strings from the map representation data,
   the map representation data processing device further comprises a classification unit that judges whether or not each of the two or more character strings acquired by the character string acquisition unit is a character string that specifies a location, and
   the correspondence output unit outputs coordinate information and position information corresponding to a character string judged by the classification unit as a character string that specifies a location, in association with each other.

3. The map representation data processing device according to claim 2, further comprising
   a learner storage unit that stores a learner acquired by providing a learning module for machine learning with two or more pieces of learning source information that contain a character string that contains two or more characters, and any label of two or more types of labels that are each a label regarding the number of appearances in a location dictionary, and executing the learning module,
   wherein the classification unit performs classification processing to judge whether each of the two or more character strings is location information or non-location information through a machine learning technique, using the two or more character strings acquired by the character string acquisition unit, and the learner, and
   the correspondence output unit outputs coordinate information and position information corresponding to a character string judged by the classification unit as location information, in association with each other.

4. The map representation data processing device according to claim 1, further comprising
   a feature spot detection unit that detects a feature spot that is a spot where a feature pattern that is a predetermined characteristic pattern is expressed, from the map representation data,
   wherein the coordinate information acquisition unit acquires coordinate information corresponding to the feature pattern, and
   the position information acquisition unit acquires position information corresponding to location information that is a character string corresponding to the feature pattern, using the location dictionary.

5. The map representation data processing device according to claim 1,
   wherein the character string acquisition unit acquires three or more character strings from the map representation data,
   the map representation data processing device further comprises a grouping unit that determines two or more pieces of position information that indicate positions that are close enough to satisfy a predetermined condition, from among the three or more pieces of position information acquired by the position information acquisition unit, and
   the correspondence output unit outputs the two or more pieces of position information determined by the grouping unit and the two or more pieces of coordinate information acquired by the coordinate information acquisition unit, in association with each other.

6. The map representation data processing device according to claim 5, further comprising:
   an accurate map information storage unit that stores accurate map information that is map information that is accurate;
   a region specification information acquisition unit that acquires region specification information that specifies a region that includes positions indicated by the two or more pieces of position information determined by the grouping unit, and is included in the accurate map information; and
   an accurate map information output unit that outputs the accurate map information in a mode in which the region specified by the region specification information is discernable.

7. The map representation data processing device according to claim 6,
   wherein the region specification information acquisition unit includes:
      a first region specification information acquisition part that acquires first region specification information that specifies a first region that includes the positions indicated by the two or more pieces of position information determined by the grouping unit, and is a region in the accurate map information;
      an outer character string determination part that determines character strings corresponding to one or more pieces of position information that are located at outermost positions, of the pieces of position information acquired by the position information acquisition unit;
      a size information acquisition part that acquires size information regarding a size to corners of the map representation data outside the one or more character strings determined by the outer character string determination part;

a distance information acquisition part that acquires distance information that specifies a distance corresponding to the size information acquired by the size information acquisition part, using two or more sets each including the coordinate information acquired by the coordinate information acquisition unit and the position information acquired by the position information acquisition unit; and a second region specification information acquisition part that acquires second region specification information that specifies a second region that is expanded from the first region specified by the first region specification information, using the distance information, and the accurate map information output unit outputs the accurate map information in a mode in which the region specified by the second region specification information is discernable.

8. The map representation data processing device according to claim 7, wherein the region specification information or the second region specification information includes information regarding two points that are included in a rectangle, and the map representation data processing device further comprises:

a direction information acquisition unit that acquires direction information regarding a direction in the map representation data, using the region specification information or the second region specification information; and a direction information output unit that outputs the direction information.

9. The map representation data processing device according to claim 1, further comprising:

a relationship information acquisition unit that acquires relationship information regarding a relationship between pieces of correspondence information that are sets of the pieces of coordinate information and the pieces of position information corresponding to the three or more character strings acquired by the character string acquisition unit;

a correspondence information acquisition unit that acquires only two or more pieces of correspondence information corresponding to a piece of relationship information that satisfies a predetermined relationship, of the three or more pieces of correspondence information, using the relationship information; and a correspondence output unit that accumulates the two or more pieces of correspondence information acquired by the correspondence information acquisition unit.

10. The map representation data processing device according to claim 9, wherein the relationship information acquisition unit acquires relative relationship information between pieces of correspondence information respectively corresponding to two character strings of the three or more character strings acquired by the character string acquisition unit, for each set of two character strings, the correspondence information acquisition unit includes:
a judging part that groups the three or more pieces of relationship information acquired by the relationship information acquisition unit, and determines a piece of relationship information that is not included in any of the groups; and a correspondence information acquisition part that excludes a piece of correspondence information corresponding to the piece of relationship information that is not included in the group from the pieces of correspondence information respectively corresponding to the three more character strings acquired by the character string acquisition unit, and only acquires the remaining two or more pieces of correspondence information.

11. The map representation data processing device according to claim 9, wherein the relationship information acquisition unit acquires, for each set of two character strings, distance relationship information that is relationship information that indicates a relationship between a relative distance that is a difference between pieces of coordinate information regarding the two character strings and an absolute distance that is a difference between pieces of position information regarding the two character strings, and the correspondence information acquisition unit judges whether or not each of the three or more pieces of distance relationship information satisfies a predetermined relationship, excludes a piece of correspondence information corresponding to a piece of distance relationship information that does not satisfy the predetermined relationship from the pieces of correspondence information respectively corresponding to the three or more character strings acquired by the character string acquisition unit, and only acquires the remaining two or more pieces of correspondence information.

12. The map representation data processing device according to claim 11, further comprising:

a scale acquisition unit that acquires a representative value of distance relationship information from the three or more pieces of relationship information, and acquires scale information regarding the map representation data, using the representative value of distance relationship information; and a scale information output unit that outputs the scale information.

13. The map representation data processing device according to claim 12, further comprising:

a region specification information acquisition unit that acquires relative vertical distances that are vertical distances between pieces of coordinate information corresponding to the character strings acquired by the character string acquisition unit and four sides of the map representation data, respectively, and acquires region specification information that specifies a range of the map representation data in a real world, using the relative vertical distances and the scale information; and a region specification information output unit that outputs the region specification information.

14. The map representation data processing device according to claim 13, further comprising:

an additional location acquisition unit that acquires location information regarding the range indicated by the region specification information, from the location dictionary;

an additional position acquisition unit that acquires position information corresponding to the location information, from the location dictionary;

an additional coordinate acquisition unit that acquires coordinate information corresponding to the position information; and a location addition unit that places the location information at a position that is on the map representation data and is indicated by the coordinate information.

15. The map representation data processing device according to claim 9, wherein the relationship information acquisition unit acquires, for each set of two character strings, angle relationship information that is relationship information that indicates a relationship between a relative angle that is an angle acquired from pieces of coordinate information regarding the two character strings and an absolute angle that is an angle acquired from pieces of position information regarding the two character strings, and the correspondence information acquisition unit judges whether or not each of the three or more pieces of angle relationship information satisfies a predetermined relationship, excludes a piece of correspondence information corresponding to a piece of angle relationship information that does not satisfy the predetermined relationship from the pieces of correspondence information respectively corresponding to the three or more character strings acquired by the character string acquisition unit, and only acquires the remaining two or more pieces of correspondence information.

16. The map representation data processing device according to claim 15, further comprising:

a direction information acquisition unit that acquires a representative value of angle relationship information from the three or more pieces of angle relationship information, and acquires direction information that indicates a direction in the map representation data, using the representative value of angle relationship information; and a direction information output unit that outputs the direction information.

17. A map representation data processing device comprising:

a map representation data storage unit that stores map representation data;

a correspondence information storage unit that stores two or more pieces of correspondence information that are each a set of coordinate information and position information output from the map representation data processing device according to claim 1;

a current position information acquisition unit that acquires current position information that specifies a current position;

a coordinate information acquisition unit that acquires coordinate information corresponding to the current position information, using the two or more pieces of correspondence information;

a data forming unit that forms current position-added map representation data that is the map representation data on which a position indicated by the coordinate information is explicitly indicated; and a map representation data output unit that outputs the current position-added map representation data.

18. A correspondence information production method that is realized using a map representation data acceptance unit, a character string acquisition unit, a coordinate information acquisition unit, a position information acquisition unit, and a correspondence output unit, the correspondence information production method comprising:

a map representation data acceptance step in which the map representation data acceptance unit accepts map representation data that is one or more types of maps of an illustration map, a handwritten map, and a sketch map;

a character string acquisition step in which the character string acquisition unit acquires a character string from the map representation data;

a coordinate information acquisition step in which the coordinate information acquisition unit acquires coordinate information that is information that specifies a coordinate position corresponding to the character string acquired in the character string acquisition step and is information that specifies a relative coordinate position in the map representation data;

a position information acquisition step in which the position information acquisition unit acquires pieces of position information corresponding to pieces of location information that are character strings acquired in the character string acquisition step, using a location dictionary that contains one or more pieces of location position information that associate the pieces of location information that specify locations and pieces of position information that specify positions of the locations with each other; and a correspondence output step in which the correspondence output unit outputs the coordinate information acquired in the coordinate information acquisition step and the position information acquired in the position information acquisition step, in association with each other.

19. A non-transitory computer readable mediums storing a program that enables a computer that can access a location dictionary storage unit that stores a location dictionary that contains one or more pieces of location position information each being information that associates location information that specifies a location and position information that specifies a position of the location with each other, to function as:

a map representation data acceptance unit that accepts map representation data that is one or more types of maps of an illustration map, a handwritten map, and a sketch map;

a character string acquisition unit that acquires a character string from the map representation data;

a coordinate information acquisition unit that acquires coordinate information that is information that specifies a coordinate position corresponding to the character string acquired by the character string acquisition unit and is information that specifies a relative coordinate position in the map representation data;

a position information acquisition unit that acquires position information corresponding to location information that is the character string acquired by the character string acquisition unit, using the location dictionary; and a correspondence output unit that outputs the coordinate information acquired by the coordinate information acquisition unit and the position information acquired by the position information acquisition unit in association with each other.

* * * * *